(12) United States Patent
Kunigami et al.

(10) Patent No.: US 8,654,317 B2
(45) Date of Patent: Feb. 18, 2014

(54) OPTICAL FIBER SENSOR, PRESSURE SENSOR, END EFFECTOR AND STRESS DETECTING METHOD USING THE SAME

(75) Inventors: Masaki Kunigami, Tochigi-ken (JP); Nobuhiro Fueki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 765 days.

(21) Appl. No.: 12/874,098

(22) Filed: Sep. 1, 2010

(65) Prior Publication Data
US 2011/0102766 A1 May 5, 2011

(30) Foreign Application Priority Data

Nov. 2, 2009 (JP) ................................ 2009-252047
Nov. 2, 2009 (JP) ................................ 2009-252049
Feb. 10, 2010 (JP) ................................ 2010-027303

(51) Int. Cl.
*G01B 11/16* (2006.01)
*G02B 6/00* (2006.01)
*G01L 1/24* (2006.01)
*G01M 11/08* (2006.01)

(52) U.S. Cl.
CPC .............. *G01B 11/165* (2013.01); *G01L 1/242* (2013.01); *G01L 1/243* (2013.01); *G01M 11/086* (2013.01)
USPC .............................................. 356/32; 385/13

(58) Field of Classification Search
None
See application file for complete search history.

(56) References Cited

U.S. PATENT DOCUMENTS

| | | | |
|---|---|---|---|
| 4,806,012 A * | 2/1989 | Meltz et al. | 356/32 |
| 5,276,322 A * | 1/1994 | Carome | 250/227.21 |
| 5,491,335 A * | 2/1996 | Bucholtz et al. | 250/227.25 |
| 6,175,108 B1 * | 1/2001 | Jones et al. | 250/227.14 |
| 6,439,055 B1 * | 8/2002 | Maron et al. | 73/705 |
| 6,677,576 B1 * | 1/2004 | Kenny et al. | 356/73.1 |
| 6,776,045 B2 * | 8/2004 | Fernald et al. | 250/230 |
| 6,955,085 B2 * | 10/2005 | Jones et al. | 250/227.18 |
| 6,957,574 B2 * | 10/2005 | Ogle | 73/152.48 |
| 7,047,816 B2 * | 5/2006 | Jones et al. | 73/729.1 |
| 2003/0066356 A1 * | 4/2003 | Kanellopoulos et al. | 73/800 |
| 2005/0232532 A1 | 10/2005 | Wang et al. | |
| 2009/0126501 A1 * | 5/2009 | Ferguson | 73/800 |

FOREIGN PATENT DOCUMENTS

| | | | |
|---|---|---|---|
| JP | 58-056938 U | 4/1983 | |
| JP | 03-128833 U | 12/1991 | |

(Continued)

OTHER PUBLICATIONS

Office Action, Patent Application No. 2009-252047, mailing date Nov. 27, 2012.

(Continued)

*Primary Examiner* — Gregory J Toatley
*Assistant Examiner* — Juan D Valentin, II
(74) *Attorney, Agent, or Firm* — Arent Fox LLP

(57) ABSTRACT

In an FBG (Fiber Bragg Grating) sensor, a stress direction converter includes a flat portion to which stresses are applied from the exterior, and stress transmitting sections that are bridged from the flat portion to an optical fiber cable. An inclined portion of the optical fiber cable, through which reflected light reflected by gratings is transmitted, is disposed along an inclined section that makes up one of the stress transmitting sections.

18 Claims, 42 Drawing Sheets

(56) References Cited

FOREIGN PATENT DOCUMENTS

| JP | 05-151869 A | 6/1993 |
| JP | 11-295167 A | 10/1999 |
| JP | 2000-028456 A | 1/2000 |
| JP | 2002-071323 A | 3/2002 |
| JP | 2002-131023 A | 5/2002 |
| JP | 2003-287469 A | 10/2003 |
| JP | 2006-201071 A | 8/2006 |
| JP | 3871874 B2 | 1/2007 |
| JP | 2009-068988 A | 4/2009 |

OTHER PUBLICATIONS

Office Action, Patent Application No. 2009-252049, mailing date Nov. 27, 2012.

* cited by examiner

OPTICAL FIBER SENSOR, PRESSURE SENSOR, END EFFECTOR AND STRESS DETECTING METHOD USING THE SAME

CROSS-REFERENCE TO RELATED APPLICATION

This application is based upon and claims the benefit of priority from Japanese Patent Applications No. 2009-252047 filed on Nov. 2, 2009, No. 2009-252049 filed on Nov. 2, 2009 and No. 2010-027303 filed on Feb. 10, 2010, of which the contents are incorporated herein by reference.

BACKGROUND OF THE INVENTION

1. Field of the Invention

The present invention relates to an optical fiber sensor including an optical fiber in which gratings that reflect a specified wavelength of light are arrayed, a pressure sensor made up of optical fiber sensors arranged in a sheet, and an end effector on which a pressure sensor is mounted, as well as to a stress detecting method in which the optical fiber sensor, the pressure sensor and the end effector are used.

2. Description of the Related Art

Heretofore, a pressure sensor has been known in which optical fibers are arranged in a sheet that serves as a sensor, and by detecting strains in the optical fibers at a time when pressure (stress) is applied to the sheet from a body, the pressure at a location where the optical fibers are disposed is detected (see, Japanese Patent No. 3871874 and Japanese Laid-Open Patent Publication No. 2002-071323).

On the other hand, another type of pressure sensor is known that makes use of MEMS (Micro Electromechanical Systems) technology to detect as electrical signals pressures (normal stresses, horizontal stresses) that are applied in both normal and horizontal directions (see Japanese Laid-Open Patent Publication No. 2009-068988).

There are concerns that the following problems may be brought about in cases where the pressure sensors disclosed in Japanese Patent No. 3871874, Japanese Laid-Open Patent Publication No. 2002-071323, and Japanese Laid-Open Patent Publication No. 2009-068988 are applied to an end effector of a machine tool used in FA (Factory Automation) for carrying out complex assembly operations, for detecting the gripped state of an object held by the end effector, and for performing feedback controls with respect to the end effector based on pressures detected by the pressure sensors.

In the case that the pressure sensors of Japanese Patent No. 3871874 and Japanese Laid-Open Patent Publication No. 2002-071323 are applied to an end effector, while it is possible to detect the size and orientation of pressures (stresses) that are applied to the body, it is difficult to segregate and detect stresses in components having a plurality of directions. Consequently, since the state at which the body is gripped by the end effector cannot be known, the body may drop out from the end effector, and whether or not a desired assembly operation was carried out effectively cannot be confirmed.

Further, in the case that the pressure sensor of Japanese Laid-Open Patent Publication No. 2009-068988 is applied to an end effector, because the substrate that constitutes the pressure sensor is made from a silicon wafer, it is difficult for this type of pressure sensor to be attached on a curved surface region of an end effector having a curved surface. Furthermore, in case it is necessary to mold the silicon wafer in order to protect the silicon wafer from excessive stresses, as well as to protect the electric signals converted from stresses from electromagnetic noise and various surges (e.g., static electric surges caused by static electricity from human bodies or various types of machines), there are problems in that manufacturing costs rise. Still further, when one attempts to segregate the stresses applied to the body into a plurality of directional components and detect such stresses, the structure of the pressure sensor becomes complicated, and together therewith, signal processing carried out with respect to electrical signals converted from such stresses is troublesome.

Accordingly, the pressure sensor disclosed in Japanese Laid-Open Patent Publication No. 2009-068988 tends to be complicated in structure and large in scale, and of high cost, and therefore it is not easy to mount such a pressure sensor onto an end effector. Assuming that such a pressure sensor was attached to an end effector, there also is a concern that the end effector as a whole would inevitably become undesirably large in size.

SUMMARY OF THE INVENTION

Taking into consideration the aforementioned problems, the present invention has the object of providing an optical fiber sensor, a pressure sensor, and an end effector, which with a comparatively simple structure, can enable stresses applied from a body to be segregated and detected in a plurality of directions (normal direction, horizontal direction), can avoid dropping out of the body from the end effector, and can enable assembly processes to be carried out reliably, while also being low in cost and of a small scale.

An optical fiber sensor according to the present invention is characterized by a stress detection sensor made up from an optical fiber in which gratings are arrayed that reflect light of a specified wavelength, and a stress direction converter for converting external stresses applied from an exterior into stresses of a direction in which the gratings are arrayed, and transmitting the stresses to the optical fiber. The stress direction converter includes a flat portion to which stresses are applied from the exterior, and a stress transmitting section that is bridged from the flat portion to the optical fiber. One end of the optical fiber, through which light of the specified wavelength reflected by the gratings is transmitted, is disposed along the stress transmitting section.

In accordance with the above-indicated structure, when normal stresses are applied from a body with respect to the flat portion, the stress direction converter converts the normal stresses into stresses having a direction in which the gratings are arrayed, and then transmits the converted stresses to the optical fiber via the stress transmitting section. Owing thereto, strains are generated in the gratings due to the converted stresses, and the wavelength (reflected wavelength) of light reflected by the gratings is changed. Accordingly, normal stresses are capable of being detected by detecting a shift amount of the reflected wavelengths at the gratings.

On the other hand, when horizontal stresses are applied from a body with respect to the flat portion, the flat portion is displaced by the horizontal stresses in a direction along the flat portion (i.e., the direction in which the gratings are arrayed). As noted above, because the stress transmitting section bridges between the flat portion and the optical fiber, as a result of application of horizontal stresses with respect to the flat portion, at least on a side of the stress transmitting section proximate the flat portion, the stress transmitting section is displaced together with the flat portion.

Light from the exterior that is incident on the optical fiber passes through one end of the optical fiber disposed along the stress transmitting section, and is guided to the gratings, whereas light (reflected light) of a specified wavelength is transmitted from the gratings to an end of the optical fiber and is radiated out to the exterior. In this case, if a portion of the stress transmitting section is displaced integrally with the flat portion due to application of horizontal stresses with respect to the flat portion, then accompanying such displacement, the one end of the optical fiber is bent (or flexed), whereby bending losses are generated in the optical fiber. As a result of generation of such bending losses, the intensity (reflected wave intensity) of reflected light that passes through the one end of the optical fiber and is radiated out to the exterior changes.

Consequently, by detecting an amount of change in the reflected wave intensity caused by the bending loss, the horizontal stress corresponding to the reflected wave intensity can be detected.

Accordingly, in accordance with the above configuration, with a comparatively simple structure, stresses (normal stresses, horizontal stresses) applied from a body are capable of being segregated into multiple directions (normal direction, horizontal direction) and detected. More specifically, with the present invention, using reflected light (one output signal), which is output from a single optical fiber, both normal stresses and horizontal stresses can be detected.

Further, in the case that the optical fiber sensor is mounted on an end effector of a manipulator or the like and the end effector grips a body, because the optical fiber sensor segregates the external forces (normal stresses, horizontal stresses) applied to the end effector from the body into multiple directional components and detects such forces, the manner in which such external forces behave within spatial coordinates of the end effector can easily be grasped.

Owing thereto, while the end effector is gripping the body, slippage and falling out of the body from the end effector can reliably be avoided. Further, by mounting the optical fiber sensor on the end effector, the present invention is effective at enabling automization of assembly operations, which have been problematic in the conventional art.

For example, in the case that the present invention is applied to an assembly process carried out while the end effector grips a flexible body the shape of which is easily changed by application of external forces, by detecting with the optical fiber sensor normal stresses and horizontal stresses applied to a gripping surface (contact surface) with the body on the end effector, deformation of the body can be recognized during gripping, and corresponding to such recognition, controls with respect to the end effector can be carried out automatically. Further, when the flexible body is being assembled, when hangings or tensions are confirmed, normal stresses and horizontal stresses in the gripping surface are detected, and based on each of the detected stresses, the strength at which the end effector grips the body can be controlled.

Further, because stresses are detected using optical fibers, no adverse influence is imparted to the optical fiber sensor as a result of exposure to electromagnetic noise or various types of electrical surges or the like. As a result, even if used in environments such as factories or the like where multiple large-scale machinery and equipment are run, while the influence of the aforementioned types of noise is avoided, stresses can be detected and measured with comparative stability.

Further, the flat portion may be disposed along the direction in which the gratings are arrayed, while the stress transmitting section may comprise a first inclined section that is inclined from one end of the flat portion toward the optical fiber, a first joint section joined to the first inclined section and which surrounds a portion of an outer circumferential surface of the optical fiber in the vicinity of one end side of the gratings, a second inclined section that is inclined from another end of the flat portion toward the optical fiber, and a second joint section joined to the second inclined section and which surrounds a portion of an outer circumferential surface of the optical fiber in the vicinity of another end side of the gratings.

Owing thereto, normal stresses can be converted efficiently into stresses of a direction along the gratings, and can be transmitted to the optical fiber (i.e., the gratings thereof). Further, in the case that horizontal stresses are applied to the flat portion, such horizontal stresses can be transmitted with good efficiency to an end of the optical fiber.

In this case, if one end of the optical fiber is disposed along one of the first inclined section and the second inclined section, when horizontal stresses are applied to the flat portion, one end of the optical fiber that is disposed on the first inclined section or the second inclined section can reliably be bent (or flexed), whereby bending losses can be generated.

Further, the stress transmitting section may include a third inclined section, which is connected to one of the first joint section and the second joint section, in a condition of being separated from the first inclined section and the second inclined section. Furthermore, the one end of the optical fiber may be disposed along the third inclined section.

In this manner, by disposing the third inclined section in double with respect to the first inclined section or the second inclined section, transmission of stresses converted from the normal stresses are borne by the first inclined section and the second inclined section, whereas bending (or flexing) of the one end of the optical fiber caused by horizontal stresses is borne by the third inclined section. Owing thereto, since in the reflected wave intensity radiated out to the exterior from the optical fiber, the percentage of the change amount in the reflected wave intensity responsive to normal stresses is suppressed, the amount of change of the reflected wave intensity responsive to horizontal stresses can be detected with comparatively good independence.

Still further, at least one of a projection and a groove may be formed on the flat portion.

In this manner, by providing at least one of a projection and a groove on the flat portion to which horizontal stresses are applied, compared to a case in which such projections or grooves are not provided, the detection area and the deformation amount on the detection surface (reaction surface) for the horizontal stresses, which is perpendicular to the direction (direction along the flat portion, direction in which the gratings are arrayed) at which the horizontal stresses are applied, can easily be made larger. As a result, the detection sensitivity of the horizontal stresses can be enhanced, and the detection accuracy of horizontal stresses can be raised.

At least one of the projection and the groove may be columnar shaped or shaped as points. Further, in the case that at least one of the projection and the groove is columnar shaped, the projection or groove may be formed along a direction that is substantially perpendicular to a direction in which the gratings are arrayed.

By providing at least one of the projection and the groove with the aforementioned shape, the detection area or the deformation amount due to horizontal stresses can be made greater, and the detection sensitivity and detection accuracy of horizontal stresses can be enhanced.

Furthermore, by disposing at least one of the projection and the groove on the flat portion in plurality, the detection area or deformation amount due to horizontal stresses can be made even larger.

Further, at least one of the projection and the groove may be formed by a stepped portion, having a front surface or a front side ridgeline of a different height than a front surface of the flat portion, and a rear surface or a rear side ridgeline of a different height than a rear surface of the flat portion, and connecting portions, which are bridged from the stepped portion to the flat portion.

In accordance with such a structure, in the case that stresses (normal stresses) having a different direction from the longitudinal direction of the optical fiber are applied from a body to the stress direction converter, such normal stresses are applied respectively to the flat portion and to the stepped portion formed on the flat portion. Owing thereto, the stress direction converter can be deformed largely as a whole by normal stresses applied to the stepped portion, as well as by normal stresses applied to the flat portion.

Further, the normal stresses applied respectively to the flat portion and to the stepped portion are converted by the stress direction converter into stresses of a direction parallel to the longitudinal direction of the optical fiber, and after conversion thereof, the converted stresses are transmitted to the gratings via the stress transmitting section.

In accordance therewith, because large strains are generated in the gratings, and the wavelength (reflected wavelength) of light reflected at the gratings changes significantly, by detecting a shift amount in the reflected wavelength at the gratings, normal stresses can easily be detected.

In this manner, by forming the stepped portion on the flat portion, compared to not providing the stepped portion, the deformation amount of the stress direction converter can be made large, and strains generated in the gratings can also be made large. As a result, the reflected wavelength shift amount can be increased significantly, and the detection sensitivity of normal stresses can easily be enhanced.

Further, at least one of a tip part and a deepest part of the stepped portion may be formed at a sharp angle. By means of this shape, the deformation amount of the stress direction converter and strains in the gratings can be made even greater, and thus, detection sensitivity of normal stresses can be enhanced.

Further, a pressure sensor according to the present invention comprises a flexible sheet, and an optical fiber sensor. The optical fiber sensor includes a stress detection sensor made up from an optical fiber in which gratings are arrayed that reflect light of a specified wavelength, and a stress direction converter for converting stresses applied from a body in contact with the sheet into stresses of a direction in which the gratings are arrayed, and for transmitting the stresses to the optical fiber. The stress direction converter includes a flat portion to which stresses are applied from the body, and a stress transmitting section that is bridged from the flat portion to the optical fiber. One end of the optical fiber, through which light of the specified wavelength reflected by the gratings is transmitted, is disposed along the stress transmitting section.

In accordance with the above structure, in the pressure sensor, by means of the optical fiber sensor constructed with a comparatively simple structure, stresses (normal stresses, horizontal stresses) applied from a body are capable of being segregated into multiple directions (normal direction, horizontal direction) and detected. For example, in the pressure sensor, both normal stresses and horizontal stresses can easily be detected using reflected light (one output signal), which is output from a single optical fiber.

Further, at least one of a projection and a groove may be formed on the flat portion.

In this manner, by providing at least one of a projection and a groove on the flat portion, the detection area and the deformation amount on the detection surface (reaction surface) with respect the horizontal stresses, which is perpendicular to the direction (direction along the flat portion, direction in which the gratings are arrayed) at which the horizontal stresses are applied, can easily be made larger. As a result, the detection sensitivity of horizontal stresses can be enhanced, and the detection accuracy of horizontal stresses can be raised.

Further, at least one of the projection and the groove can be constituted by a stepped portion, having a front surface or a front side ridgeline of a different height than a surface of the flat portion, and also having a rear surface or a rear side ridgeline of a different height than a rear surface of the flat portion, and connecting portions that are bridged from the stepped portions to the flat portion.

Normal stresses that are applied respectively to the flat portion and to the stepped portion of the pressure sensor are converted by the stress direction converter into stresses of a direction parallel to the longitudinal direction of the optical fiber, and after conversion thereof, the converted stresses are transmitted to the gratings via the stress transmitting section.

In accordance therewith, because large strains are generated in the gratings, and the wavelength (reflected wavelength) of light reflected at the gratings changes significantly, by detecting a shift amount in the reflected wavelength at the gratings, normal stresses can easily be detected.

Still further, an end effector according to the present invention comprises a pressure sensor having a flexible sheet and an optical fiber sensor, the optical fiber sensor including a stress detection sensor made up from an optical fiber in which gratings are arrayed that reflect light of a specified wavelength, and a stress direction converter for converting external stresses applied from a body in contact with the sheet in a direction different from the longitudinal direction of the optical fiber into stresses of a direction which is parallel with the gratings arrayed, and transmitting the stresses to the gratings. The end effector further comprises a gripping member for gripping the body. In the gripping member, the pressure sensor is disposed at a contact location with the body, and the stress direction converter includes a flat portion which extends in parallel with the longitudinal direction, and to which stresses are applied from the body in the different direction, and a stress transmitting section that is bridged from the flat portion to the optical fiber. One end of the optical fiber, through which light of the specified wavelength reflected by the gratings is transmitted, is disposed along the stress transmitting section.

In accordance with the above structure, in an end effector including a pressure sensor disposed in a gripping member thereof, with a comparatively simple structure, stresses (normal stresses, horizontal stresses) applied from a body are capable of being segregated into multiple directions (normal direction, horizontal direction) and detected. For example, with the end effector, using reflected light (one output signal) output from a single optical fiber, both normal stresses and horizontal stresses can easily be detected.

Further, if at least one of a projection and a groove is formed on the flat portion, the detection sensitivity of horizontal stresses can be improved.

Furthermore, according to the present invention, a method of detecting stresses is provided, using an optical fiber sensor made up from an optical fiber in which gratings are arrayed that reflect light of a specified wavelength, and wherein at least one bent portion is disposed at a location where light of the specified wavelength reflected by the gratings is transmitted. In the case that stresses are applied from an exterior, the method comprises the steps of, when a normal stress is applied from the exterior, subjecting the gratings to strains accompanying application of the normal stress, and detecting the normal stress based on a shift amount of reflected wavelengths of the light caused by the strains in the gratings, and when a horizontal stress is applied from the exterior, causing the bent portion to change accompanying application of the horizontal stress, and detecting the horizontal stress based on an amount of change in the reflected wave intensity of the light caused by the change in the bent portion.

In accordance with the above method, when normal stresses are applied from a body with respect to the flat portion of the optical fiber sensor, as a result of strains generated in the gratings, the wavelength (reflected wavelength) of light reflected at the gratings changes. Accordingly, such normal stresses are capable of being detected by detecting a shift amount of the reflected wavelengths at the gratings.

Further, when horizontal stresses are applied from a body with respect to the flat portion of the optical fiber sensor, as a result of changes caused in the bent portion, bending losses are generated in the optical fiber. As a result of generation of such bending losses, the intensity (reflected wave intensity) of reflected light that passes through the one end of the optical fiber and is radiated out to the exterior changes. Consequently, by detecting an amount of change in the reflected wave intensity caused by the bending loss, the horizontal stress corresponding to the reflected wave intensity can be detected.

More specifically, according to the stress detecting method in which an optical fiber sensor or a pressure sensor and end effector having such an optical fiber sensor are used, by means of a simple structure made up from gratings and the bent portion, using reflected light (one output signal) output from a single optical fiber, both normal stresses and horizontal stresses can easily be detected.

In the aforementioned method of detecting stresses, the optical fiber sensor comprises a stress direction converter for converting stresses applied from an exterior into stresses of a direction in which the gratings are arrayed, and transmitting the stresses to the optical fiber. The stress direction converter includes a flat portion to which stresses are applied from the exterior, and a stress transmitting section that is bridged from the flat portion to the optical fiber, and further, in the case that the bent portion is provided by disposing one end of the optical fiber, through which light of the specified wavelength reflected by the gratings is transmitted, along the stress transmitting section, the method further comprises the steps of, when a normal stress is applied from the exterior, the stress direction converter subjecting the gratings to strains, and when a horizontal stress is applied from the exterior, the stress direction converter causing displacement of the optical fiber, thereby causing the bent portion to change.

More specifically, when normal stresses are applied from a body with respect to the flat portion, the stress direction converter converts the normal stresses into stresses of a direction along which the gratings are arrayed, whereupon strains are caused in the gratings due to such stresses after conversion thereof. As a result, the wavelength (reflected wavelength) of light reflected at the gratings can be subjected to greater changes, whereby normal stresses can be detected more easily.

Furthermore, when horizontal stresses are applied from a body with respect to the flat portion, at least the side of the stress transmitting section proximate the flat portion is displaced together with the flat portion, and the bent portion at the end of the optical fiber changes (i.e., is bent or flexed) accompanying such displacement, whereby bending losses are generated in the optical fiber. Owing thereto, the intensity of reflected light (reflected wave intensity) of the reflected light that passes through the one end of the optical fiber and is radiated out to the exterior can be subjected to even greater changes, whereby horizontal stresses can be detected more easily.

As described above, according to the present invention, with a comparatively simple structure, stresses (normal stresses, horizontal stresses) applied from a body can be segregated and detected in a plurality of directions (normal direction, horizontal direction). More specifically, with the present invention, using reflected light (one output signal), which is output from a single optical fiber, both normal stresses and horizontal stresses can be detected.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

An optical fiber sensor, a pressure sensor including such an optical fiber sensor, and an end effector including the pressure sensor, as well as a stress detecting method using such an optical fiber sensor, pressure sensor and end effector (first through third embodiments) according to the present invention shall be described with reference to FIGS. 1A through 42 of the accompanying drawings.

Outline of Stress Detection Principles Using the Optical Fiber Sensor:

Prior to explanations of the first through third embodiments, outline principles for detection of stresses using an FBG (Fiber Bragg Grating) sensor as an optical fiber sensor shall be explained with reference to FIGS. 1A through 1D.

Figure 1A:
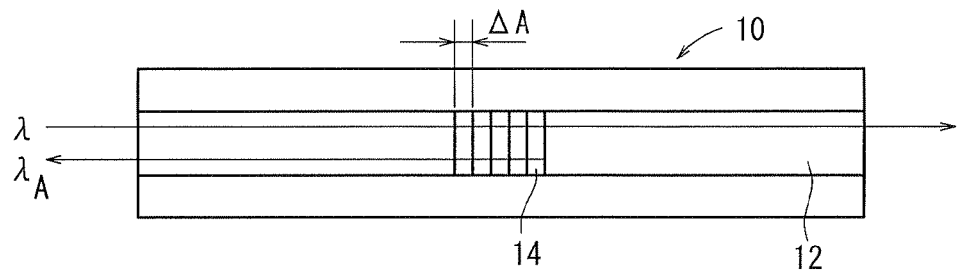
FIG. 1A is an outline explanatory view of an FBG sensor.

The FBG sensor is constructed by forming gratings 14, which are irradiated with ultraviolet rays, in a portion of a core 12 to which Ge has been added in an optical fiber 10. In FIG. 1A, the period (lattice spacing) of the gratings 14 is shown by $\Delta_A$.

Figure 1B:
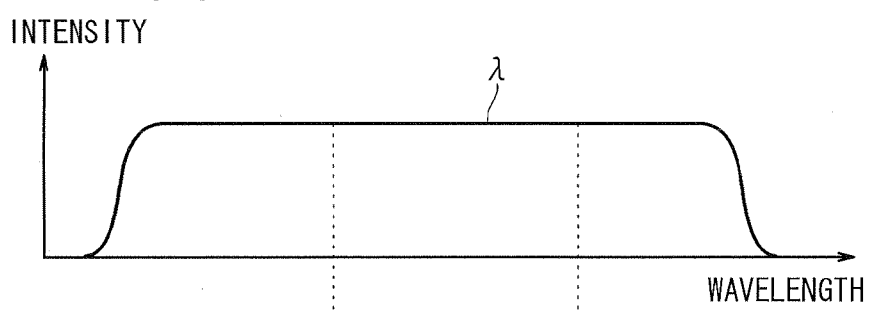
FIG. 1B is an explanatory view showing a relationship between wavelength and intensity of light incident on the FBG sensor.

In a condition where stresses are not applied to the optical fiber 10, in the case that light (incident light) having wavelengths and intensity as shown in FIG. 1B is incident on the core 12, the gratings 14 reflect light (reflected light) of a specific wavelength $\lambda_A$ (see FIG. 1C) from among the wavelengths λ shown in FIG. 1B.

Figure 1C:
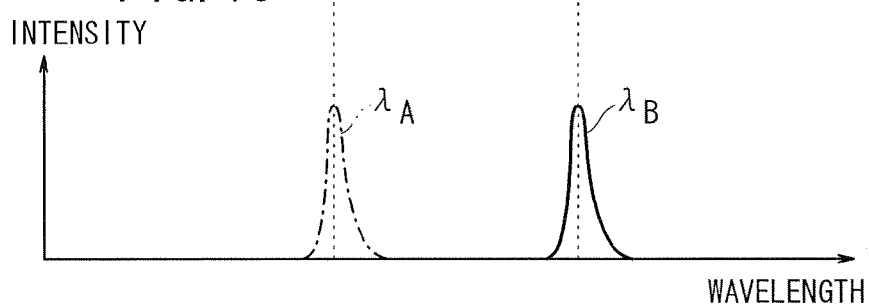
FIG. 1C is an explanatory view showing a relationship between wavelength and intensity of light reflected by gratings (reflected light)
Figure 1D:
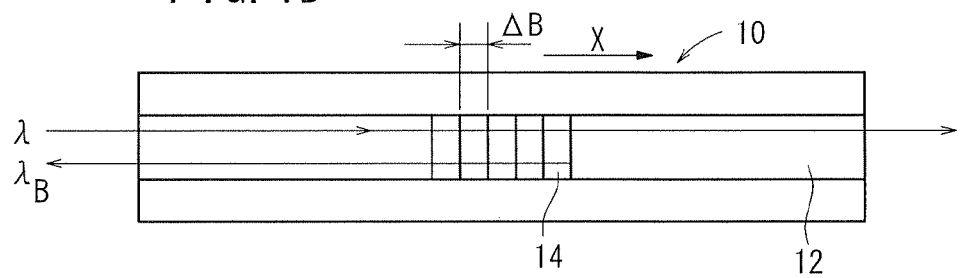
FIG. 1D is an outline explanatory view of an FBG sensor in which gratings thereof are expanded.

On the other hand, as shown in FIG. 1D, when stresses are applied to the optical fiber 10, the lattice spacing of the gratings 14 changes from $\Delta_A$ to $\Delta_B$ ($\Delta_A$ to $\Delta_B$), and the wavelength (reflected wavelength) of the reflected light shifts from $\lambda_A$ to $\lambda_B$ (see FIG. 1C).

The reflected wavelength $\lambda_A$ prior to application of stresses and the reflected wavelength $\lambda_B$ when stresses are applied, taking $n_{eff}$ to be the effective refractive index of the core 12, are expressed by the following equations (1) and (2).

$$\lambda_A = 2 \times n_{eff} \times \Delta_A \quad (1)$$

$$\lambda_B = 2 \times n_{eff} \times \Delta_B \quad (2)$$

In this manner, the reflected wavelengths $\lambda_A$, $\lambda_B$ are determined by the lattice spacing $\Delta_A$, $\Delta_B$. Further, the initial lattice spacing $\Delta_A$ prior to application of stresses is set optionally corresponding to system specifications and intended usage.

Accordingly, using the FBG sensor 22, based on the shift amount ($\lambda_B - \lambda_A$) of the reflected wavelengths from $\lambda_A$ to $\lambda_B$, stresses applied to the optical fiber 10 can be detected, and the presence or absence of stresses can be determined.

First Embodiment

Next, with reference to FIGS. 2 through 12, explanations shall be given concerning a pressure sensor 16 according to a first embodiment of the present invention, and an FBG sensor 22 incorporated into the pressure sensor 16.

Figure 2:
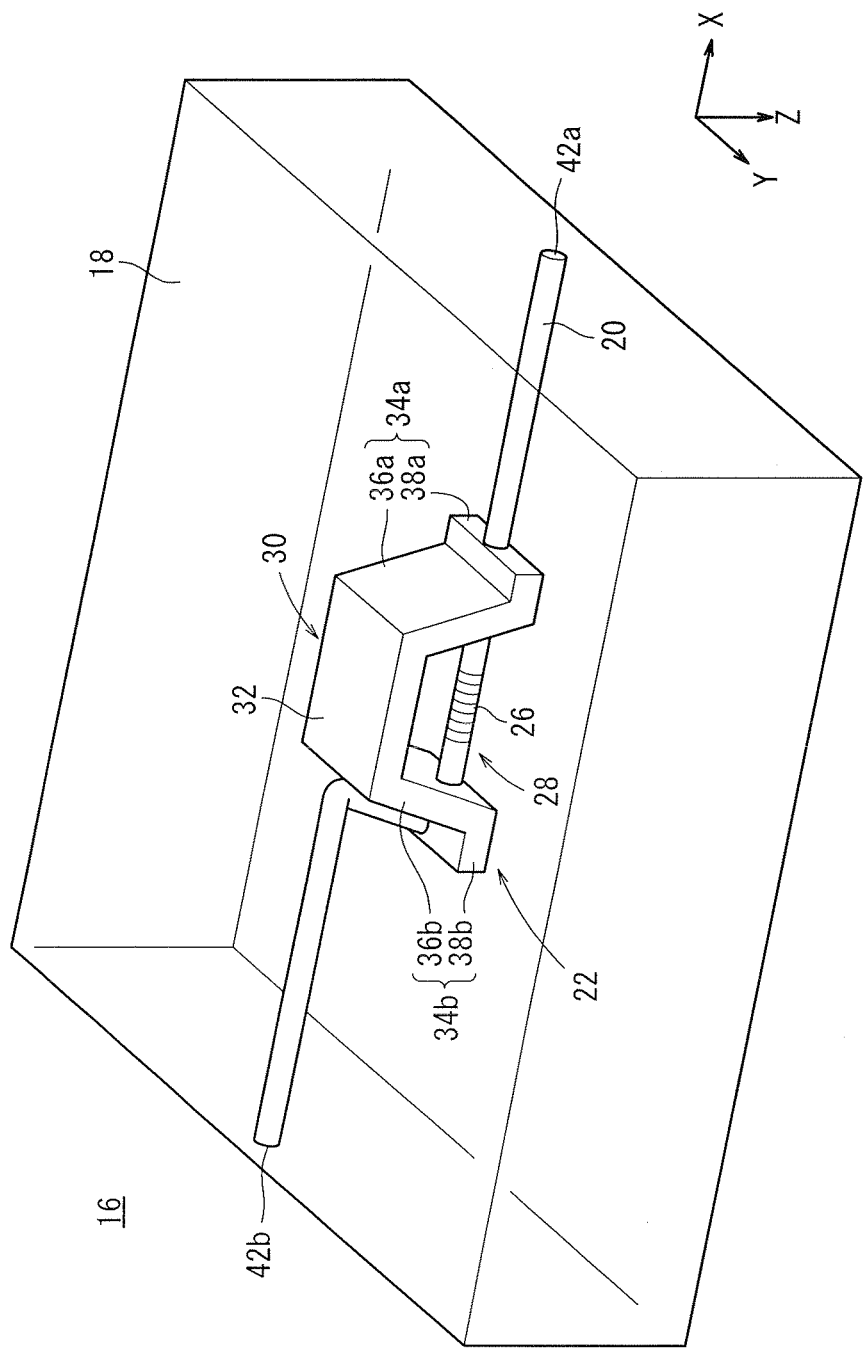
FIG. 2 is a perspective view of a pressure sensor, in which an FBG sensor according to a first embodiment is disposed in a sheet.

As shown in FIG. 2, the pressure sensor 16 is constituted by embedding a single optical fiber cable 20 having a longitudinal direction along the X-direction in the interior of a sheet 18 having a given flexibility, and by forming an FBG sensor 22 in the optical fiber cable 20. More specifically, the sheet 18 is formed by molding the FBG sensor 22 using a material possessing flexibility such as plastic or the like. In this case, the sheet 18 is formed such that the FBG sensor 22 is fixed in the interior of the sheet 18, in order to protect the FBG sensor 22 from excessive stresses, heat and the like, which may be applied from the exterior.

In FIG. 2, although a case is shown in which one individual FBG sensor 22 is disposed in the sheet 18, the number of FBG sensors 22 embedded in the sheet 18 is not limited to one. For example, the FBG sensor 22 may be disposed in plurality, in a matrix form along the X-direction and the Y-direction (surface direction of the sheet 18), with addresses being assigned to each of the sensors. Further, the longitudinal direction of the optical fiber cable 20 is not limited to being in the X-direction, but may be in the Y-direction as well. In either case, an acceptable situation results if at least one FBG sensor 22 is disposed in the interior of the sheet 18.

Next, the FBG sensor 22 will be described in detail with reference to FIGS. 2 through 4.

The FBG sensor 22 comprises a stress detection sensor 28 disposed substantially centrally in the interior of the sheet 18 and including the optical fiber cable 20 in which gratings 26 are formed, and a stress direction converter 30, which receives through the sheet 18 stresses (normal stresses, horizontal stresses) that are applied from the exterior to the sheet 18, converts the received stresses into stresses (components) of a direction along the direction in which the gratings 26 are arrayed (i.e., the X-direction, which is the longitudinal direction of the optical fiber cable 20), and then transmits the converted stresses to the optical fiber cable 20.

In this case, the stress direction converter 30, which serves as a receptive material with respect to stresses applied from the exterior, is made from a flexible body such as rubber, resin or the like, and has a rectangular flat portion 32 that extends substantially parallel with the gratings 26 along the X-Y direction, and stress transmitting sections 34a, 34b that are bridged from two opposing sides along the X-direction of the flat portion 32 to respective ends of the gratings 26.

Figure 3:
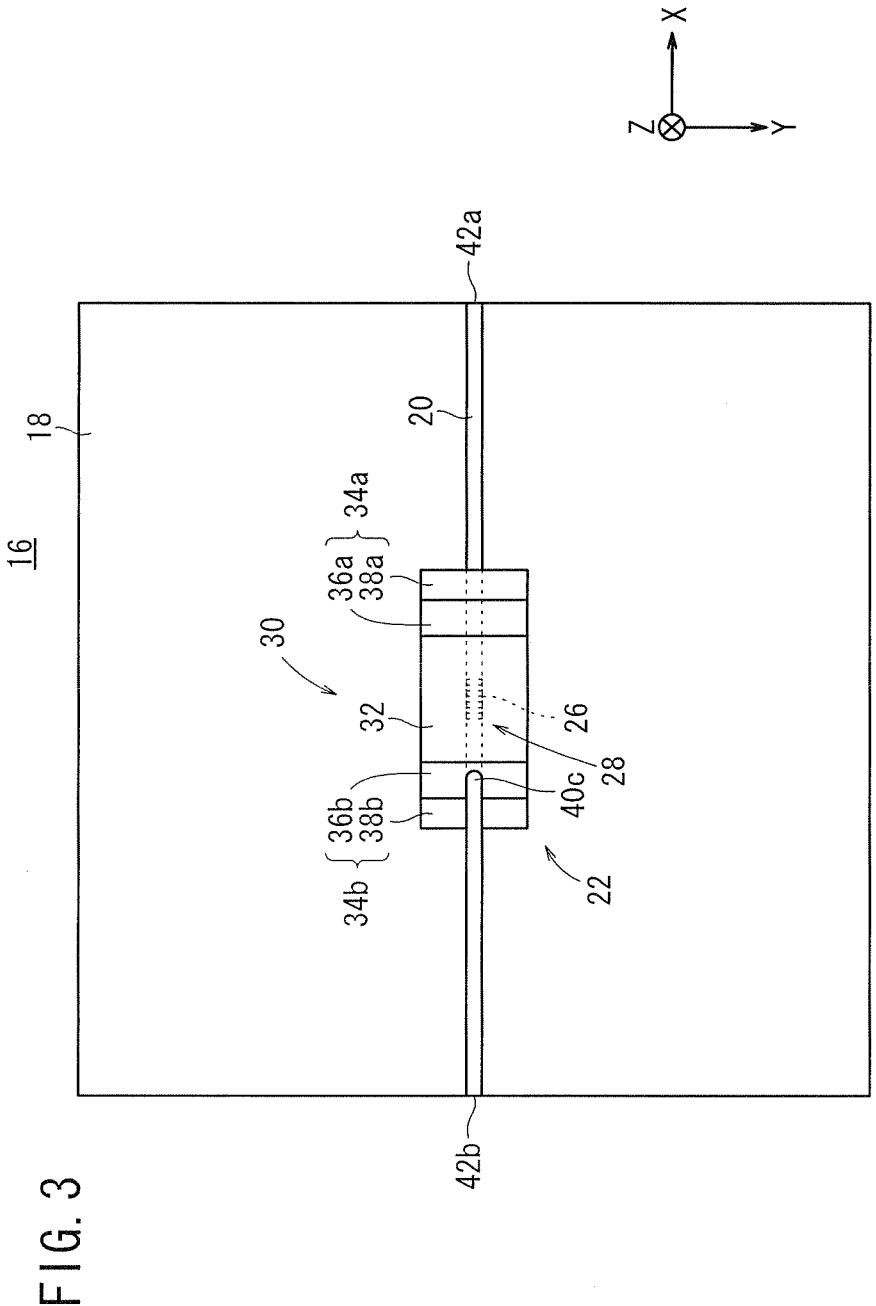
FIG. 3 is a plan view of the pressure sensor shown in FIG. 2.
Figure 4:
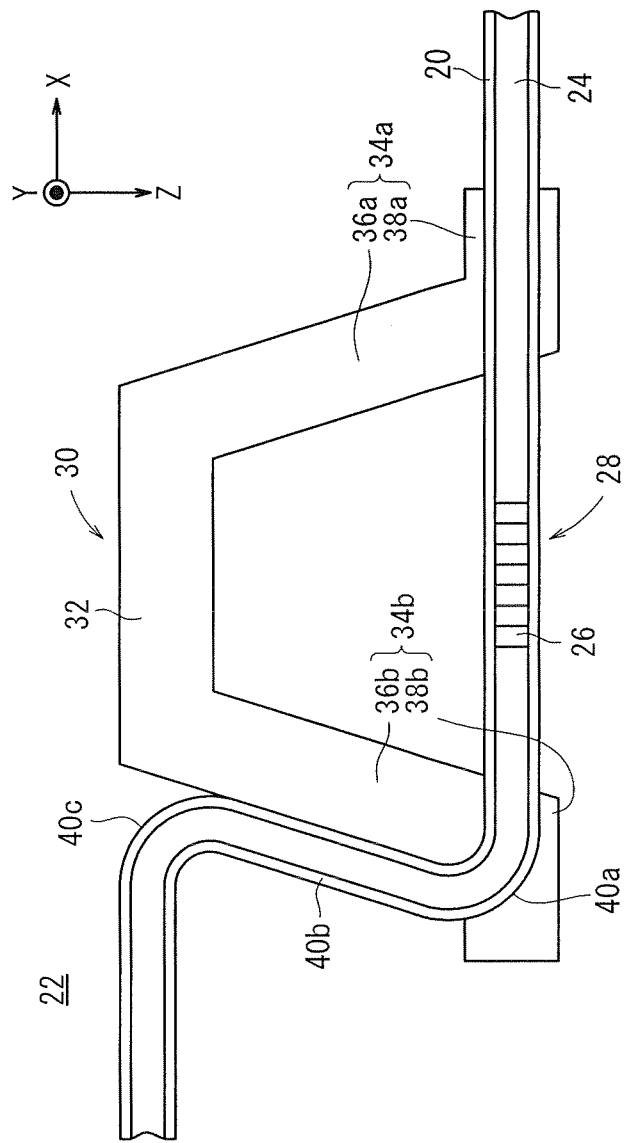
FIG. 4 is an outline explanatory view of the FBG sensor shown in FIG. 2.
Figure 5:
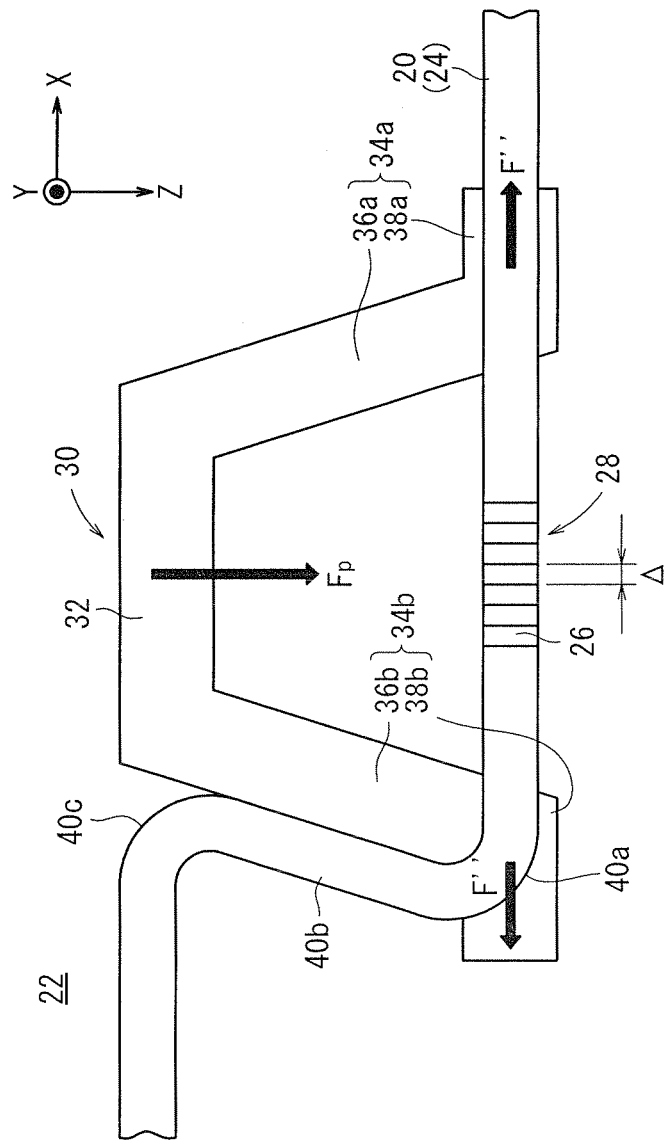
FIG. 5 is a view for explaining detection principles of normal stresses by the FBG sensor of FIGS. 2 through 4.

Under a state in which stresses are not applied thereto, the stress direction converter 30 is constructed with left-right (lateral) symmetry with the gratings 26 in the center, as shown in FIGS. 3 and 4. More specifically, the stress transmitting sections 34a, 34b include, respectively, inclined sections 36a, 36b that are joined with the flat portion 32 and are inclined toward (in the vicinity of opposite end sides of) the optical fiber cable 20, and joint sections 38a, 38b that are connected to the inclined sections and surround portions on the outer circumferential surface of the optical fiber cable 20. Further, as shown in FIGS. 4 and 5, the angles defined between the flat portion 32 and each of the inclined sections 36a, 36b are set mutually equal to each other, and additionally, the angles defined between the inclined sections 36a, 36b and the joint sections 38a, 38b are set mutually equal to each other.

A portion (one end portion) of the optical fiber cable 20 is disposed on and along the inclined section (first inclined section) 36b of the stress transmitting section 34b. In this case, the portion of the optical fiber cable 20 is made up from a bent portion 40a which is exposed from the joint section (first joint section) 38b and is bent (or flexed) toward the inclined section 36b, an inclined portion 40b that is connected to the bent portion 40a and is positioned along the inclined section 36b, and another bent portion 40c that is connected to the inclined portion 40b and is bent (or flexed) toward the X-direction. Further, because the FBG sensor 22 is formed in the sheet 18 by molding from a material having a given flexibility, in the interior of the sheet 18, the inclined portion 40b is disposed along the inclined section 36b in a state of being fastened to the inclined section 36b.

As shown in FIGS. 2 and 3, on two opposing side surfaces along the X-direction in the sheet 18, input/output terminals 42a, 42b of the optical fiber cable 20, which are capable of receiving light incident thereon and outputting light, are exposed respectively to the exterior. Accordingly, although the optical fiber cable 20 is embedded in the interior of the sheet 18 with the X-direction as the longitudinal direction thereof, a location that extends from the input/output terminal 42a via the gratings 26 and to the bent portion 40a, and a location from the bent portion 40c to the input/output terminal 42b are disposed at different heights as a result of the inclined portion 40b being disposed along the inclined section 36b (see FIGS. 2 and 4).

Further, in FIGS. 2 through 4, although it is shown that the bent portion 40a, the inclined portion 40b and the bent portion 40c are formed on the inclined section 36b and the joint section 38b of the stress transmitting section 34b, in place of this structure, the bent portion 40a, the inclined portion 40b and the bent portion 40c may formed on the inclined section (second inclined section) 36a and the joint section (second joint section) 38a of the stress transmitting section 34a.

Figure 6:
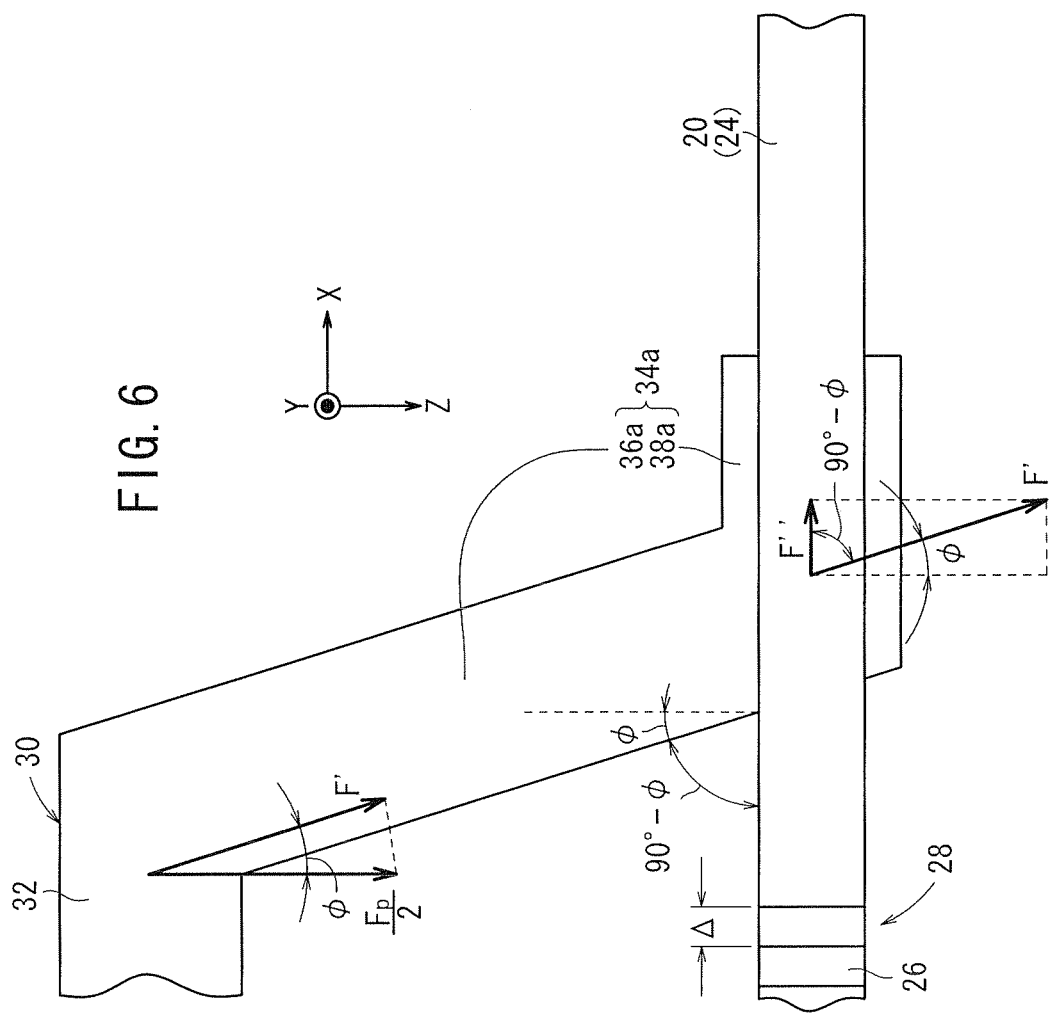
FIG. 6 is a partially enlarged explanatory view of a stress transmitting section and an optical fiber shown in FIG. 5.
Figure 7:
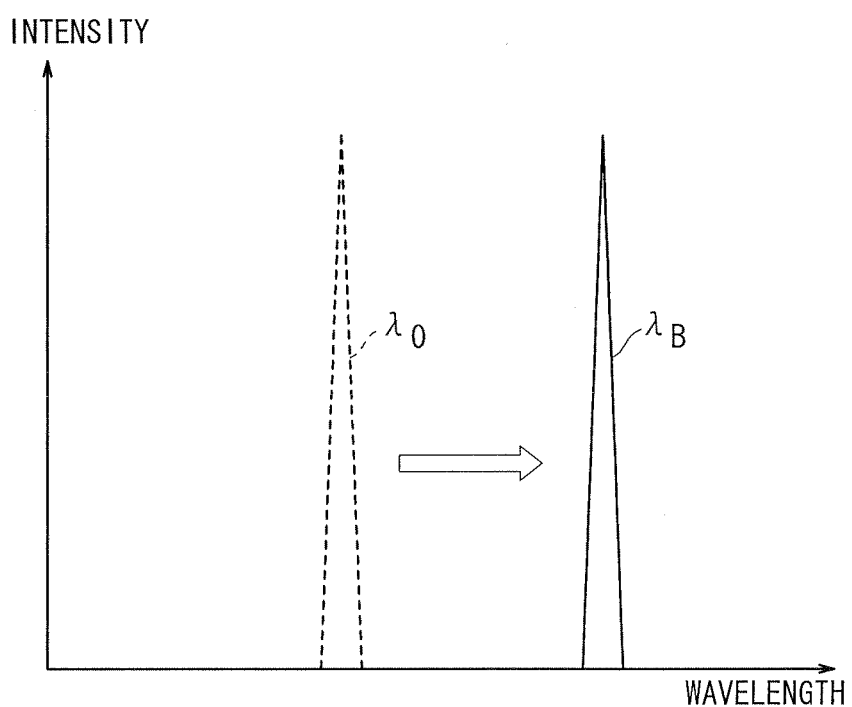
FIG. 7 is an explanatory view showing a relationship between wavelength and intensity of reflected light at a time when normal stresses are detected by the FBG sensor of FIGS. 2 through 4.

Next, descriptions shall be given with reference to FIGS. 5 through 7 concerning detection of normal stresses when a non-illustrated body is brought into contact with a surface of the sheet 18 above the FBG sensor 22, and such normal stresses (stresses in the Z-direction) are applied from the body to the gratings 26.

As noted above, because the shape of the stress direction converter 30 prior to application of stresses is constructed with left-right (lateral) symmetry about the gratings 26 (see FIGS. 3 and 4), when a normal stress $F_p$ is applied from the body along the Z-direction to the sheet 18, ideally, stresses $F_p/2$ along the Z-direction are applied respectively to each of the stress transmitting sections 34a, 34b of the stress direction converter 30.

Herein, if angles defined by the Z-direction (stresses $F_p/2$) and the inclined sections 36a, 36b are taken respectively as φ, then the component (force) F' of the stress $F_p/2$ in a direction along the inclined sections 36a, 36b is given by the following equation (3).

$$F' = (F_p/2) \times \cos\phi \quad (3)$$

Further, because the angle formed by the force F' and the longitudinal direction (X-direction) of the optical fiber cable 20 is defined by (90°−φ), the force (stress) F" which is applied respectively to each of adjoined portions between the optical fiber cable 20 and the joint sections 38a, 38b is expressed by the following equation (4).

$$\begin{aligned} F'' &= F'\cos(90° - \phi) \\ &= F'\sin\phi \\ &= (F_p/2) \times \cos\phi \times \sin\phi \end{aligned} \quad (4)$$

Accordingly, the force applied to the gratings 26 due to the forces F" applied to each of the adjoined portions can be represented by the following equation (5).

$$F'' + F'' = 2F'' = F_p \times \cos\phi \times \sin\phi \quad (5)$$

By application of the force 2F" to the gratings 26, the gratings 26 are subjected to strains (stretching) in the X-direction, such that the lattice spacing of the gratings 26 changes (increases).

Herein, if the Young's modulus of the core 24 of the optical fiber cable 20 is given by E, the strain ε in the gratings 26 generated along the X-direction by application of the force 2F" is expressed by the following equation (6).

$$\begin{aligned} \varepsilon &= (1/E) \times (F'' + F'') \\ &= (1/E) \times F_p \cos\phi \times \sin\phi \end{aligned} \quad (6)$$

Further, when the grating number (lattice number) of the gratings 26 is set provisionally at N, the additive amount (increment) Δ to the lattice spacing of the gratings 26 is expressed by the following equation (7).

$$\Delta = \varepsilon/(N-1) \quad (7)$$
$$= (F_p \times \cos\phi \times \sin\phi)/\{E \times (N-1)\}$$

Accordingly, the reflected wavelength λ in the gratings 26 after application of the normal stress $F_p$, considering the increment Δ given by equation (7), and based on equation (2), is expressed by the following equation (8).

$$\lambda = 2 \times n_{\mathit{eff}} \times \Delta \quad (8)$$
$$= 2 \times n_{\mathit{eff}} \times (F_p \times \cos\phi \times \sin\phi)/\{E \times (N-1)\}$$

FIG. 7 is an explanatory drawing showing a wavelength change of reflected light before and after application of normal stresses F, in a case where incident light from the input/output terminal 42*a* or the input/output terminal 42*b* (see FIGS. 2 and 3) is incident thereon, whereas reflected light from the gratings 26 is output from the input/output terminal 42*a* or the input/output terminal 42*b*.

In a state where normal stresses $F_p$ are not being applied, the gratings 26 reflect light of a reflected wavelength $\lambda_0$ with respect to the incident light, and reflected light is radiated out to the exterior from the input/output terminal 42*a* or the input/output terminal 42*b*. In contrast thereto, in the case that normal stresses $F_p$ are applied, since the lattice spacing of the gratings 26 increases and the reflected wavelength is shifted to λ, the gratings 26 reflect light of a wavelength λ with respect to the incident light, and such reflected light is radiated out to the exterior from the input/output terminal 42*a* or the input/output terminal 42*b*.

Accordingly, using the FBG sensor 22 and the pressure sensor 16, and based on the shift amount $(\lambda-\lambda_0)$ from $\lambda_0$ to λ, normal stresses $F_p$ applied to the sheet 18 can be detected.

Next, with reference to FIGS. 8 through 12, explanations shall be given concerning detection of horizontal stresses at a time when a non-illustrated body comes into contact with a surface of the sheet 18 above the FBG sensor 22, and horizontal stresses (e.g., stresses along the X-direction) are applied from the body to the gratings 26.

A case will be described in which incident light, which is incident from the input/output terminal 42*b*, is directed to the gratings 26 via the bent portion 40*c*, the inclined portion 40*b* and the bent portion 40*a*, whereas light (reflected light) that is reflected by the gratings 26 is radiated out to the exterior from the input/output terminal 42*b* via the bent portion 40*a*, the inclined portion 40*b* and the bent portion 40*c*.

Figure 8:
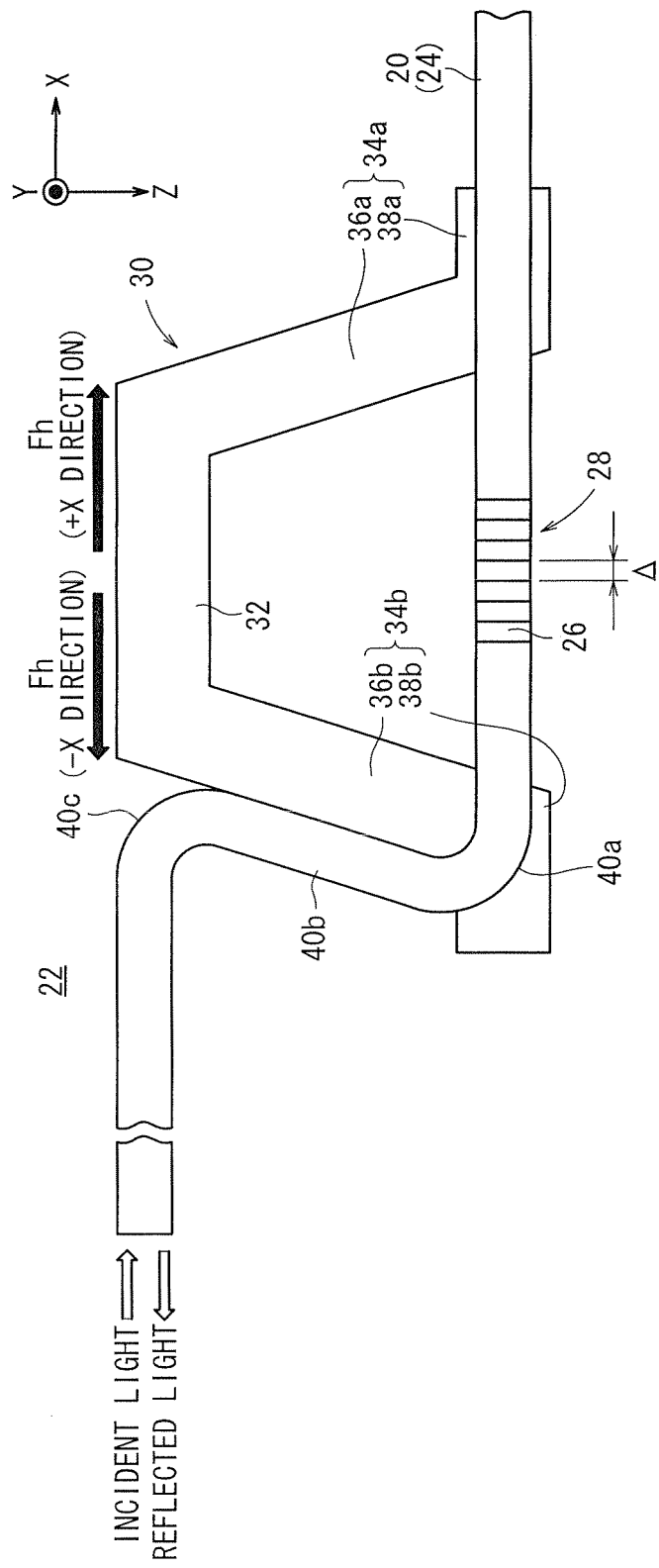
FIG. 8 is a view for explaining detection principles of horizontal stresses by the FBG sensor of FIGS. 2 through 4.

As shown in FIG. 8, for example, when a horizontal stress $F_h$ is applied to the sheet 18 along the positive X-direction, the horizontal stress $F_h$ is transmitted via the sheet 18 to the flat portion 32, and the flat portion 32 is displaced in the positive X-direction by the horizontal stress $F_h$.

In this case, one end of the inclined section 36*b* is connected to the flat portion 32, whereas the other end thereof is connected to the joint section 38*b*. Further, the inclined portion 40*b* of the optical fiber cable 20 is disposed in a state of being fastened to the inclined section 36*b* along the inclined section 36*b*, and the joint section 38*b* is joined with the bent porting 40*a* of the optical fiber cable 20. Accordingly, accompanying displacement of the flat portion 32 in the positive X-direction by the horizontal stress $F_h$, the inclined section 36*b* and the inclined portion 40*b* are displaced integrally therewith in the positive X-direction.

Figure 9:
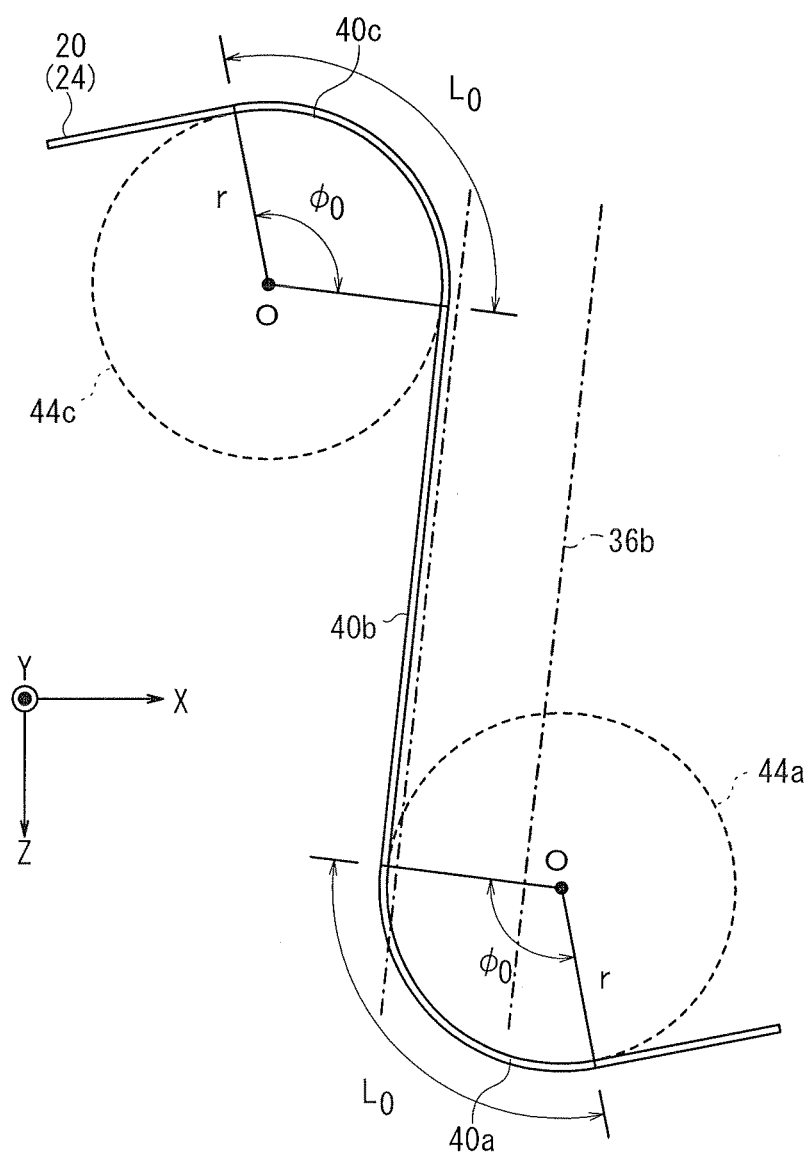
FIG. 9 is a schematic explanatory view for explaining detection principles of horizontal stresses by the FBG sensor of FIGS. 2 through 4.
Figure 10:
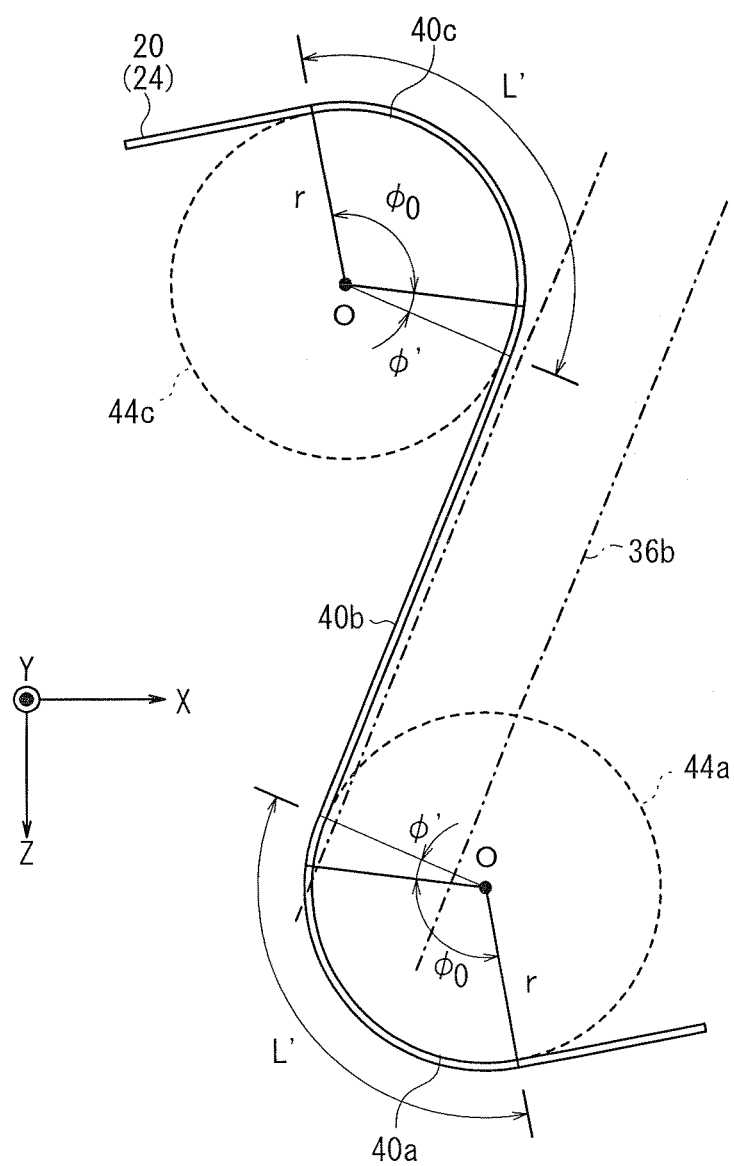
FIG. 10 is a schematic explanatory view for explaining detection principles of horizontal stresses by the FBG sensor of FIGS. 2 through 4.
Figure 11:
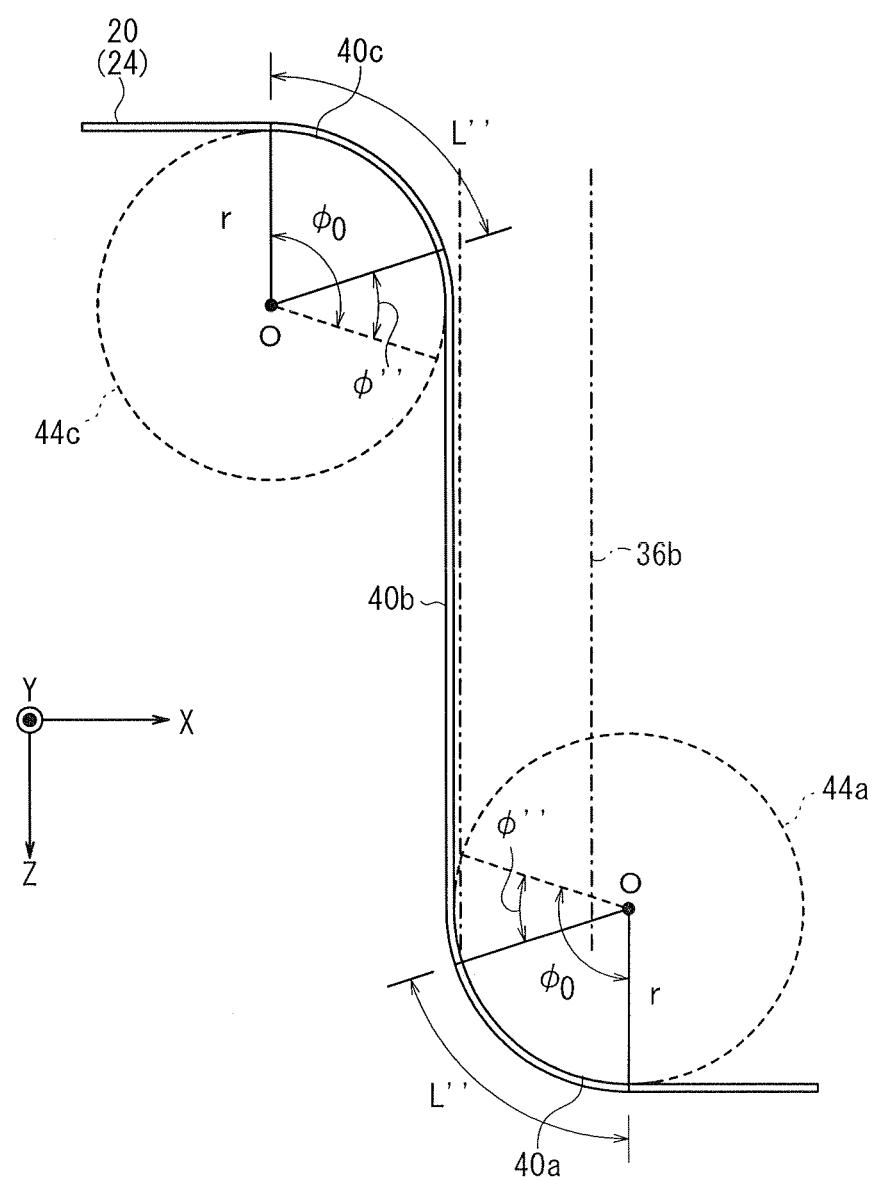
FIG. 11 is a schematic explanatory view for explaining detection principles of horizontal stresses by the FBG sensor of FIGS. 2 through 4.

FIGS. 9 through 11 are schematic explanatory views showing displacement of the inclined section 36*b* and the inclined portion 40*b* accompanying application of horizontal stresses $F_h$ to the flat portion 32. FIG. 9 illustrates a state of the inclined section 36*b* and the inclined portion 40*b* prior to application of horizontal stresses $F_h$ thereto. FIG. 10 illustrates a state of the inclined section 36*b* and the inclined portion 40*b* when horizontal stresses $F_h$ are applied thereto in the positive X-direction (the rightward direction in FIG. 10), and FIG. 11 illustrates a state of the inclined section 36*b* and the inclined portion 40*b* when horizontal stresses $F_h$ are applied thereto in the negative X-direction (the leftward direction in FIG. 11).

In order to simplify explanations thereof, as shown in FIG. 9, in a condition prior to application of horizontal stresses $F_h$, the bent portions 40*a*, 40*c* are configured as portions of imaginary circles 44*a*, 44*c* of radii r. At that time, lengths of the bent portions 40*a*, 40*c* (i.e. arcs constituting portions of the circles 44*a*, 44*b*) are taken as $L_0$, and angles subtended by the arcs are taken as $\phi_0$ [radians].

In this case, the lengths $L_0$ of the arcs (bent portions 40*a*, 40*c*) are represented by the following equation (9).

$$L_0 = \{\phi_0/(2\times\pi)\}\times 2\times\pi\times r = \phi_0 \times r \quad (9)$$

Further, assuming the bending loss per unit length of the optical fiber cable 20 resultant from the curvature of radius r is given by P, in each of the bent portions 40*a*, 40*c*, the bending loss generated in the two arcs of length $L_0$, respectively, can be represented by the following equation (10).

$$P \times L_0 = P \times \phi_0 \times r \quad (10)$$

Furthermore, incident light that is incident from the input/output terminal 42*b* is directed through the passage input/output terminal 42*b*→bent portion 40*c*→inclined portion 40*b*→bent portion 40*a*→gratings 26, whereas the reflected light reflected at the gratings 26 is radiated out to the exterior through the passage gratings 26→bent portion 40*a*→inclined portion 40*b*→bent portion 40*c*→input/output terminal 42*b*. In other words, when the optical fiber cable 20 is observed from the input/output terminal 42*b*, the incident light and the reflected light pass through a total of four locations where bending losses are generated, i.e., two locations of the bent portion 40*c* and the bent portion 40*a* through which the incident light passes, and another two locations of the bent portion 40*a* and the bent portion 40*c* through which the reflected light passes.

Accordingly, the total losses relating to bending of the optical fiber cable 20 when horizontal stresses $F_h$ are not applied can be expressed by the following formula (11).

$$4 \times P \times \phi_0 r \quad (11)$$

If the intensity of reflected light (reflected wave intensity) in a situation where the optical fiber cable 20 is not bent is taken as $P_{max}$, whereas the reflected wave intensity at a time when horizontal stresses $F_h$ are not applied and the aforementioned bent portions 40*a* and 40*c* (bends) are present (see FIG. 9) is taken as $P_0$, then the reflected wave intensity $P_0$ is expressed by the following equation (12).

$$P_0 = P_{max} - 4 \times P \times \phi_0 \times r \quad (12)$$

Next, as shown in FIG. 10, in the case that a horizontal stress $F_h$ in the positive X-direction is applied with respect to the flat portion 32, then accompanying displacement of the flat portion 32 in the positive X-direction, the inclined section 36*b* and the inclined portion 40*b* proximate the side of the flat portion 32 also are displaced integrally therewith in the positive X-direction. As a result, compared to the case of FIG. 9, the bent portions 40a and 40c are further bent. More specifically, the angles subtended by the arcs of the bent portions 40a, 40c increase from $\phi_0$ to ($\phi_0+\phi'$), and the lengths of the arcs change from $L_0$ to L', where $\phi'$ represents an angular increment of the arcs caused by application of the horizontal stress $F_h$.

The arclength L' is expressed by the following equation (13).

$$L' = \{(\phi_0 + \phi')/(2 \times \pi)\} \times 2 \times \pi \times r \qquad (13)$$
$$= (\phi_0 + \phi') \times r$$

In this case, the bending loss at each of the bent portions 40a, 40c can be expressed by the following equation (14).

$$P \times L' = P \times (\phi_0 + \phi') \times r \qquad (14)$$

Accordingly, similar to formula (11), the total losses related to bending of the optical fiber cable 20 at a time when the horizontal stress $F_h$ is applied in the positive X-direction can be expressed by the following formula (15).

$$4 \times P \times (\phi_0 + \phi') \times r \qquad (15)$$

Additionally, if the reflected wave intensity at a time when the horizontal stress $F_h$ is applied in the positive X-direction is taken as P', then similar to equation (12), the reflected wave intensity P' is expressed by the following equation (16).

$$P' = P_{max} - 4 \times P \times (\phi_0 + \phi') \times r \qquad (16)$$

Accordingly, from equations (12) and (16), the difference ($P_0$-P') in the reflected wave intensity before and after application of the horizontal stress $F_h$ is expressed by the following equation (17).

$$P_0 - P' = 4 \times P \times \phi' \times r \qquad (17)$$

Stated otherwise, equation (17) indicates the amount of change in the reflected wave intensity at a time when the horizontal stress $F_h$ is applied in the positive X-direction, as shown in FIG. 10.

Next, as shown in FIGS. 8 and 11, in the case that a horizontal stress $F_h$ is applied in the negative X-direction with respect to the flat portion 32, then accompanying displacement of the flat portion 32 in the negative X-direction, the inclined section 36b and the inclined portion 40b proximate the side of the flat portion 32 also are displaced integrally therewith in the negative X-direction, and compared to the case of FIG. 9, the degree of the bent portions 40a, 40c becomes less. More specifically, the angles subtended by the arcs of the bent portions 40a, 40c decrease from $\phi_0$ to ($\phi_0-\phi''$), and the lengths of the arcs change from $L_0$ to L", where $\phi''$ represents an angular decrement of the arcs caused by application of the horizontal stress $F_h$ in the negative X-direction.

The arc length L" is expressed by the following equation (18).

$$L'' = \{(\phi_0 + \phi'')/(2 \times \pi)\} \times 2 \times \pi \times r \qquad (18)$$
$$= (\phi_0 + \phi'') \times r$$

In this case, similar to equation (14) the bending loss at each of the bent portions 40a, 40c can be expressed, respectively, by the following equation (19).

$$P \times L'' = P \times (\phi_0 - \phi'') \times r \qquad (19)$$

Accordingly, similar to formula (15), the total losses related to bending of the optical fiber cable 20 at a time when the horizontal stress $F_h$ is applied in the negative X-direction can be expressed by the following formula (20).

$$4 \times P \times (\phi_0 - \phi'') \times r \qquad (20)$$

Additionally, if the reflected wave intensity at a time when the horizontal stress $F_h$ is applied in the negative X-direction is taken as P''', then similar to equation (16), the reflected wave intensity P''' is expressed by the following equation (21).

$$P''' = P_{max} - 4 \times P \times (\phi_0 - \phi'') \times r \qquad (21)$$

Accordingly, from equations (12) and (21), the difference ($P'''-P_0$) in the reflected wave intensity before and after application of the horizontal stress $F_h$ is expressed by the following equation (22).

$$P''' - P_0 = 4 \times P \times \phi'' \times r \qquad (22)$$

Stated otherwise, equation (22) indicates the amount of change in the reflected wave intensity at a time when the horizontal stress $F_h$ is applied in the negative X-direction, as shown in FIG. 11.

In the forgoing manner, each of respective reflective wave intensities, in the case that horizontal stresses $F_h$ are not applied (see FIG. 9), in the case that horizontal stresses $F_h$ are applied in a positive X-direction (see FIG. 10), and in the case that horizontal stresses $F_h$ are applied in the negative X-direction (see FIG. 11), are given by $P_0$, P', and P''', respectively, and the reflective wave intensities $P_0$, P', and P''' are determined uniquely by the sizes of the horizontal stresses $F_h$.

Figure 12:
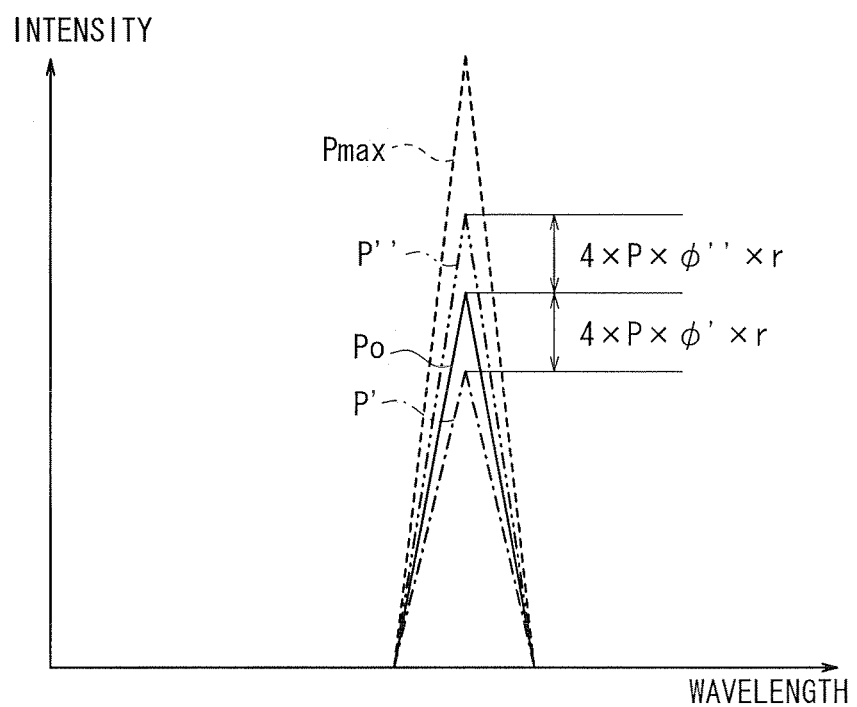
FIG. 12 is an explanatory view showing a relationship between wavelength and intensity of reflected light at a time when horizontal stresses are detected by the FBG sensor of FIGS. 2 through 4.

More specifically, as shown in FIG. 12, at the same wavelength, in contrast to the reflected wave intensity $P_{max}$ in the case that bends do not exist in the optical fiber cable 20, when bends (bent portions 40a, 40c) do exist, the reflected wave intensity changes from $P_{max}$ to $P_0$. Further, in a condition in which the bent portions 40a, 40c are present, when a horizontal stress $F_h$ is applied in the positive X-direction, the reflective wave intensity changes from $P_0$ to P', which is an increase from $P_0$ by the amount $4 \times P \times \phi' \times r$. Furthermore, in a condition in which the bent portions 40a, 40c are present, when a horizontal stress $F_h$ is applied in the negative X-direction, the reflective wave intensity changes from $P_0$ to P''', which is a decrease from $P_0$ by the amount $4 \times P \times \phi'' \times r$.

Accordingly, based on the amounts of change ($P_0$-P') and (P'''-$P_0$) in the reflected wave intensity from $P_0$ to P' and P''', the horizontal stress $F_h$ applied to the sheet 18 can be detected.

Figure 13:
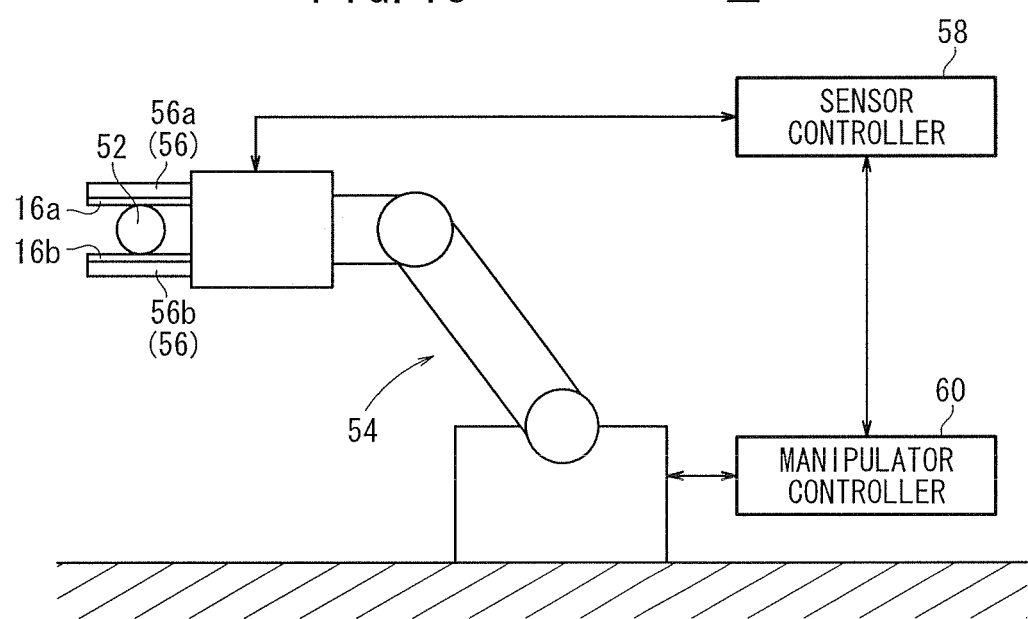
FIG. 13 is a structural view of a robot system to which the pressure sensor shown in FIGS. 2 and 3 is applied.
Figure 14:
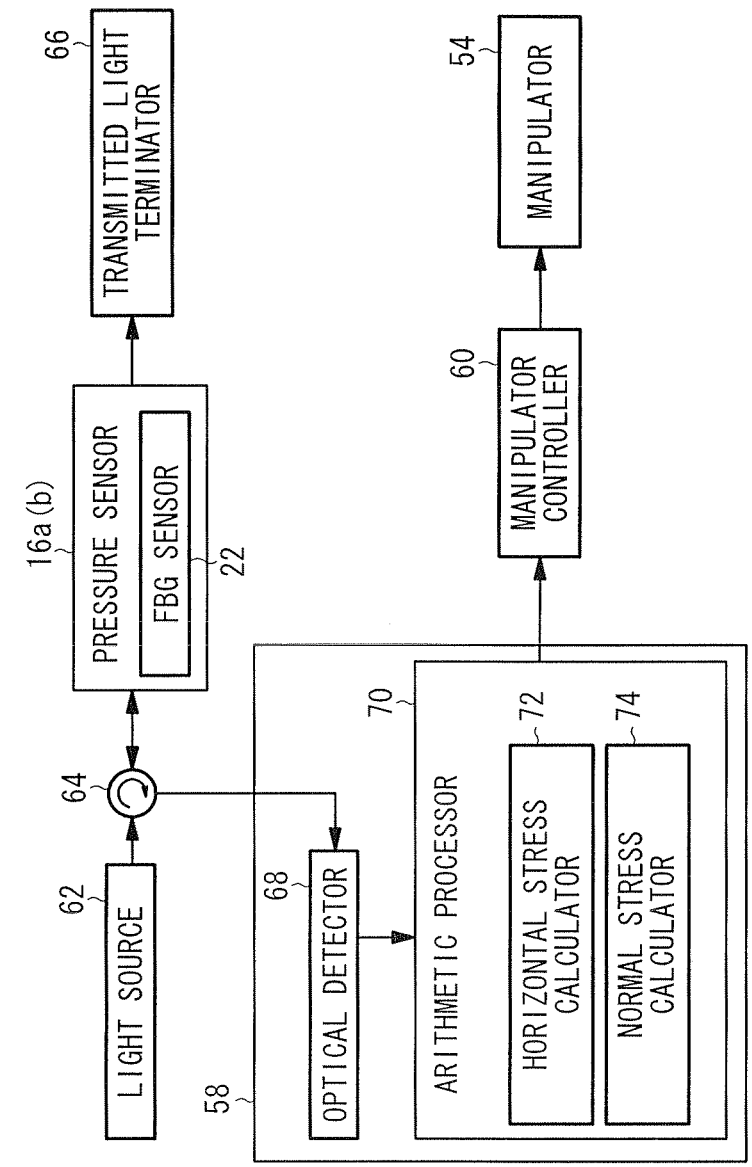
FIG. 14 is a functional block diagram of the robot system of FIG. 13.

Next, explanations shall be made with reference to FIGS. 13 and 14 concerning a robot system (sensor signal processing apparatus) 50, on which the pressure sensor 16 according to the first embodiment is mounted.

The robot system 50 comprises a manipulator 54 for gripping a body 52 and carrying out predetermined processing thereon, pressure sensors 16a, 16b disposed on an end effector 56 (hand members (grippers) 56a, 56b) of the manipulator 54 for detecting a gripped state of the body 52 by the hand members 56a, 56b, a sensor controller 58 for controlling the pressure sensors 16a, 16b and acquiring signals pertaining to horizontal stresses $F_h$ and/or normal stresses $F_p$ that provide information relating to the gripped state of the body 52, and a manipulator controller 60 for controlling the manipulator 54 based on horizontal stress $F_p$ and/or normal stress $F_h$ signals acquired by the sensor controller 58.

In this case, based on horizontal stress $F_h$ signals that are detected by the pressure sensors 16a, 16b while the body 52 is being gripped, the slippage condition of the body 52 with respect to the hand members 56a, 56b can be sensed. Further, based on normal stress $F_p$ signals that are detected by the pressure sensors 16a, 16b while the body 52 is being gripped, the gripping force of the body 52 by the hand members 56a, 56b can be sensed. Accordingly, by controlling the hand members 56a, 56b in accordance with the detected horizontal stresses $F_h$ and/or normal stresses $F_p$, without causing the body 52 to be dropped, the body 52 can be gripped with an appropriate gripping force, and operations can be carried out to move the body to a desired position.

Further, as shown in FIG. 14, in the robot system 50, light (incident light) that is output from a light source 62 is supplied from a light circulator 64 to the optical fiber cable 20 (see FIGS. 2 through 6 and FIGS. 8 through 11) of the pressure sensors 16a, 16b.

From light that is incident from the input/output terminal 42b of the optical fiber cable 20, a portion of the light is reflected by the gratings 26, whereas the remaining light, after having passed through the gratings 26, is directed to a transmitted light optical terminator 66.

Light reflected by the gratings 26 is directed from the light circulator 64 to a light detector 68 of the sensor controller 58, and the light detector 68 converts the peak values of reflected wavelengths and reflected wave intensity into electrical signals and outputs the same.

An arithmetic processor (signal processor) 70 in the sensor controller 58 includes a horizontal stress calculator 72 and a normal stress calculator 74, which are constituted by the CPU of a computer.

Using the aforementioned equations (21) and/or (22), the horizontal stress calculator 72 calculates horizontal stresses $F_h$ applied to the FBG sensor 22. Further, using the aforementioned equations (16) and (17), the normal stress calculator 74 calculates normal stresses $F_p$ applied to the FBG sensor 22.

In this manner, by calculating horizontal stress $F_h$ values, the state of slippage of the body 52 in the X-Y plane can be detected. Further, by calculating normal stress $F_p$ values, the force at which the body 52 is gripped with respect to the Z-direction can be detected.

As described above, in accordance with the FBG sensor 22 and the pressure sensors 16, 16a, 16b, when normal stresses $F_p$ are applied from the body 52 to the flat portion 32 via the sheet 18, the stress direction converter 30 converts such normal stresses $F_p$ into forces F''' of a direction (X-direction) along which the gratings 26 are arrayed, and transmits the converted forces F''' to the gratings 26 via the stress transmitting sections 34a, 34b. As a result, the gratings 26 are subjected to strains by the converted forces F''', whereupon the wavelength (reflected wavelength) of light reflected by the gratings 26 changes. Accordingly, by detecting the shift amount of the reflected wavelengths at the gratings 26, values of the normal stresses $F_p$ can be calculated.

On the other hand, when horizontal stresses $F_h$ are applied from the body 52 to the flat portion 32 via the sheet 18, the flat portion 32 is displaced by such horizontal stresses $F_h$ in a direction along the flat portion 32 (i.e., in the X-direction along which the gratings 26 are arrayed). Because the stress transmitting sections 34a, 34b are bridged between the flat portion 32 and the optical fiber cable 20, at least portions of the stress transmitting sections 34a, 34b proximate sides of the flat portion 32 are displaced together with the flat portion 32 as a result of application of horizontal stresses $F_h$ with respect to the flat portion 32.

In the case that light is incident from the exterior on the input/output terminal 42b of the optical fiber cable 20, such incident light is guided to the gratings 26 having passed through the bent portion 40c, the inclined portion 40b and the bent portion 40a of the optical fiber cable 20 along the inclined section 36b of the stress transmitting section 34b, whereas light (reflected light) of a specified wavelength is output externally from the gratings 26 passing through the bent portion 40a, the inclined portion 40b and the bent portion 40c of the optical fiber cable 20. In this case, assuming that the inclined section 36b is displaced together with the flat portion 32 by application of horizontal stresses $F_h$ with respect to the flat portion 32, since along with such displacement the bent portion 40c and the bent portion 40a become further bent (or flexed) and the inclined portion 40b also is displaced, bending losses are generated in the optical fiber cable 20. By generation of such bending losses, the intensity (reflected wave intensity) of the reflected light, which passes through the bent portion 40a, the inclined portion 40b, and the bent portion 40c and is radiated out to the exterior, changes.

Thus, with the first embodiment, by detecting the amount of change ($P_0$–P', P'''–$P_0$) in the reflected wave intensity caused by such bending losses, values of horizontal stresses $F_h$, which correspond to the reflected wave intensity, can be detected.

Accordingly, in accordance with the first embodiment, with a comparatively simple structure, stresses (normal stresses $F_p$, horizontal stresses $F_h$) applied from the body 52 are capable of being segregated into multiple directions (Z-direction, X-direction) and detected. More specifically, with the first embodiment, using reflected light (one output signal), which is output from a single optical fiber cable 20, both normal stresses $F_p$ and horizontal stresses $F_h$ can easily be detected.

Further, in the case that the pressure sensor 16, 16a, 16b including the FBG sensor 22 is mounted on an end effector 56 (hand members 56a, 56b) of a manipulator 54 or the like and the hand members 56a, 56b grip a body 52, because the FBG sensor 22 segregates the external forces (normal stresses $F_p$, horizontal stresses $F_h$) applied to the hand members 56a, 56b from the body 52 into multiple directional components and detects such forces, the manner in which such external forces behave within spatial coordinates of the hand members 56a, 56b can easily be grasped.

Owing thereto, while the hand members 56a, 56b grip the body 52, slippage and falling out of the body 52 from the hand members 56a, 56b can reliably be avoided. Further, by mounting the pressure sensor 16, 16a, 16b on the hand members 56a, 56b, the first embodiment is effective at enabling automization of assembly operations, which have been problematic in the conventional art.

For example, in the case that the first embodiment is applied to an assembly process carried out while the hand members 56a, 56b grip a flexible body 52 the shape of which is easily changed by application of external forces, by detecting with the FBG sensor 22 (pressure sensor 16, 16a, 16b) normal stresses $F_p$ and horizontal stresses $F_h$ applied to a gripping surface (contact surface) of the body 52 on the hand members 56a, 56b, deformation of the body 52 can be recognized during gripping thereof, and corresponding to such recognition, controls with respect to the hand members 56a, 56b can be carried out automatically. Further, when the flexible body 52 is being assembled, when hangings or tensions are confirmed, normal stresses $F_p$ and horizontal stresses $F_h$ in the gripping surface are detected, and based on each of the detected stresses $F_p$, $F_h$, the strength at which the hand members 56a, 56b grip the body 52 can be controlled.

Further, because stresses are detected using the optical fiber cable 20, no adverse influence is imparted to the FBG sensor 22 as a result of exposure to electromagnetic noise or various types of electrical surges or the like. As a result, even if used in environments such as factories or the like where multiple large-scale machinery and equipment are run, while the influence of the aforementioned types of noise is avoided, stresses $F_p$, $F_h$ can be detected and measured with comparative stability.

Further, as a result of the flat portion 32 being disposed along a direction (X-direction) in which the gratings 26 are arrayed, and the stress transmitting sections 34a, 34b being constituted by the inclined sections 36a, 36b and the joint sections 38a, 38b, normal stresses $F_p$ can be converted efficiently into forces F'" of a direction along the gratings 26, and can be transmitted to the gratings 26. Further, in the case that horizontal stresses $F_h$ are applied to the flat portion 32, such horizontal stresses $F_h$ can be transmitted with good efficiency to the bent portions 40a, 40c and the inclined portion 40b of the optical fiber cable 20.

Further, because the inclined portion 40b of the optical fiber cable 20 is disposed along the inclined section 36b of the stress transmitting section 34b, when horizontal stresses $F_h$ are applied to the flat portion 32, the inclined section 36b and the inclined portion 40b are displaced, and together therewith, the bent portions 40a, 40c can be bent (flexed) further, whereby bending losses can reliably be generated.

Next, with reference to FIGS. 15 through 21B, explanations shall be made concerning modified examples (first modified example, second modified example) of the FBG sensor 22 and the pressure sensor 16 according to the first embodiment.

In the following explanations of the modified examples, structural elements thereof that are the same as those of the FBG sensor 22 and the pressure sensor 16, 16a, 16b (see FIGS. 2 to 14) according to the first embodiment shall be designated using the same reference numerals, and such features shall not be described in detail. Henceforth, reference numerals and elements in the other embodiments and modified examples shall be handled in a similar manner.

Figure 15:
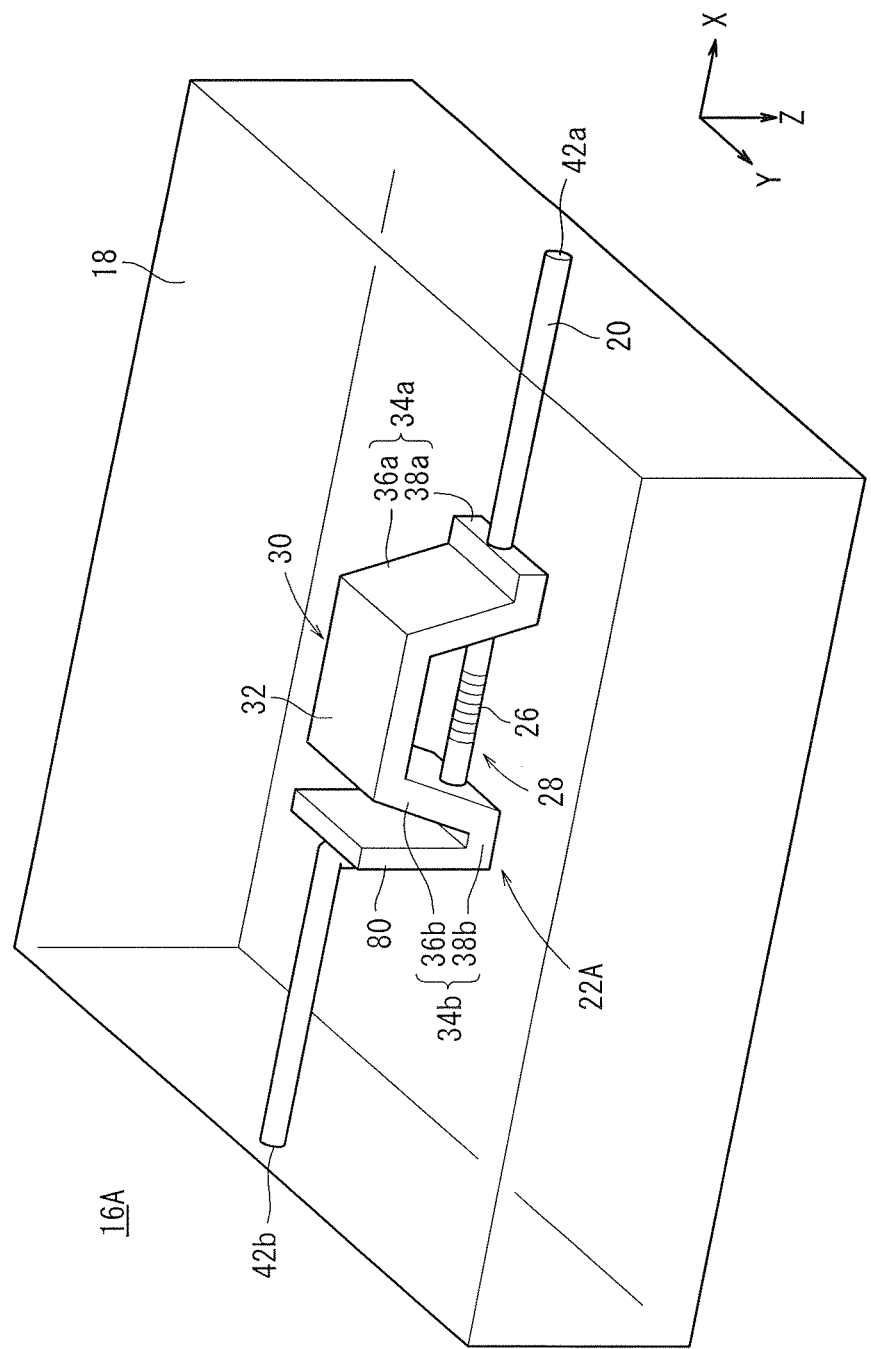
FIG. 15 is a perspective view of a pressure sensor, in which an FBG sensor according to a first modified example is disposed in a sheet.
Figure 16:
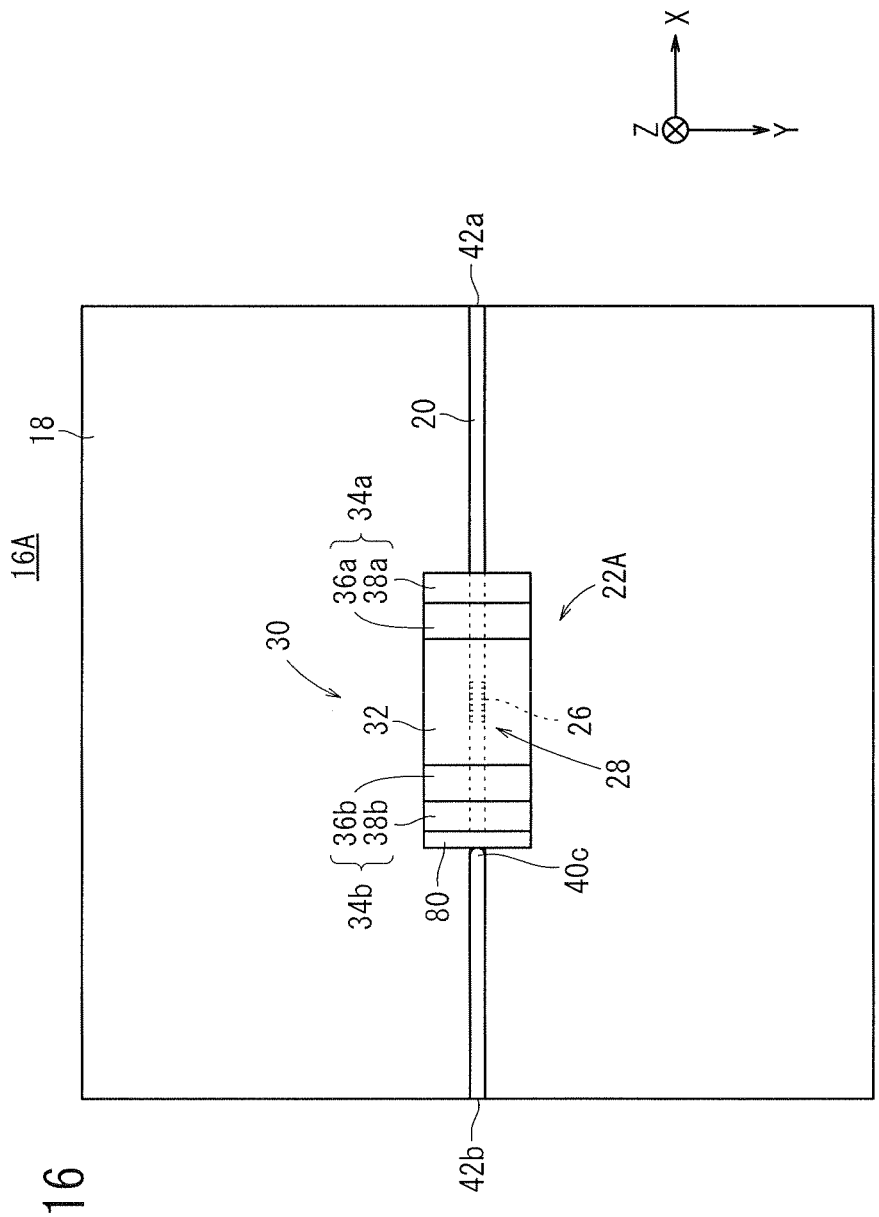
FIG. 16 is a plan view of the pressure sensor shown in FIG. 15.
Figure 17:
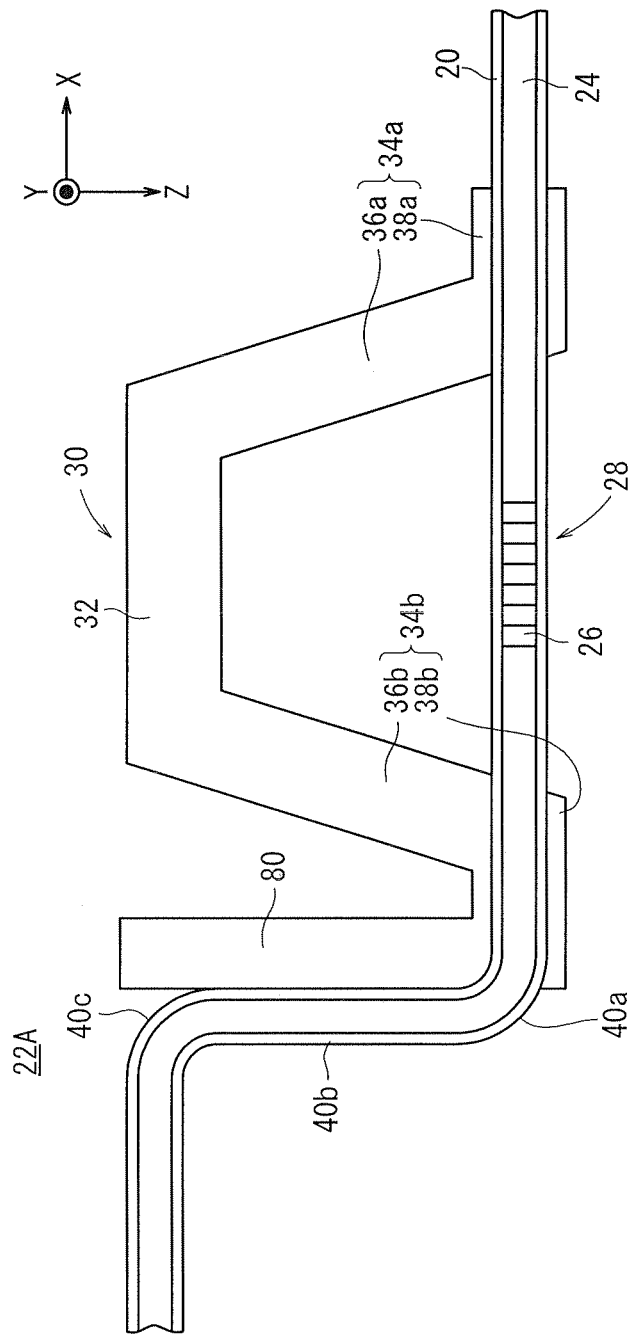
FIG. 17 is an outline explanatory view of the FBG sensor shown in FIG. 15.

As shown in FIGS. 15 through 17, the FBG sensor 22A and the pressure sensor 16A according to the first modified example differ from the FBG sensor 22 and the pressure sensor 16, 16a, 16b of the first embodiment in that an inclined section (third inclined section) 80, on which the inclined portion 40b of the optical fiber cable 20 is positioned, is disposed at an end of the joint section 38b in a state of being separated from each of the inclined sections 36a, 36b. Accordingly, the inclined section 36b of the stress transmitting section 34b and the optical fiber cable 20 are in a non-contact state, and together therewith, inside the sheet 18, the inclined section 36b and the inclined section 80 are arranged in double.

Figure 18:
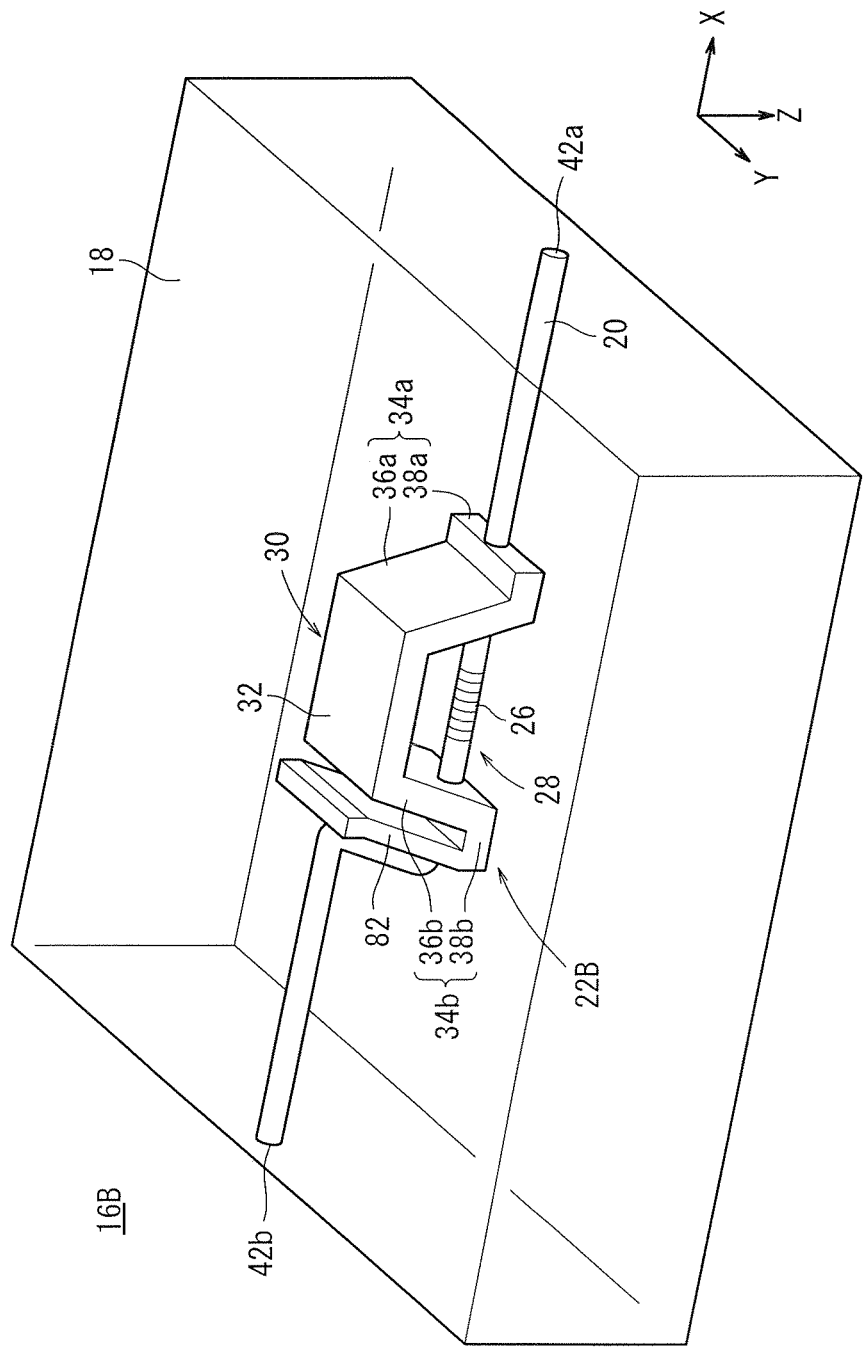
FIG. 18 is a perspective view of a pressure sensor, in which an FBG sensor according to a second modified example is disposed in a sheet.
Figure 19:
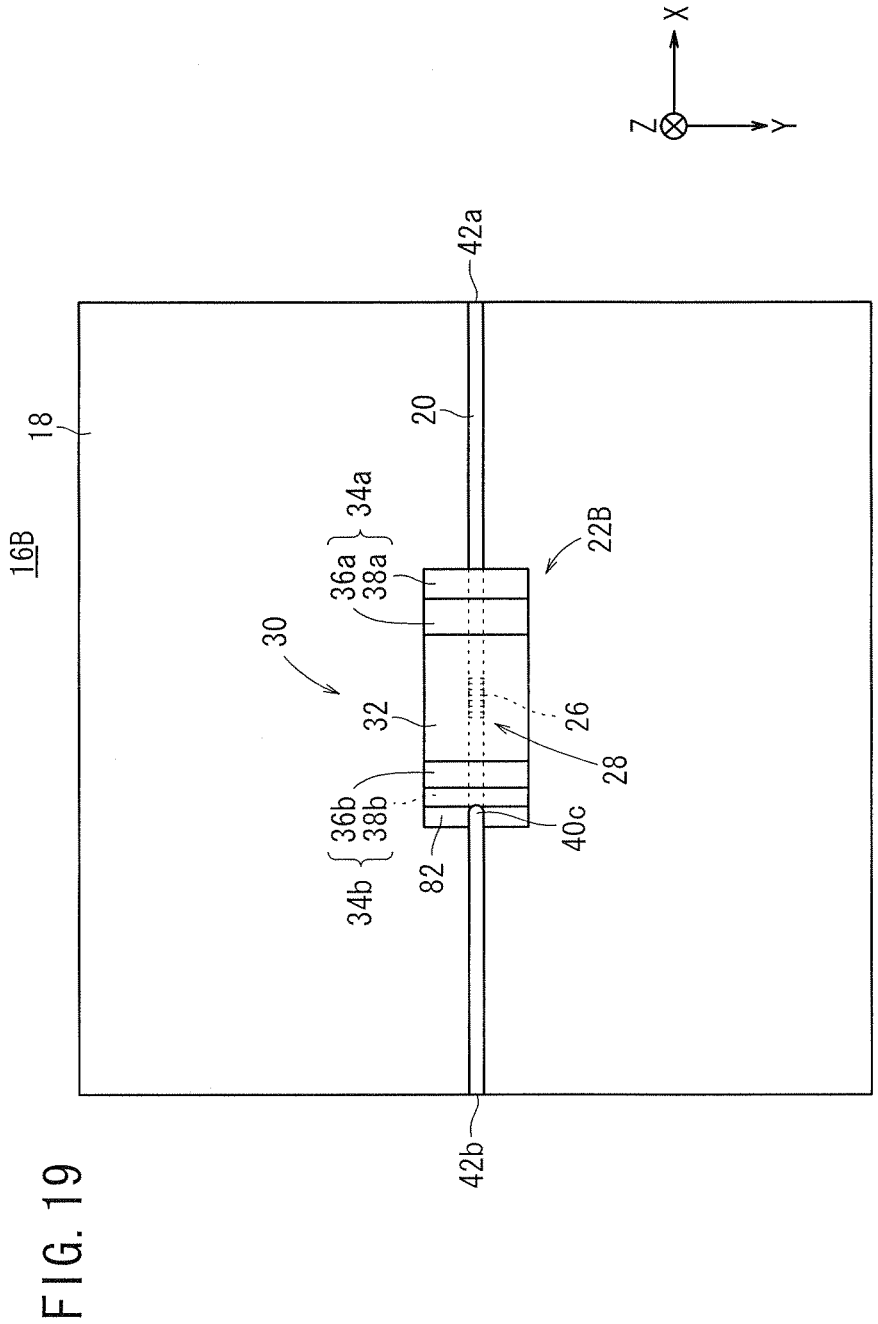
FIG. 19 is a plan view of the pressure sensor shown in FIG. 18.
Figure 20:
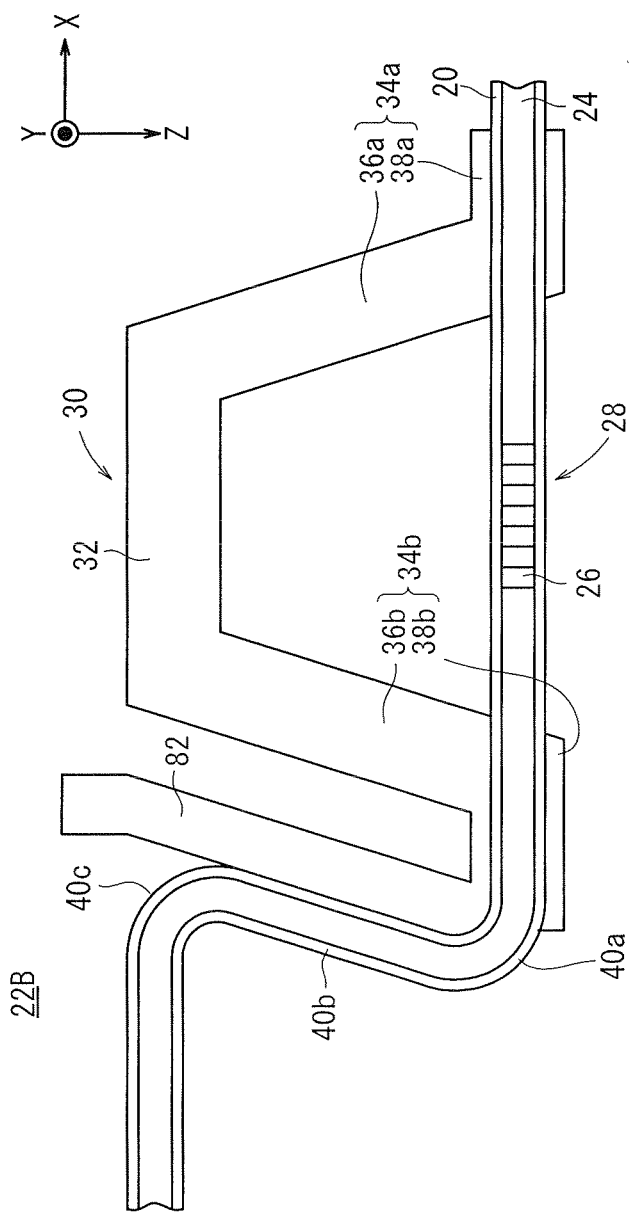
FIG. 20 is an outline explanatory view of the FBG sensor shown in FIG. 18.

As shown in FIGS. 18 through 20, the FBG sensor 22B and the pressure sensor 16B according to the second modified example differ from the FBG sensor 22A and the pressure sensor 16A of the first modified example (see FIGS. 15 to 17) in that an inclined section (third inclined section) 82, which is formed on at an end of the joint section 38b, is disposed in parallel with the inclined section 36b, while an end part of the inclined section 82 extends in the Z-direction.

Next, effects achieved by each of the FBG sensors 22A, 22B and the pressure sensors 16A, 16B shall be described with reference to FIGS. 21A and 21B.

Figure 21A:
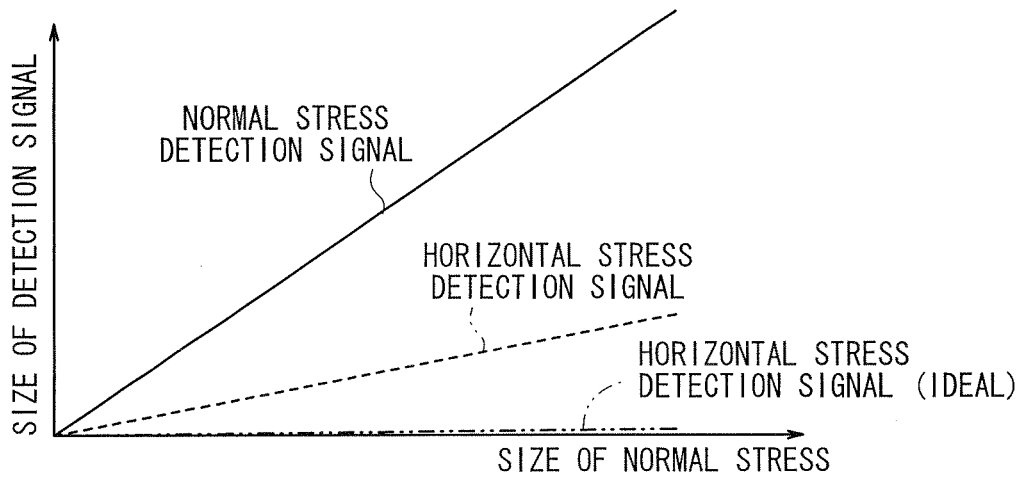
FIG. 21A is an explanatory view showing a relationship between the size of normal stresses and the size of detection signals at a time when the first embodiment is applied.

FIG. 21A is a diagram comparing, in the first embodiment (see FIGS. 2 to 14), at a time when normal stresses $F_p$ are applied to the flat portion 32, the size (peak value of reflected wave intensity) of a detection signal of normal stresses $F_p$ output from the light detector 68, and the size of a detection signal of horizontal stresses $F_h$ output from the light detector 68.

In the case of the first embodiment, since the inclined portion 40b of the optical fiber cable 20 is positioned on the inclined section 36b of the stress transmitting section 34b, when normal stresses $F_p$ are applied to the flat portion 32 and forces F'" corresponding to the normal stresses $F_p$ are transmitted from the stress transmitting section 34b to the gratings 26 whereupon the lattice spacing of the gratings 26 is changed, responsive to displacement of the inclined section 36b, the bent portions 40a, 40c are bent (flexed) together with displacement of the inclined portion 40b.

As a result, even if horizontal stresses $F_h$ are not actually applied to the flat portion 32, signals based on bending losses caused by normal stresses $F_p$ are output from the light detector 68 as detection signals of horizontal stresses $F_h$ (the graph shown by the dashed line in FIG. 21A). More specifically, cases occur in which signals, which are based on bending losses caused by normal stresses $F_p$, are mistakenly detected as detection signals of horizontal stresses $F_h$.

Further, in FIG. 21A, the graph of the two-dot-dashed line shows ideal detection signals of horizontal stresses $F_h$ at a time when normal stresses $F_p$ are applied to the flat portion 32. As shown thereby, even though normal stresses $F_p$ are applied to the flat portion 32, detection signals of horizontal stresses $F_h$ are not output from the light detector 68.

In contrast thereto, with the first modified example (FIGS. 15 to 17) and the second modified example (FIGS. 18 to 20), together with disposing the inclined sections 36a, 36b and the inclined sections 80, 82 respectively in a separated state, since the inclined portion 40b of the optical fiber cable 20 is positioned on the inclined sections 80, 82, even in the case that normal stresses $F_p$ are applied to the flat portion 32, the influence of the forces F'" corresponding to such normal stresses $F_p$ on the inclined section 80, 82 and the inclined portion 40b can be avoided.

Figure 21B:
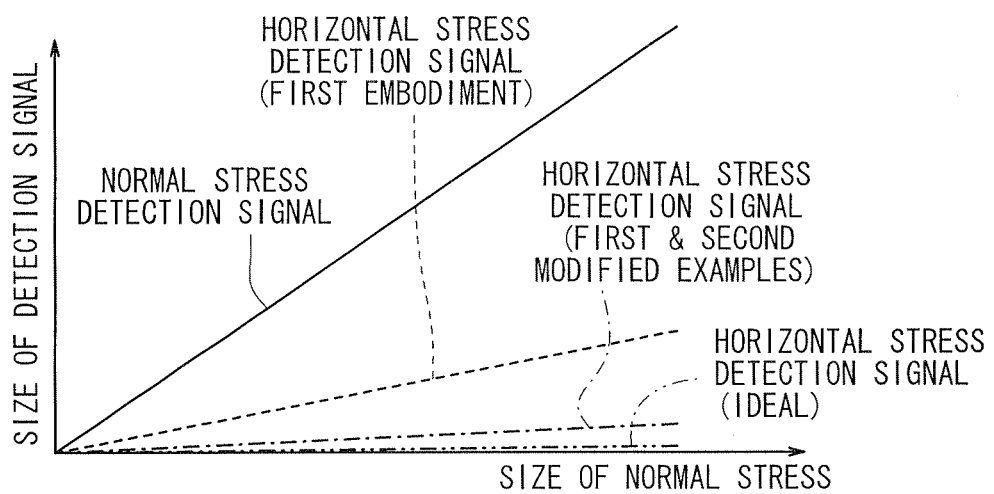
FIG. 21B is an explanatory view showing a relationship between the size of normal stresses and the size of detection signals at times when the first modified example and the second modified example are applied.

Accordingly, as shown by the one-dot-dash line in FIG. 21B, in the case of the first and second modified examples, even if normal stresses $F_p$ are applied to the flat portion 32, displacement of the inclined sections 80, 82 caused by forces F'" responsive to such normal stresses $F_p$ and further bending (flexing) of the bent portions 40a, 40c are avoided. As a result, signals output from the light detector 68 based on bending losses caused by such normal stresses $F_p$ are reliably decreased, and the signals are capable of approaching the ideal detection signal graph for horizontal stresses $F_h$ (shown by the two-dot-dashed line in FIG. 21B). Therefore, erroneous detection of detection signals of horizontal stresses $F_h$ at the light detector 68 can be prevented.

More specifically, with the first and second modified examples, since in the reflected wave intensity radiated out to the exterior from the optical fiber cable 20, the percentage of the change amount in reflected wave intensity responsive to normal stresses $F_p$ is suppressed, signals indicative of the amount of change of the reflected wave intensity responsive to horizontal stresses $F_h$ can be detected with comparatively good independence.

Second Embodiment

Next, with reference to FIGS. 22 through 26, explanations shall be given concerning a pressure sensor 100 according to a second embodiment, and an FBG sensor 122 incorporated in the pressure sensor 100.

Figure 22:
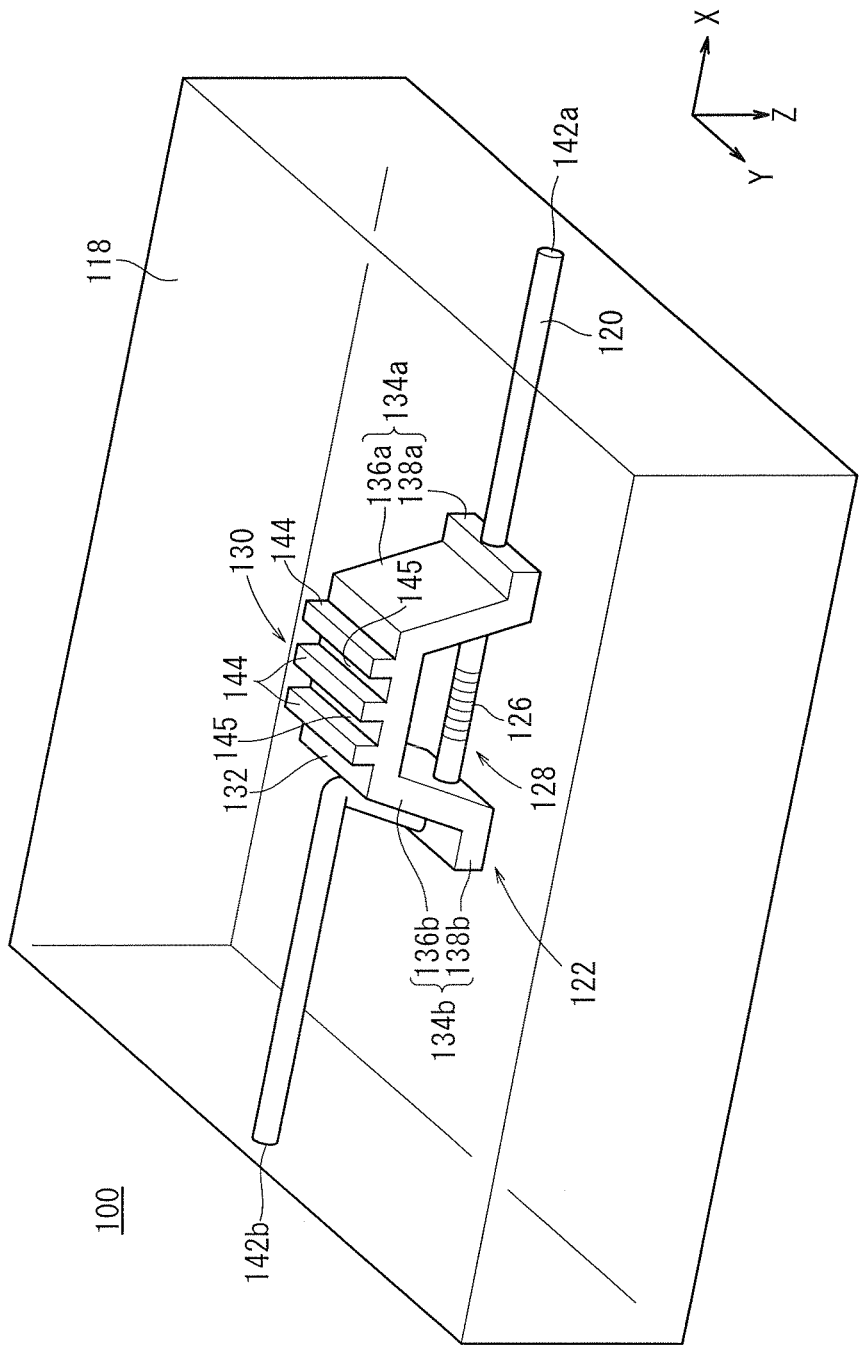
FIG. 22 is a perspective view of a pressure sensor, in which an FBG sensor according to a second embodiment is disposed in a sheet.

As shown in FIG. 22, the pressure sensor 100 is constituted by embedding a single optical fiber cable 120 having a longitudinal direction along the X-direction in the interior of a sheet 118 possessing a given flexibility, and by forming an FBG sensor 122 in the optical fiber cable 120. More specifically, the sheet 118 is formed by molding the FBG sensor 122 using a material having flexibility, such as plastic or the like.

In this case, the sheet 118 is formed such that the FBG sensor 122 is fixed in the interior of the sheet 118, so as to protect the FBG sensor 122 from excessive stresses, heat and the like, which may be applied from the exterior.

In FIG. 22, although a case is shown in which one individual FBG sensor 122 is disposed in the sheet 118, the number of FBG sensors 122 in the sheet 118 is not limited to one. For example, the FBG sensor 122 may be disposed in plurality, in a matrix form along the X-direction and the Y-direction (surface direction of the sheet 118), with addresses being assigned to each of the sensors. Further, the longitudinal direction of the optical fiber cable 120 is not limited to being in the X-direction, but may be in the Y-direction as well. In either case, an acceptable situation results if at least one FBG sensor 122 is disposed in the interior of the sheet 118.

Next, the FBG sensor 122 will be described in detail with reference to FIGS. 22 through 24.

The FBG sensor 122 comprises a stress detection sensor 128 disposed substantially centrally in the interior of the sheet 118 and including the optical fiber cable 120 in which gratings 126 are formed, and a stress direction converter 130, which receives through the sheet 118 stresses (normal stresses, horizontal stresses) that are applied from the exterior to the sheet 118, converts the received stresses into stresses (components) of a direction along the direction in which the gratings 126 are arrayed (i.e., the X-direction, which is the longitudinal direction of the optical fiber cable 120), and then transmits the converted stresses to the optical fiber cable 120.

In this case, the stress direction converter 130, which serves as a receptive material with respect to stresses applied from the exterior, is made from a flexible body from rubber, resin or the like, and has a rectangular flat portion 132 that extends substantially parallel with the gratings 126 along the X-Y direction, and stress transmitting sections 134a, 134b that are bridged from two opposing sides along the X-direction of the flat portion 132 to respective ends of the gratings 126.

On the upper surface of the flat portion 132, a plurality of columnar shaped projections 144 are formed, which are arranged perpendicularly to the longitudinal direction of the optical fiber cable 120. The respective projections 144 are disposed in a state of being separated mutually by a predetermined interval in the X-direction. Further, as a result of the projections 144 extending respectively in the Y-direction, grooves 145 are formed between each of the projections 144. Each of the grooves 145 is provided by forming the projections 144 in a plurality on the upper surface of the flat portion 132. Alternatively, the flat portions 132 and the projections 144 may be provided by forming a plurality of grooves 145 in an individual rectangular element.

Figure 23:
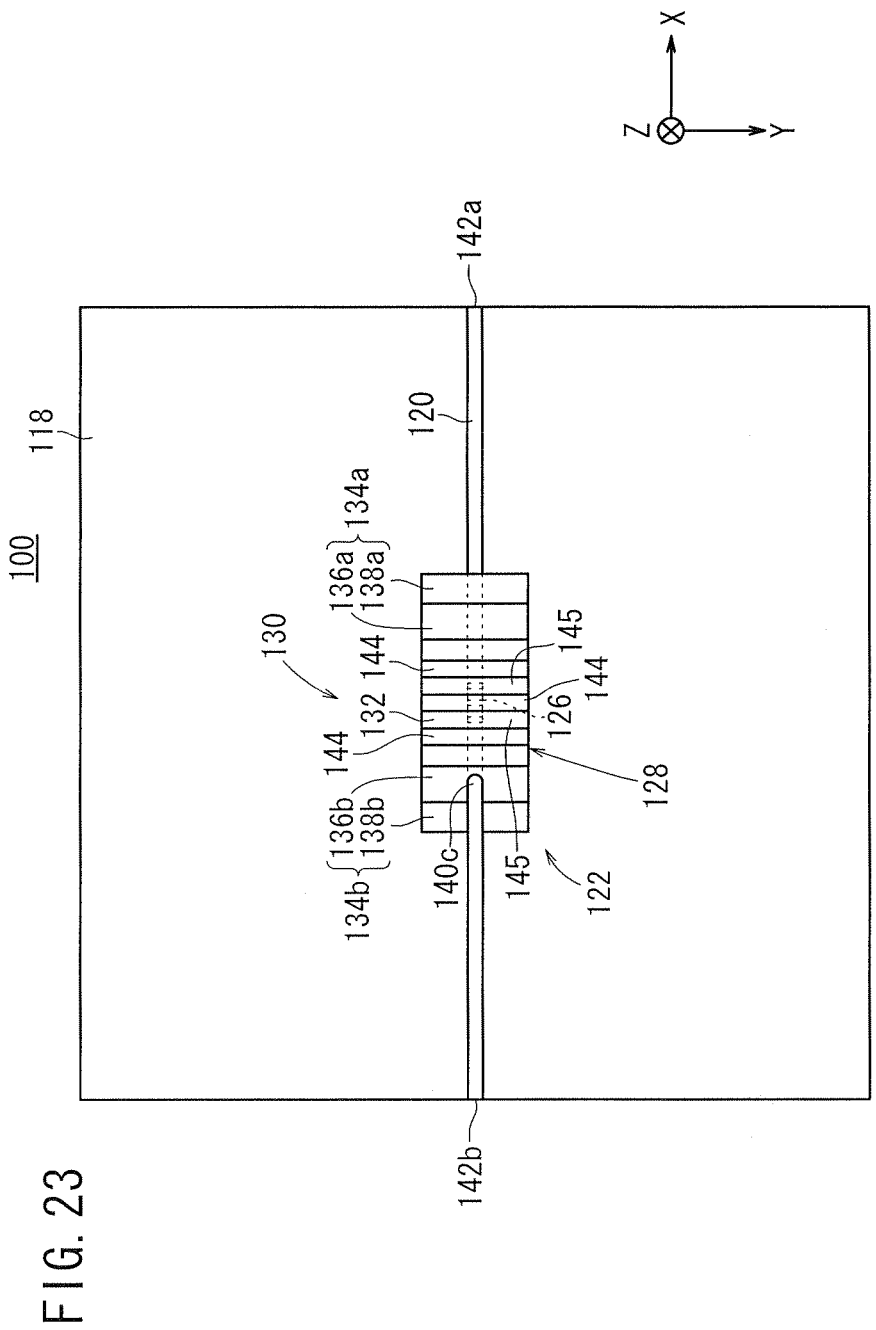
FIG. 23 is a plan view of the pressure sensor shown in FIG. 22.
Figure 24:
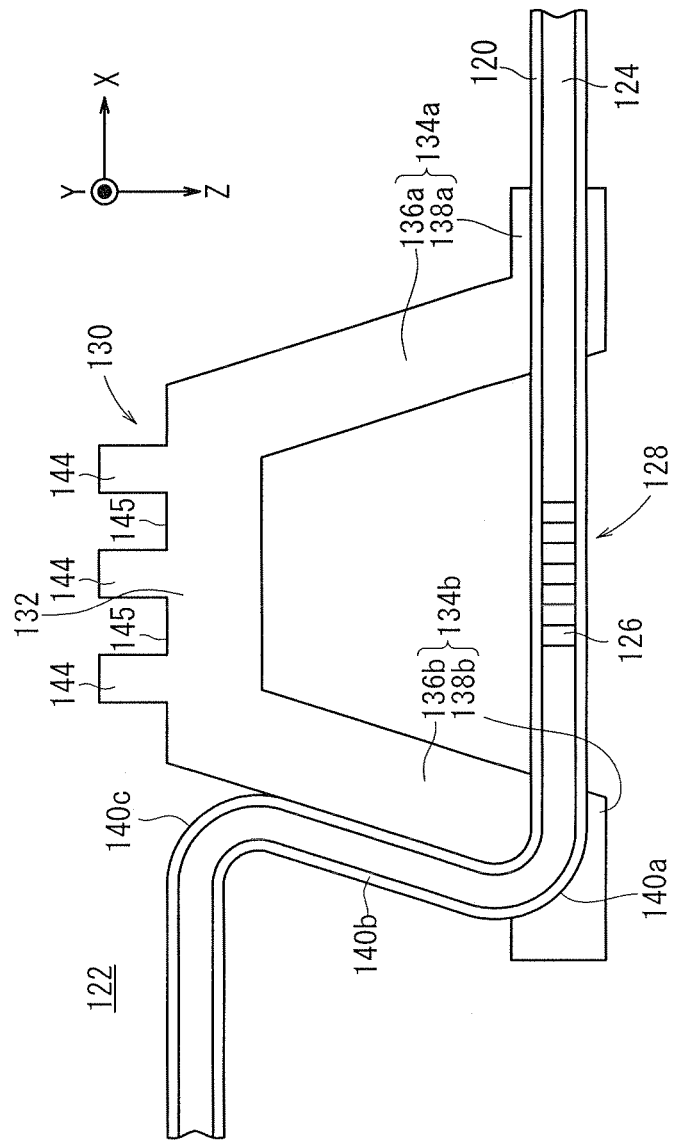
FIG. 24 is an outline explanatory view of the FBG sensor shown in FIG. 22.

In FIGS. 22 through 24, although three individual columnar shaped projections 144 are formed on the flat portion 132, the invention is not limited to this example, and the number of projections 144 may be less than or greater than three. Further, between each of the projections 144, grooves 145 are formed as a result of forming the three columnar shaped projections 144 on the flat portion 132, however, in place of this structure, a groove 145 may be formed on the flat portion 132 while dispensing with the projections 144.

Figure 25:
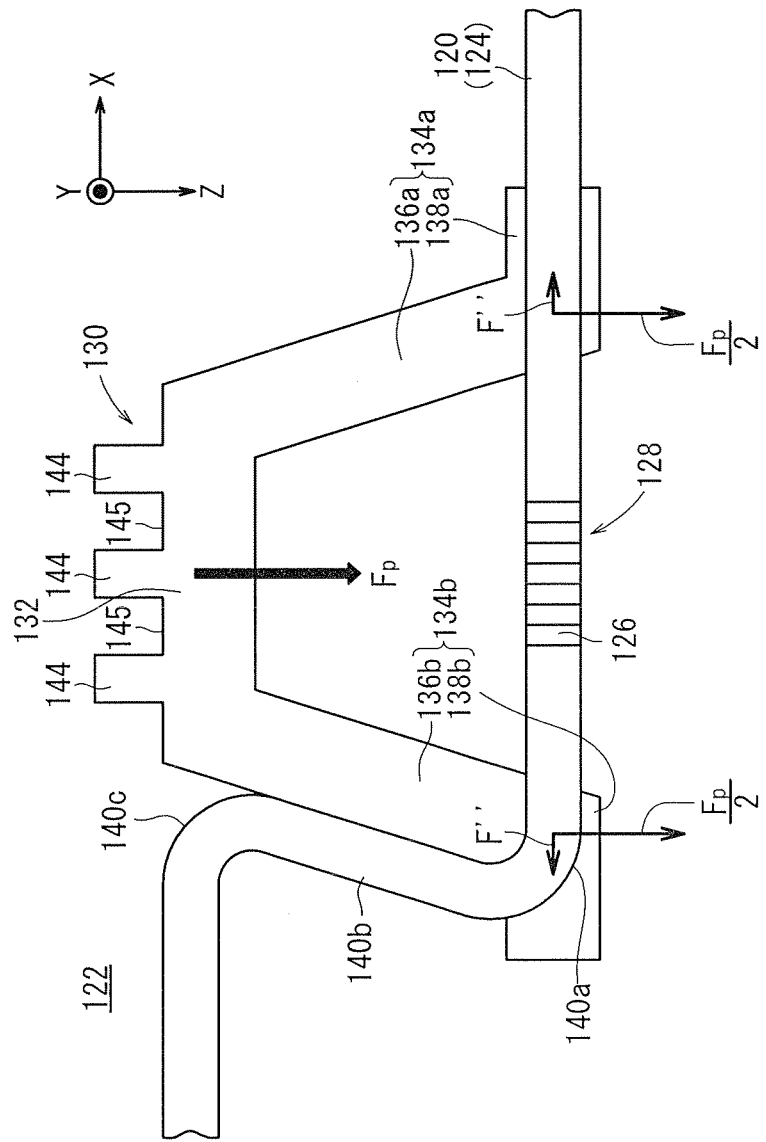
FIG. 25 is a view for explaining detection principles of normal stresses by the FBG sensor of FIGS. 22 through 24.

Under a state in which stresses are not applied thereto, the stress direction converter 130 is constructed with left-right (lateral) symmetry with the gratings 126 in the center, as shown in FIGS. 23 and 24. More specifically, the stress transmitting sections 134a, 134b include, respectively, inclined sections 136a, 136b that are joined with the flat portion 132 and are inclined toward (in the vicinity of opposite end sides of the gratings 126) the optical fiber cable 120, and joint sections 138a, 138b that are connected to the inclined sections and surround portions on the outer circumferential surface of the optical fiber cable 120. Further, as shown in FIGS. 24 and 25, the angles defined between the flat portion 132 and each of the inclined sections 136a, 136b are set mutually equal to each other, and additionally, the angles defined between the inclined sections 136a, 136b and each of the joint sections 138a, 138b are set mutually equal to each other.

A portion of the optical fiber cable 120 is disposed along the inclined section 136b on the inclined section 136b of the stress transmitting section 134b. In this case, the portion of the optical fiber cable 120 is made up from a bent portion 140a which is exposed from the joint section 138b and is bent (or flexed) toward the inclined section 136b, an inclined portion 140b that is connected to the bent portion 140a and is positioned along the inclined section 136b, and another bent portion 140c that is connected to the inclined portion 140b and is bent (or flexed) toward the X-direction. Further, because the FBG sensor 122 is formed in the sheet 118 by molding from a material having a given flexibility, in the interior of the sheet 118, the inclined portion 140b is disposed along the inclined section 136b in a state of being fastened to the inclined section 136b.

As shown in FIGS. 22 and 23, on two opposing side surfaces along the X-direction in the sheet 118, input/output terminals 142a, 142b of the optical fiber cable 120, which are capable of receiving light incident thereon and emitting light, are exposed respectively to the exterior. Accordingly, although the optical fiber cable 120 is embedded in the interior of the sheet 118 with the X-direction as the longitudinal direction thereof, a location that extends from the input/output terminal 142a via the gratings 126 and to the bent portion 140a, and a location from the bent portion 140c to the input/output terminal 142b are disposed at different heights as a result of the inclined portion 140b being disposed along the inclined section 136b (see FIGS. 22 and 24).

Further, in FIGS. 22 through 24, although it is shown that the bent portion 140a, the inclined portion 140b and the bent portion 140c are formed on the inclined section 136b and the joint section 138b of the stress transmitting section 134b, in place of this structure, the bent portion 140a, the inclined portion 140b and the bent portion 140c may be formed on the inclined section 136a and the joint section 138a of the stress transmitting section 134a.

Next, descriptions shall be given with reference to FIG. 25 concerning detection of normal stresses when a non-illustrated body is brought into contact with a surface of the sheet 118 above the FBG sensor 122, and such normal stresses (stresses in the Z-direction) are applied from the body to the gratings 126.

As noted above, because the shape of the stress direction converter 130 prior to application of stresses is constructed with left-right (lateral) symmetry about the gratings 126 (see FIGS. 23 and 24), when a normal stress $F_p$ is applied from the body along the Z-direction to the sheet 118, ideally, stresses $F_p/2$ along the Z-direction are applied respectively to each of the stress transmitting sections 134a, 134b of the stress direction converter 130.

In addition, at each of adjoined portions between the optical fiber cable 120 and the joint sections 138a, 138b, forces F" are applied respectively based on the stresses $F_p/2$. Accordingly, by imposition of such forces F" applied to each of the adjoined portions on the gratings 126, the gratings 126 are subjected to strains (stretching) in the X-direction, such that the lattice spacing of the gratings 26 changes (increases).

Owing thereto, in a state in which normal stresses $F_p$ are not applied, the gratings 126 reflect light at a reflected wavelength (e.g., the wavelength $\lambda_A$ in FIG. 1C) with respect to incident light, and the reflected light is radiated out to the exterior from the input/output terminal 142a or the input/output terminal 142b. In contrast thereto, when stresses $F_p$ are applied, because the lattice spacing of the gratings 26 increases and the reflected wavelength is shifted to $\lambda_B$, the gratings 126 reflect light at a reflected wavelength $\lambda_B$ with respect to the incident light, and the reflected light is radiated out to the exterior from the input/output terminal 142a or the input/output terminal 142b.

Accordingly, using the FBG sensor 122 and the pressure sensor 100, based on the shift amount ($\lambda_B$–$\lambda_A$) of the reflected wavelengths from $\lambda_A$ to $\lambda_B$, normal stresses $F_p$ applied to the sheet 118 can be detected.

Figure 26:
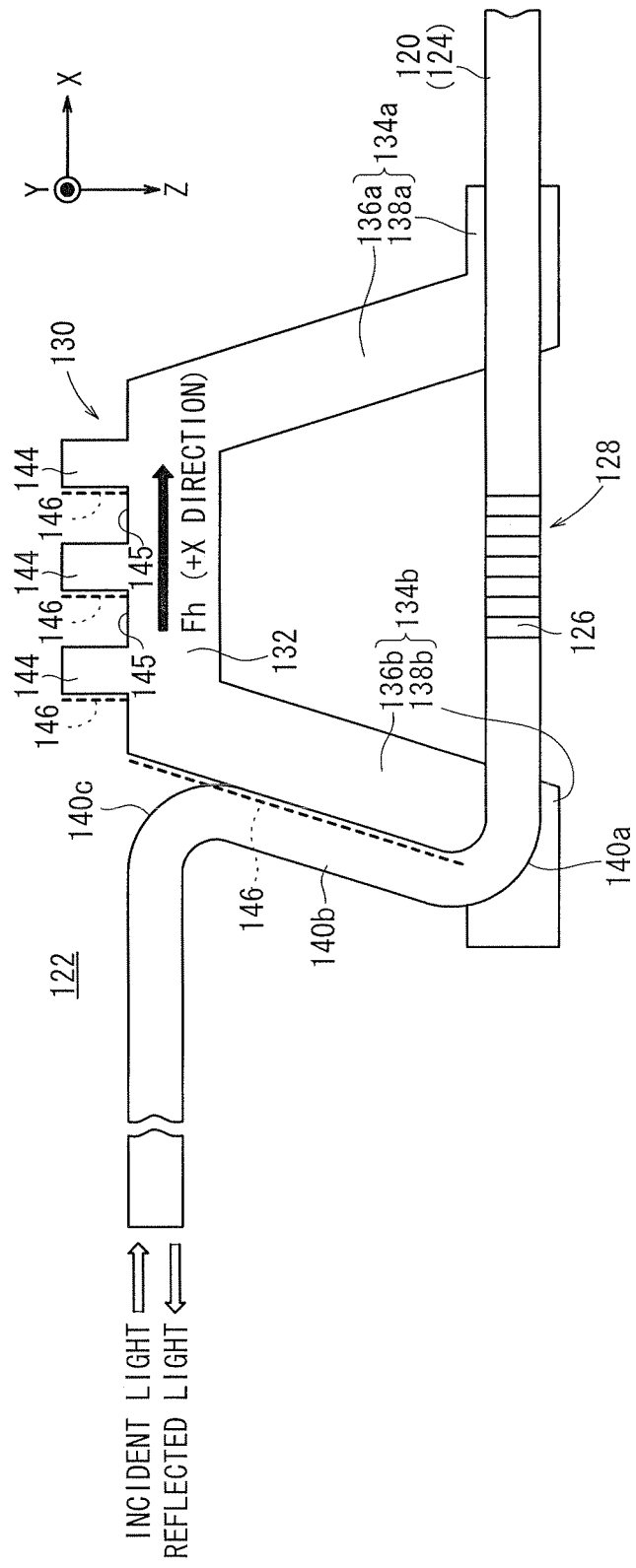
FIG. 26 is a view for explaining detection principles of horizontal stresses by the FBG sensor of FIGS. 22 through 24.
Figure 27:
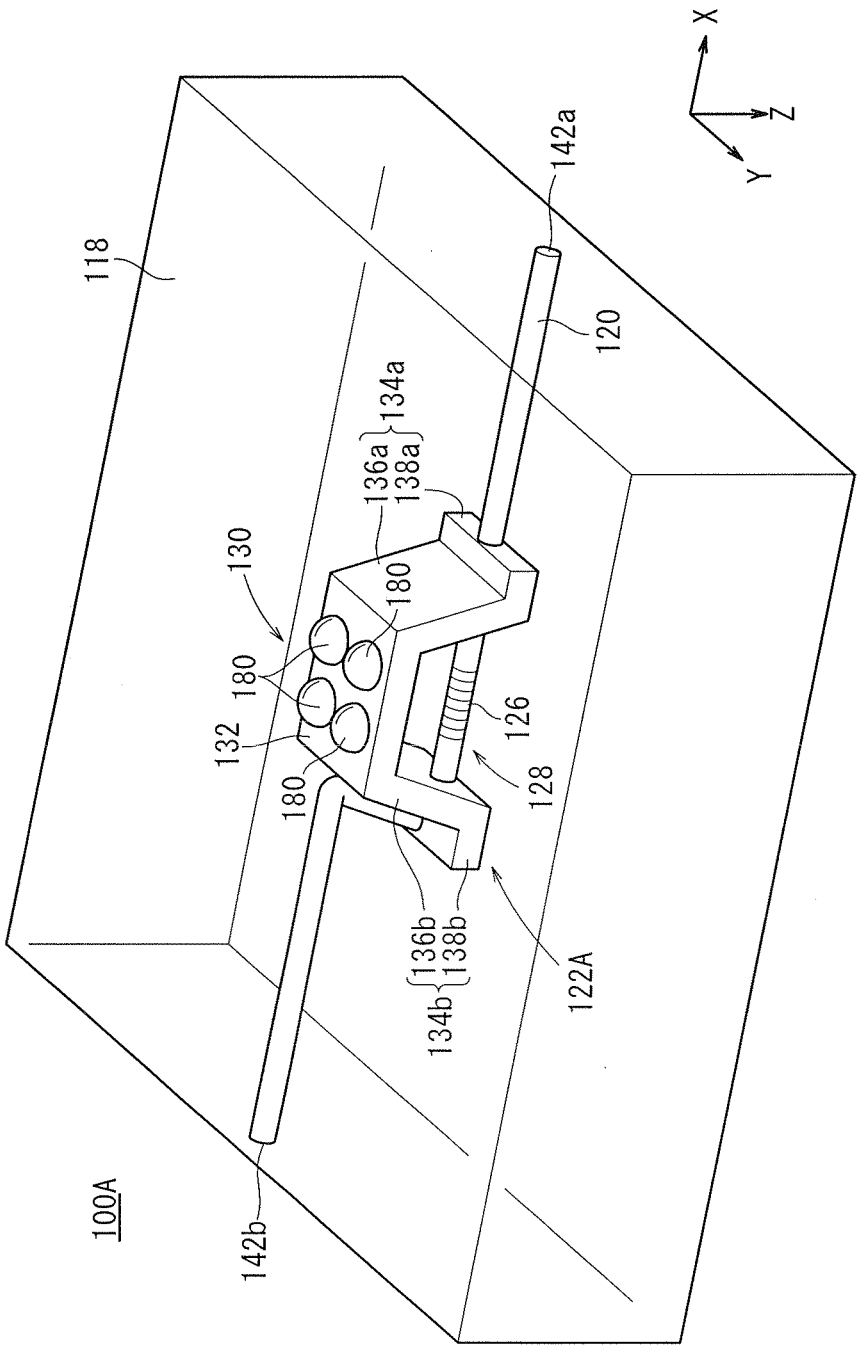
FIG. 27 is a perspective view of a pressure sensor, in which an FBG sensor according to a third modified example is disposed in a sheet.
Figure 28:
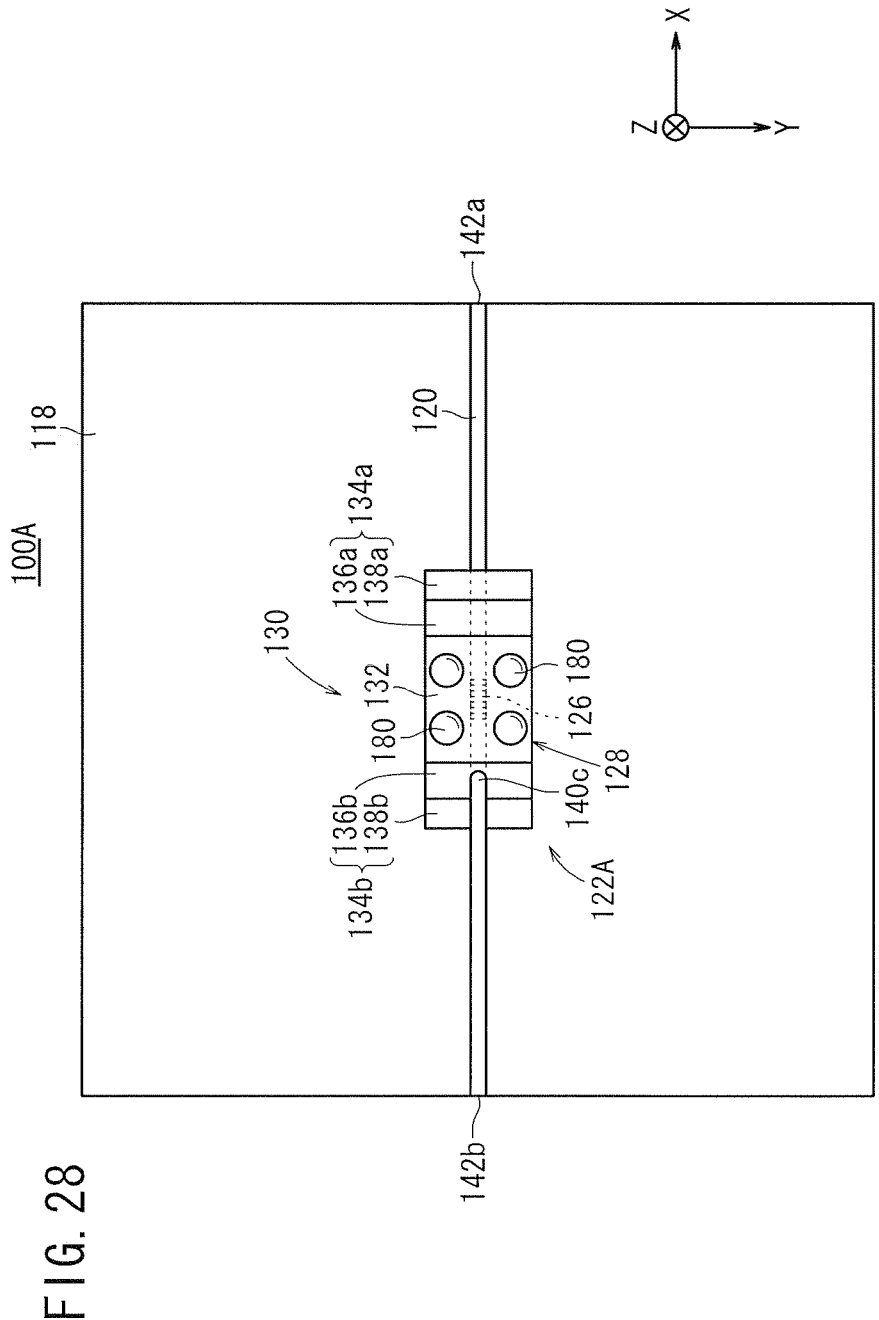
FIG. 28 is a plan view of the pressure sensor shown in FIG. 27.
Figure 29:
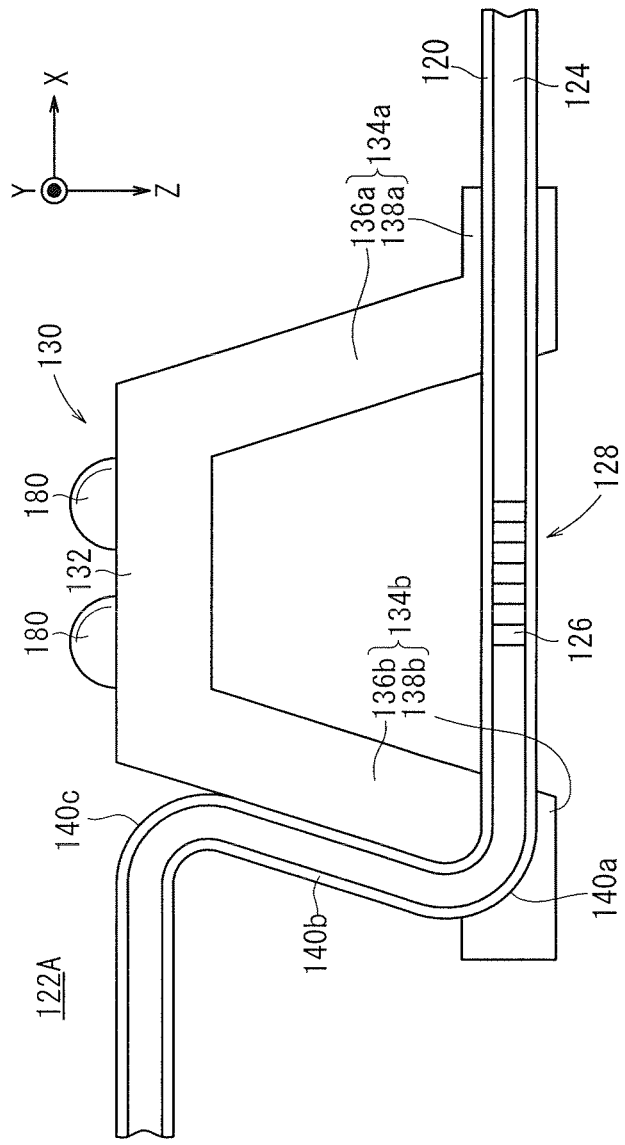
FIG. 29 is an outline explanatory view of the FBG sensor shown in FIG. 27.

Next, with reference to FIG. 26, explanations shall be given concerning detection of horizontal stresses at a time when a non-illustrated body comes into contact with a surface of the sheet 118 above the FBG sensor 122, and horizontal stresses (e.g., stresses along the X-direction) are applied from the body to the gratings 126.

A case will be described in which incident light, which is incident from the input/output terminal 142b, is directed to the gratings 126 via the bent portion 140c, the inclined portion 140b and the bent portion 140a, whereas light (reflected light) that is reflected by the gratings 126 is radiated out to the exterior from the input/output terminal 142b via the bent portion 140a, the inclined portion 140b and the bent portion 140c.

For example, when a horizontal stress $F_h$ is applied to the sheet 118 along the positive X-direction, the horizontal stress $F_h$ is transmitted via the sheet 118 to the flat portion 132, and the flat portion 132 is displaced in the positive X-direction by the horizontal stress $F_h$.

In this case, one end of the inclined section 136b is connected to the flat portion 132, whereas the other end thereof is connected to the joint section 138b. Further, the inclined portion 140b of the optical fiber cable 120 is disposed in a state of being fastened to the inclined section 136b along the inclined section 136b, and the joint section 138b is joined to the bent portion 140a of the optical fiber cable 120. Accordingly, accompanying displacement of the flat portion 132 in the positive X-direction by the horizontal stress $F_h$, the inclined section 136b and the inclined portion 140b are displaced integrally therewith in the positive X-direction.

Consequently, the bent portions 140a, 140c are bent further accompanying such displacement, and bending losses are generated. As a result, due to the bending losses, the intensity (reflected wave intensity) of the reflected light changes.

Accordingly, with the FBG sensor 122 and the pressure sensor 100, based on the amount of change in the reflected wave intensity, horizontal stresses $F_h$ applied to the sheet 118 can be detected.

Incidentally, in the case that the FBG sensor 122 and the pressure sensor 100 detect stresses applied from a body to the sheet 118, if the area or the amount of deformation of the detection surface (reaction surface) with respect to the stresses is made larger, the detection sensitivity of such stresses can be improved.

In the case that normal stresses $F_p$ applied to the sheet 118 are detected on a detection surface (i.e., an upper surface or the like of the flat portion 132 on the stress direction converter 130), which is perpendicular to the normal stresses $F_p$, because the detection surface for the normal stresses $F_p$ is formed along a surface direction (X-Y direction) of the sheet 118, the detection area and deformation amount of the detection surface can easily be made large.

In contrast thereto, in the case that horizontal stresses $F_h$ applied to the sheet 118 are detected on the flat portion 132, because the detection surface (a side surface or the like of the flat portion 132) for the horizontal stresses $F_h$ is formed along the thickness direction of the sheet 118, in comparison with the detection surface for normal stresses $F_p$, the detection area and deformation amount cannot easily be made large. Accordingly, it is problematic to improve the detection sensitivity of horizontal stresses $F_h$.

Consequently, in the second embodiment, multiple columnar shaped projections 144 are formed on the upper surface of the flat portion 132, whereby, for example, as shown in FIG. 26, in the case that horizontal stresses $F_h$ in a positive X-direction are applied to the flat portion 132, not only the left side surfaces (side surfaces that confront the horizontal stresses $F_h$) of the flat portion 132 and the inclined section 136b, but also left side surfaces of each of the projections 144 can be utilized as detection surfaces 146 with respect to such horizontal stresses $F_h$. As a result, the detection area and deformation amount with respect to horizontal stresses $F_h$ is made greater, and detection sensitivity can be enhanced.

As described above, in accordance with the second embodiment, with a comparatively simple structure, stresses (normal stresses $F_p$, horizontal stresses $F_h$) applied from the body are capable of being segregated into multiple directions (Z-direction, X-direction) and detected. More specifically, with the second embodiment, using reflected light (one output signal) output from a single optical fiber cable 20, both normal stresses $F_p$ and horizontal stresses $F_h$ can easily be detected.

Additionally, according to the second embodiment, the projections 144 and the grooves 145 are formed on the flat portion 132. In this case, by providing the projections 144 and the grooves 145 on the flat portion 132 to which horizontal stresses $F_h$ are applied, compared to not providing such projections 144 and grooves 145, the detection area and deformation amount of the detection surface (reaction surface) for horizontal stresses $F_h$, which is perpendicular to the direction (e.g., the direction along the flat portion 132, the direction along which the gratings 126 are arrayed) in which the horizontal stresses $F_h$ are applied, can be made large. As a result, in the stress direction converter 130, the detection sensitivity for horizontal stresses $F_h$ can be enhanced, and together therewith, the detection accuracy of horizontal stresses $F_h$ can be heightened.

By making the projections 144 and the grooves 145 columnar shaped, it is possible for the detection area and deformation amount with respect to horizontal stresses $F_h$ to be made even greater, so that the detection sensitivity and detection accuracy of horizontal stresses $F_h$ can be further improved. Further, when a plurality of such projections 144 and grooves 145 are provided, the detection area and deformation amount with respect to horizontal stresses $F_h$ can be made greater.

Next, with reference to FIGS. 27 through 34, explanations shall be made concerning modified examples (third modified example, fourth modified example) of the FBG sensor 122 and the pressure sensor 100 according to the second embodiment.

In the following explanations of the modified examples, structural elements thereof that are the same as those of the FBG sensor 122 and the pressure sensor 100 according to the second embodiment shall be designated using the same reference numerals, and such features shall not be described in detail.

As shown in FIGS. 27 through 30, the FBG sensor 122A and the pressure sensor 100A according to the third modified example differs from the FBG sensor 122 and the pressure sensor 100 according to the second embodiment, in that multiple hemispherical shaped (point shaped) projections 180 are formed on the upper surface of the flat portion 132, and grooves are not provided thereon.

Figure 30:
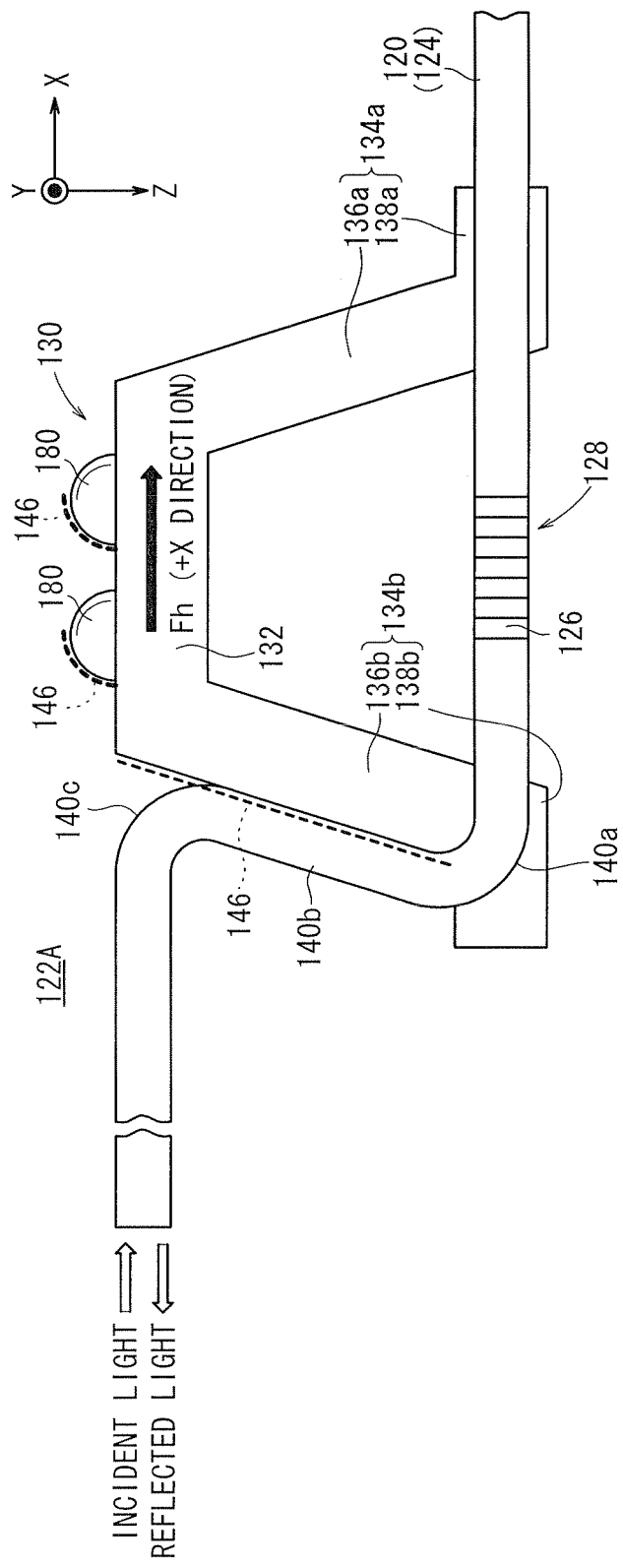
FIG. 30 is a view for explaining detection principles of horizontal stresses by the FBG sensor of FIGS. 27 through 29.
Figure 31:
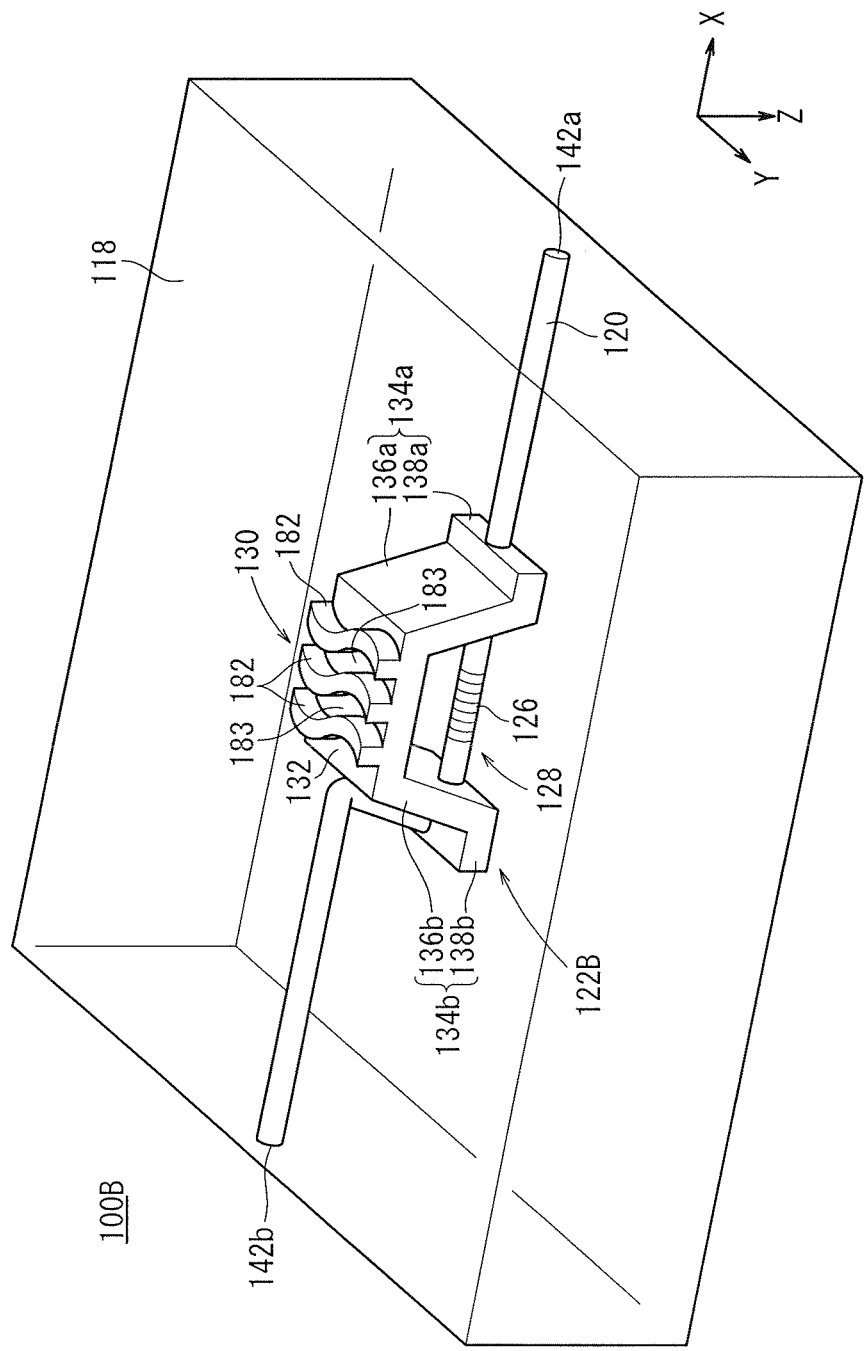
FIG. 31 is a perspective view of a pressure sensor, in which an FBG sensor according to a fourth modified example is disposed in a sheet.
Figure 32:
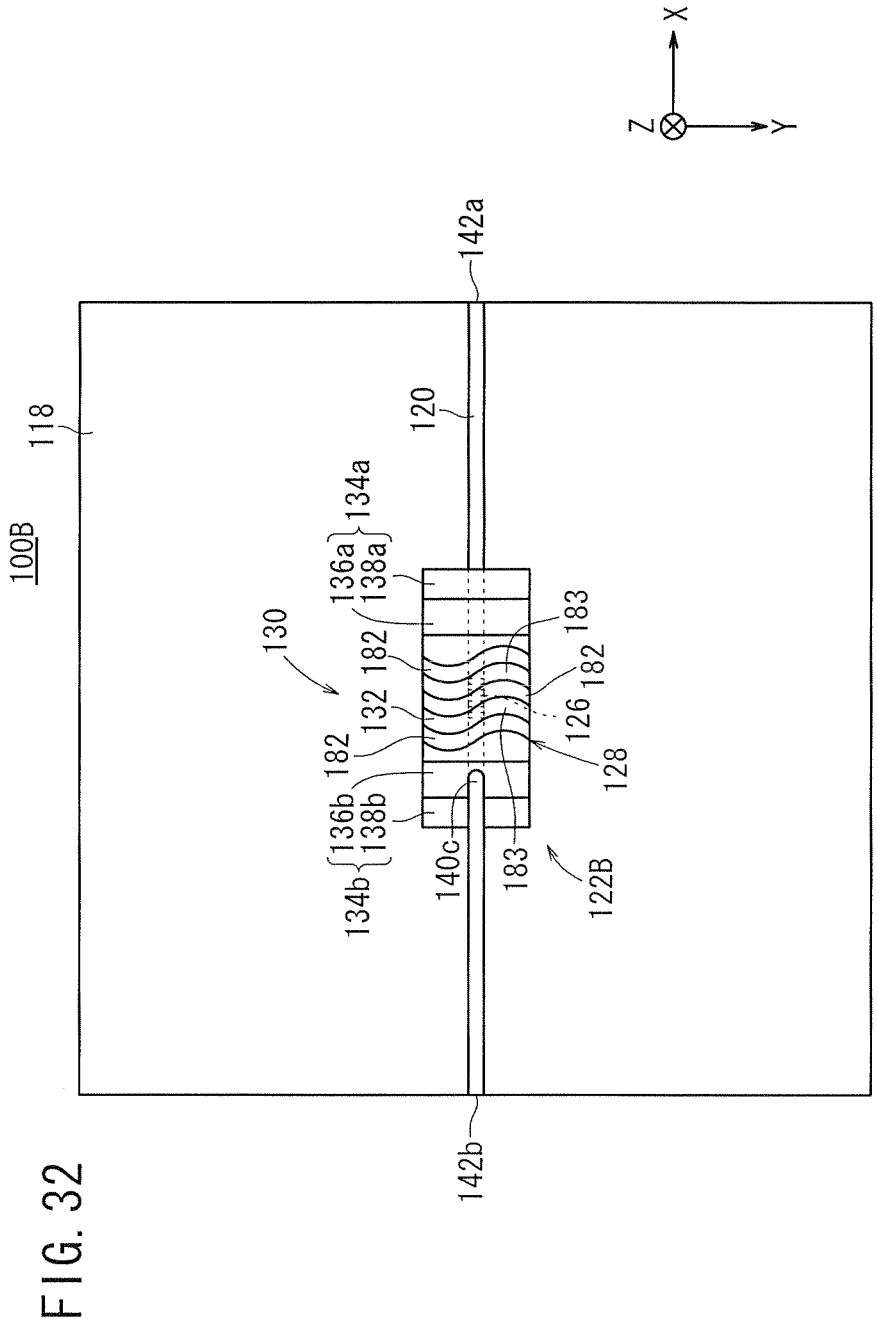
FIG. 32 is a plan view of the pressure sensor shown in FIG. 31.
Figure 33:
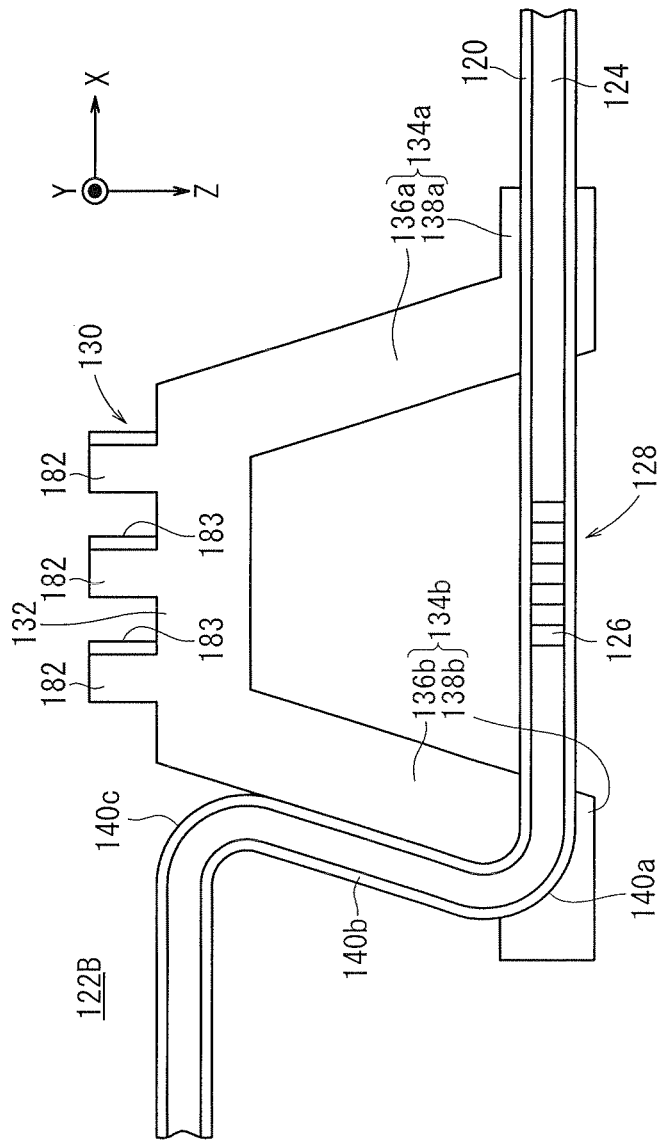
FIG. 33 is an outline explanatory view of the FBG sensor shown in FIG. 31.
Figure 34:
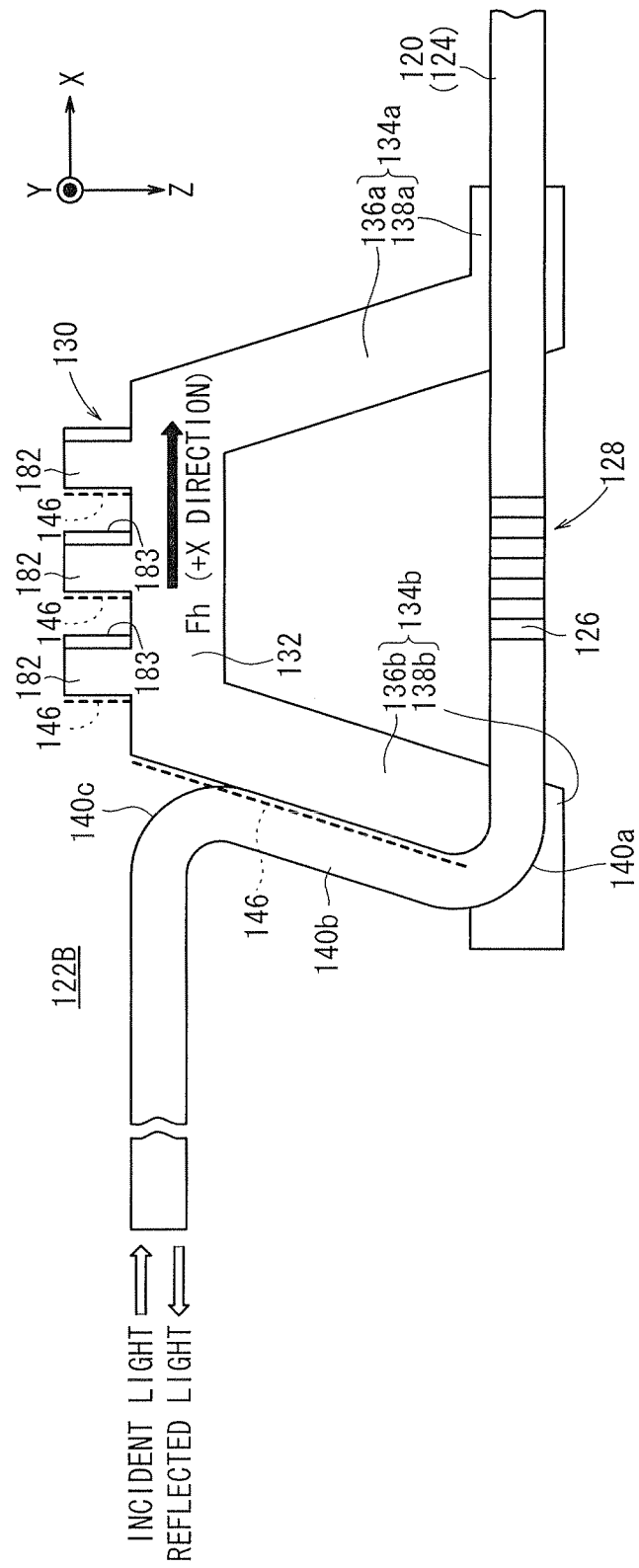
FIG. 34 is a view for explaining detection principles of horizontal stresses by the FBG sensor of FIGS. 31 through 33.

In this case as well, when horizontal stresses $F_h$ are applied in the positive X-direction, the left side surfaces on each of the projections 180 of FIG. 30 can act as detection surfaces. Therefore, the detection area and deformation amount with respect to horizontal stresses $F_h$ can be made greater, and the detection sensitivity and detection accuracy of horizontal stresses $F_h$ can be improved.

Further, by making the projections 180 hemispherical, because there are no sharp angled portions with respect to the sheet 118, the durability of the FBG sensor 122A and the pressure sensor 100A can be enhanced.

Next, with reference to FIGS. 31 through 34, explanations shall be made concerning an FBG sensor 122B and a pressure sensor 100B according to a fourth modified example.

As shown in FIGS. 31 through 34, the FBG sensor 122B and the pressure sensor 100B according to the fourth modified example differ from the FBG sensor 122, 122A and the pressure sensor 100, 100A according to the second embodiment and the third modified example, in that projections 182 having curved shapes (wavy shapes) are disposed in plurality on the upper surface of the flat portion 132, with grooves 183 being formed between the projections 182.

In this case as well, similar to the second embodiment (see FIGS. 22 through 26), when horizontal stresses $F_h$ are applied in the positive X-direction, because left side surfaces on each of the projections 182 can serve as detection surfaces 146 for the horizontal stresses $F_h$, the detection area and deformation amount of the horizontal stresses $F_h$ can be made larger, and the detection sensitivity and detection accuracy of horizontal stresses $F_h$ can be increased.

As described above, a case has been explained in which horizontal stresses $F_h$ are applied in the positive X-direction. However, in the case that horizontal stresses $F_h$ are applied in the negative X-direction as well, it is a matter of course that each of the aforementioned effects of the second embodiment and the third and fourth modified examples can be obtained. In this case, the flat portion 132, and the right side surface of the inclined section 136a or the right side surfaces of each of the projections 144, 180, 182 serve as detection surfaces with respect to horizontal stresses $F_h$.

Further, in the third modified example, hemispherical shaped grooves may also be provided on the flat portion 132, or such grooves may be provided alone without the projections 180. Also, in the fourth modified example, a groove 183 may be formed on the flat portion 132 while dispensing with the projections 182. In such cases as well, the same effects as those of the second embodiment can be obtained.

Third Embodiment

Next, with reference to FIGS. 35 through 38, explanations shall be given concerning a pressure sensor 200 according to a third embodiment, and an FBG sensor 222 incorporated in the pressure sensor 200.

The pressure sensor 200 and the FBG sensor 222 according to the third embodiment differ from the pressure sensor 100 and FBG sensor 122 according to the second embodiment in relation to the shape of the projection member (projection) 244 of the stress direction converter 230.

Figure 35:
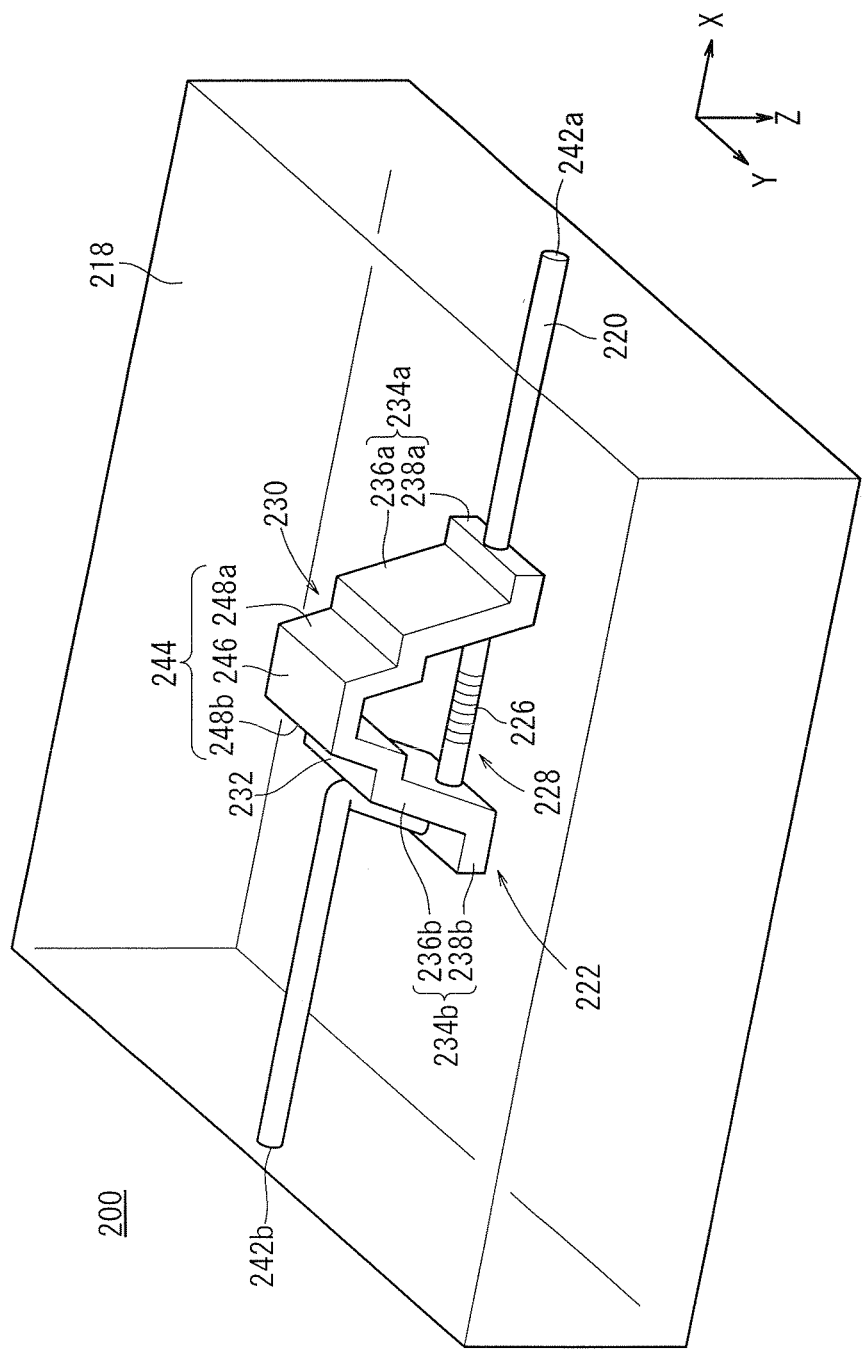
FIG. 35 is a perspective view of a pressure sensor, in which an FBG sensor according to a third embodiment is disposed in a sheet.
Figure 36:
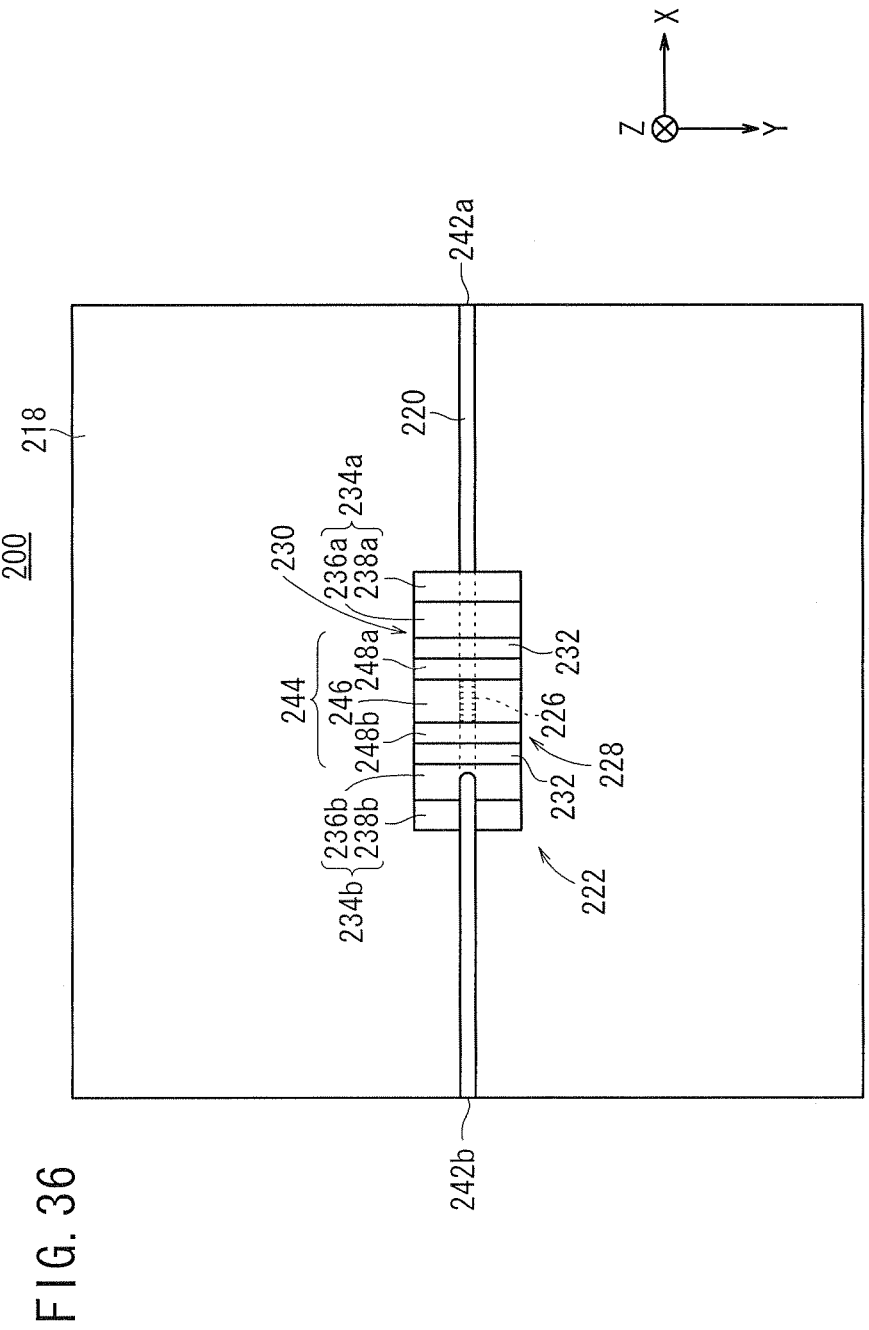
FIG. 36 is a plan view of the pressure sensor shown in FIG. 35.
Figure 37:
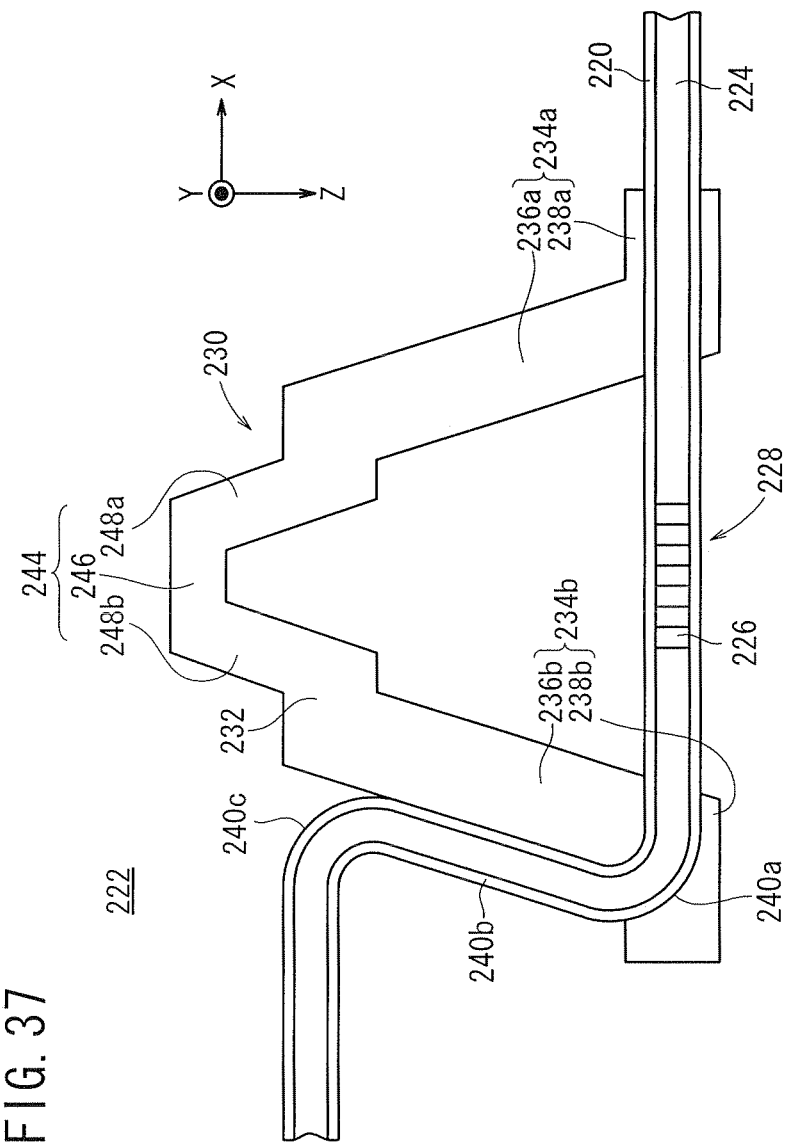
FIG. 37 is an outline explanatory view of the FBG sensor shown in FIG. 35.

As shown in FIG. 35, the pressure sensor 200 is constituted by embedding a single optical fiber cable 220 having a longitudinal direction along the X-direction in the interior of a sheet 218 possessing a given flexibility, and by forming an FBG sensor 222 in the optical fiber cable 220. The sheet 218 and the optical fiber cable 220 can be constructed the same as the sheet 18 and the optical fiber cable 20 according to the first embodiment. Also, in FIG. 35, although a case is shown in which one individual FBG sensor 222 is disposed in the sheet 218, the number of FBG sensors 222 embedded in the sheet 218 is not limited to one.

The FBG sensor 222 comprises a stress detection sensor 228 disposed substantially centrally in the interior of the sheet 218 and including the optical fiber cable 220 in which gratings 226 are formed, and a stress direction converter 230, which receives through the sheet 218 stresses that are applied from the exterior to the sheet 218, converts the received stresses into stresses of a direction along the direction in which the gratings 226 are arrayed (i.e., the X-direction, which is the longitudinal direction of the optical fiber cable 220), and then transmits the converted stresses to the optical fiber cable 220.

The stress direction converter 230 has a rectangular flat portion 232 that extends substantially parallel with the gratings 226 along the X-Y direction, and stress transmitting sections 234a, 234b that are bridged from two opposing sides along the X-direction of the flat portion 232 to respective ends of the gratings 226.

The projection 244, which is formed on the stress direction converter 230, is constituted by a top portion (stepped portion) 246, including a convexity formed in a central portion along the X-direction on the flat portion 232 and which is formed at a position higher in the Z-direction than the flat portion 232, an inclined section (connecting section) 248a that bridges between the top portion 246 and the inclined section 236a side of the flat portion 232, and another inclined section (connecting section) 248b that bridges between the top portion 246 and the inclined section 236b side of the flat portion 232. More specifically, the top portion 246 is formed with a front surface that differs in height with respect to the front surface of the flat portion 232, and with a back surface that differs in height with respect to the back surface of the flat portion 232. The inclined sections 248a, 248b are formed so as to interconnect the front surface of the top portion 246 and the front surface of the flat portion 232, and further to interconnect the rear surface of the top portion 246 and the rear surface of the flat portion 232.

Figure 38:
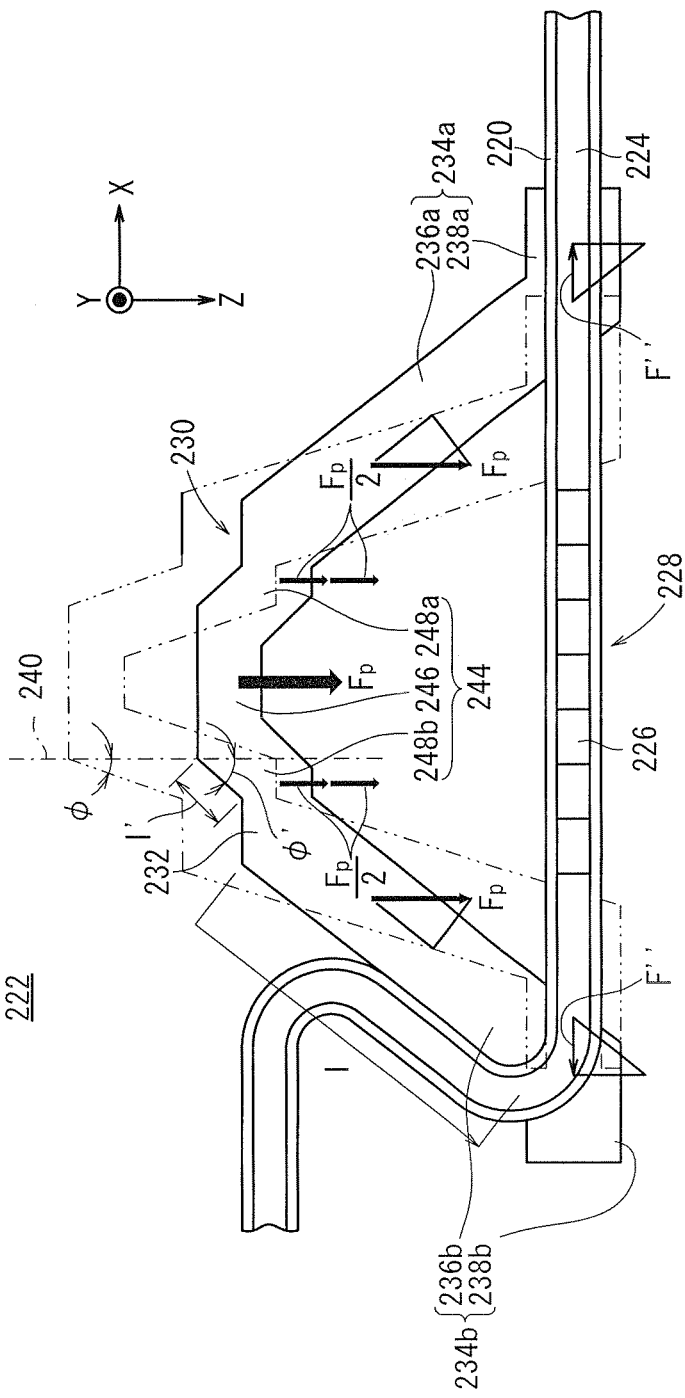
FIG. 38 is a view for explaining detection principles of normal stresses by the FBG sensor of FIGS. 35 through 37.

Next, with reference to FIG. 38, explanations shall be given concerning detection of normal stresses at a time when a non-illustrated body comes into contact with a surface of the sheet 218 above the FBG sensor 222, and normal stresses (e.g., stresses along the Z-direction) are applied from the body to the gratings 226.

As shown in FIGS. 35 to 38, because the shape of the stress direction converter 230 prior to application of stresses includes the projection 244, and is constructed with left-right (lateral) symmetry about the gratings 226, when a normal stress $F_p$ is applied from the body along the Z-direction to the sheet 218, the flat portion 232, as well as the top portion 246 of the projection 244 of the stress direction converter 230 both receive respectively the normal stress $F_p$.

Owing thereto, at the inclined sections 248a, 248b, due to the normal stress $F_p$ applied to the top portion 246, ideally, stresses $F_p/2$ are applied along the Z-direction. As a result, the shape of the projection 244 after application of stresses becomes a shape that is transformed with left-right (lateral) symmetry by the stresses $F_p/2$ (the shape shown by the solid lines in FIG. 38), in comparison to the shape thereof prior to application of stresses (the shape shown by the two-dot-dashed lines in FIG. 38). Additionally, components (forces) of the stresses $F_p/2$ in directions along the inclined sections 248a, 248b are transmitted respectively to sides of the inclined sections 236a, 236b of the flat portion 232.

Further, since the normal stress $F_p$ also is applied to the flat portion 232, at each of the stress transmitting sections 234a, 234b, a stress $F_p/2$ along the Z-direction caused by the normal stress $F_p$ applied to the flat portion 232, and a stress $F_p/2$ along the Z-direction caused by a force having a direction along the inclined sections 248a, 248b, are applied respectively. Stated otherwise, at each of the stress transmitting sections 234a, 234b, ideally, stresses $F_p(=F_p/2+F_p/2)$ along the Z-direction are applied, respectively.

In this manner, by providing the projection 244, concerning the shape of the stress direction converter 230 after application of stresses thereto, in comparison with the shape prior to application of stresses (i.e., the shape shown in FIG. 37, and shown by the two-dot-dashed line of FIG. 38), stresses $F_p$, which result from the stresses $F_p/2$ caused by the normal stress $F_p$ applied to the flat portion 232, as well as the stresses $F_p/2$ caused by the normal stress $F_p$ applied to the top portion 246, act on the stress direction converter 230, whereby a laterally symmetric largely deformed shape results (i.e., the shape shown by the solid lines in FIG. 38). More specifically, compared to the FBG sensor 222 according to the third embodiment, because the stresses in the Z-direction applied to each of the stress transmitting sections 234a, 234b ideally are increased by two times from $F_p/2$ to $F_p$, with the projection 244 formed on the flat portion 232, overall, the stress direction converter 230 can be deformed more significantly.

Components (forces) of the stress $F_p$ along the Z-direction, in directions along the inclined sections 236a, 236b are transmitted to the joint sections 238a, 238b, whereby at the optical fiber cable 220 and at each of the joint sections 238a, 238b, forces F''' (i.e., components along the X-direction of forces having directions along the inclined sections 236a, 236b) based on the stress $F_p$ are applied respectively. Accordingly, the forces F''' applied to each of the adjoined portions are imposed on the gratings 226, whereby the gratings 226 are subjected to large strains (stretching) in the X-direction, and the lattice spacing of the gratings 226 increases to a large degree.

Accordingly, with the pressure sensor 200 and the FBG sensor 222 according to the third embodiment, compared to the pressure sensor 16 and the FBG sensor 22 according to the first embodiment, the reflected wavelength shift amount from $\lambda_A$ to $\lambda_B$ in the gratings 226 can reliably be made greater.

Next, using mathematical formulas, explanations shall be made in greater detail concerning the increase in the shift amount according to the third embodiment.

If the angle defined by a straight line 240 along the direction of the arrow Z and the inclined section 248b prior to application of stresses is taken as $\phi$, whereas the angle defined by the straight line 240 and the inclined section 248b after application of stresses is taken as $\phi'$, then the increment $\Delta\phi$ in the angle due to application of normal stresses $F_p$ to the top portion 246 is expressed by the following equation (23).

$$\Delta\phi = \phi' - \phi \quad (23)$$

Further, if the length of the inclined sections 248a, 248b is taken as l', the deformation amount in the X-direction of the FBG sensor 222 to which the angle increment $\Delta\phi$ is imparted is expressed by the following formula (24).

$$2 \times l' \times \sin(\Delta\phi) \quad (24)$$

Furthermore, if the grating number of the gratings 226 is taken as N, the increment $\alpha\lambda'$ in the reflected wavelength shift amount from $\lambda_A$ to $\lambda_B$ due to the angle increment $\Delta\phi$ is represented by the following equation (25).

$$\Delta\lambda' \equiv \lambda_B - \lambda_A \equiv 2 \times n_{eff} \times \{2 \times l' \times \sin(\Delta\phi)/N\} \quad (25)$$

Accordingly, as a result of providing the projection 244, the reflected wavelength shift amount from $\lambda_A$ to $\lambda_B$ in the third embodiment is represented by the following formula (26).

$$\Delta\lambda + \Delta\lambda' \quad (26)$$

More specifically, by providing the projection 244, because the shift amount in the gratings 226 is increased by $\Delta\lambda'$, the detection sensitivity with respect to normal stresses $F_p$ can be enhanced.

Accordingly, by applying the pressure sensor 200 and the FBG sensor 22 according to the third embodiment to an end effector 56 (hand members 56a, 56b) of the robot system 50 shown in FIGS. 13 and 14, normal stresses applied from the body 52 can be detected with high accuracy.

As described above, in accordance with the pressure sensor 200 and the FBG sensor 222 according to the third embodiment, as well as the end effector 56 on which the pressure sensor 200 is mounted, in the case that stresses (normal stresses $F_p$ applied in the Z-direction) of a direction different from the longitudinal direction (X-direction) of the optical fiber cable 220 are applied from a body to the stress direction converter 230, such normal stresses $F_p$ are applied respectively to the flat portion 232 and to the projection 244 that is formed on the flat portion 232. Owing thereto, the stress direction converter 230 overall is deformed to a large degree by the normal stress $F_p$ applied to the projection 244, as well as by the normal stress $F_p$ applied to the flat portion 232.

Further, the normal stress $F_p$, which is applied respectively to the flat portion 232 and to the projection 244 (top portion 246), is converted into stresses in the X-direction by the stress direction converter 230, and the stresses after conversion (forces F''') are transmitted to the gratings 226 via the second stress transmitting sections 234a, 234b.

As a result thereof, because large strains are generated in the gratings 226, and the wavelength of light (reflected wavelength) reflected at the gratings 226 changes to a large degree, by detecting the reflected wavelength shift amount of the gratings 226, normal stresses $F_p$ can easily be detected.

In this manner, with the third embodiment, by forming the projection 244 on the flat portion 232, compared to not having such a projection 244, the amount at which the stress direction converter 230 is deformed can be made large, and together therewith, strains in the gratings 226 also can be made large. As a result, the reflected wavelength shift amount can be increased to a large degree, and detection sensitivity of normal stresses $F_p$ can easily be improved. Accordingly, in the third embodiment as well, with a comparatively simple structure, stresses (normal stresses $F_p$, horizontal stresses $F_h$) applied from a body are capable of being segregated into multiple directions (Z-direction, X-direction) and detected.

Next, with reference to FIGS. 39 through 42, explanations shall be given concerning modified examples (fifth through eighth modified examples) of the pressure sensor 200 and the FBG sensor 222 according to the third embodiment.

Figure 39:
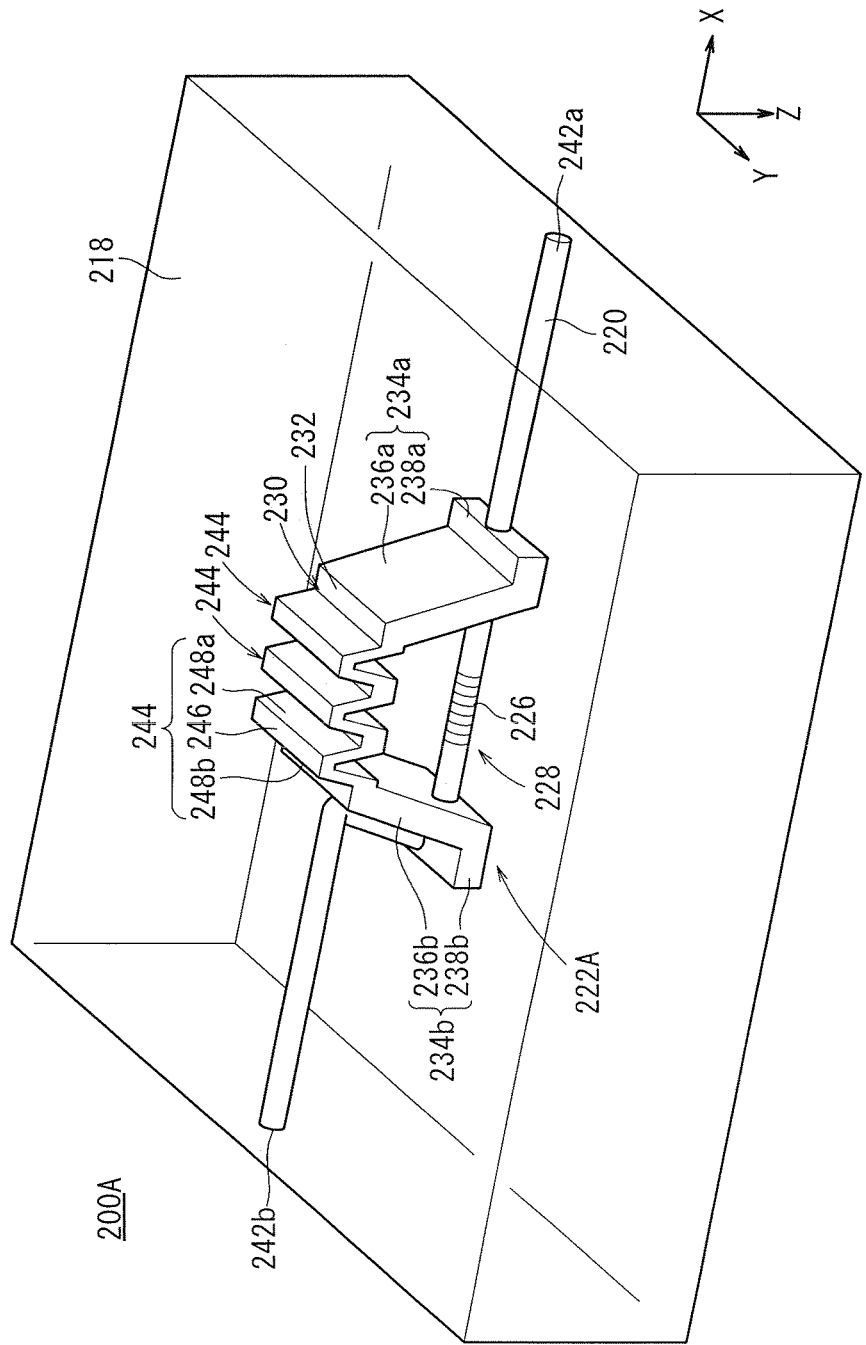
FIG. 39 is a perspective view of a pressure sensor, in which an FBG sensor according to a fifth modified example is disposed in a sheet.

As shown in FIG. 39, the pressure sensor 200A and the FBG sensor 222A according to the fifth modified example differ from the pressure sensor 200 and FBG sensor 222 according to the third embodiment, in that the projections 244 are disposed in plurality on the upper surface of the flat portion 232. In FIG. 39, each of the projections 244 are separated by predetermined distances in the X-direction, while extending along the Y-direction.

Figure 40:
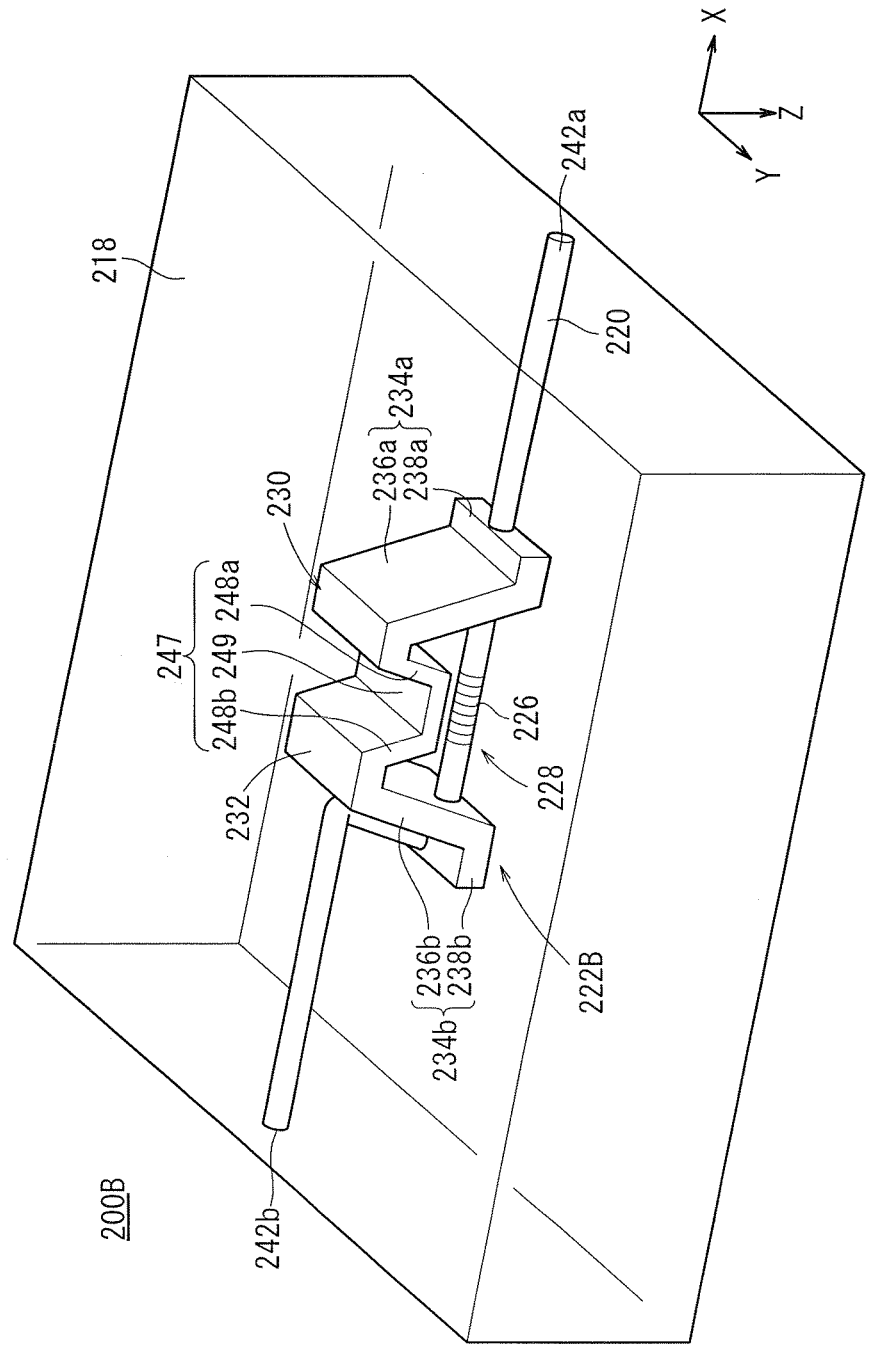
FIG. 40 is a perspective view of a pressure sensor, in which an FBG sensor according to a sixth modified example is disposed in a sheet.

As shown in FIG. 40, the pressure sensor 200B and the FBG sensor 222B according to the sixth modified example differ from the pressure sensor 200 and FBG sensor 222 according to the third embodiment, in that a groove 247 is formed, which is directed toward the gratings 226 in a center region of the flat portion 232.

Figure 41:
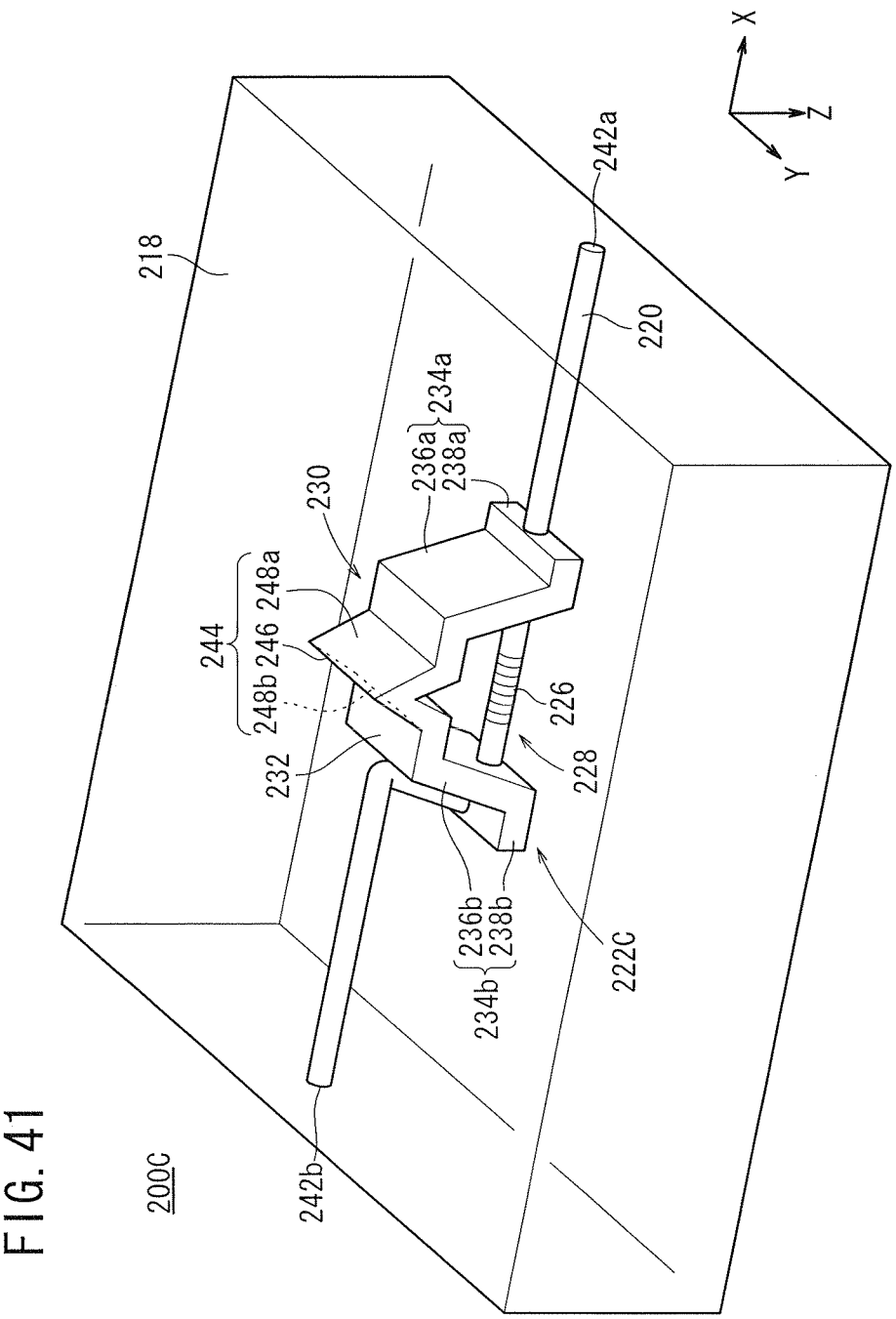
FIG. 41 is a perspective view of a pressure sensor, in which an FBG sensor according to a seventh modified example is disposed in a sheet.

As shown in FIG. 41, the pressure sensor 200C and the FBG sensor 222C according to the seventh modified example differ from the pressure sensor 200 and FBG sensor 222 according to the third embodiment, in that, by forming the projection 244 at a sharp angle, a ridge (stepped portion) 246 is formed with a ridgeline (mountain ridge shape).

Figure 42:
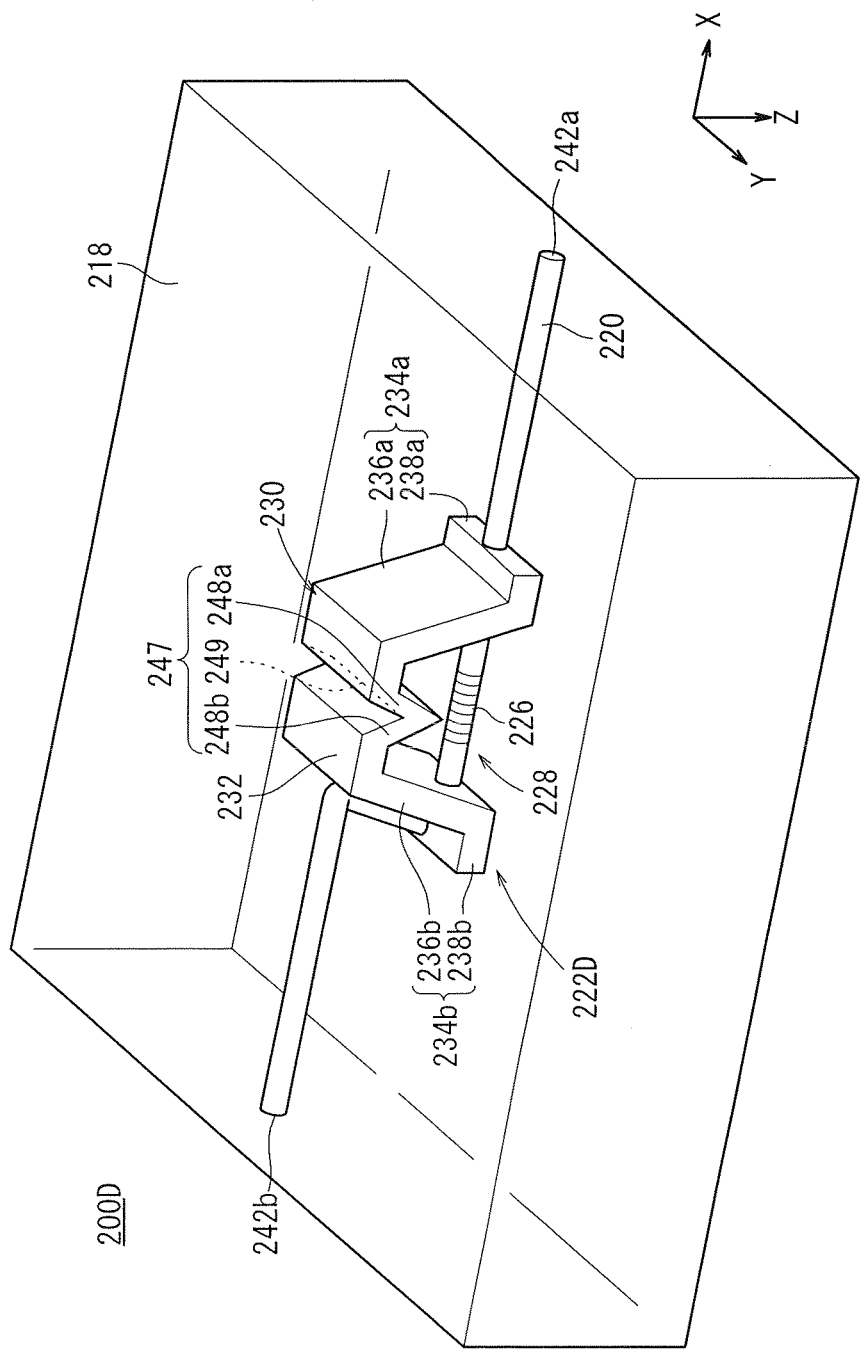
FIG. 42 is a perspective view of a pressure sensor, in which an FBG sensor according to an eighth modified example is disposed in a sheet.

As shown in FIG. 42, the pressure sensor 200D and the FBG sensor 222D according to the eighth modified example differ from the pressure sensor 200B and FBG sensor 222B according to the sixth modified example, in that, by forming the groove 247 at a sharp angle, a deepest part (stepped portion) 249 thereof is formed with a ridgeline (valley ridge shape).

With the fifth through eighth modified examples, by forming the projections 244 and the grooves 247 with the aforementioned structures or shapes, the deformation amount of the stress direction converter 230 and strains produced in the gratings 226 can be made even greater, thus enabling improvement in the detection sensitivity of normal stresses $F_p$.

The present invention is not limited to the aforementioned embodiments, and it goes without saying that various modified or additional structures could be adopted therein without deviating for the essence and gist of the present invention as set forth in the appended claims.

What is claimed is:
1. An optical fiber sensor comprising:
a stress detection sensor made up from an optical fiber in which gratings are arrayed that reflect light of a specified wavelength, the optical fiber having an optical axis; and
a stress direction converter for converting external stresses applied from an exterior into stresses of a direction in which the gratings are arrayed, and transmitting the stresses to the optical fiber,
wherein the stress direction converter includes a flat portion which is parallel to a direction of the optical axis of the fiber and to which stresses are applied from the exterior, and a stress transmitting section having an inclined section that is bridged from the flat portion to the optical fiber, and
wherein one end of the optical fiber, through which the light of the specified wavelength reflected by the gratings is transmitted, is bent to be disposed along the inclined section of the stress transmitting section.
2. The optical fiber sensor according to claim 1, wherein:
the flat portion is disposed along the direction in which the gratings are arrayed; and
the inclined section of the stress transmitting section comprises a first inclined section that is inclined from one end of the flat portion toward the optical fiber, a first joint section joined to the first inclined section and which surrounds a portion of an outer circumferential surface of the optical fiber in the vicinity of a first end of the gratings, a second inclined section that is inclined from another end of the flat portion toward the optical fiber, and a second joint section joined to the second inclined section and which surrounds a portion of an outer circumferential surface of the optical fiber in the vicinity of a second end of the gratings.
3. The optical fiber sensor according to claim 2, wherein the one end of the optical fiber is bent to be disposed along the first inclined section.
4. The optical fiber sensor according to claim 2, wherein:
the inclined section of the stress transmitting section includes a third inclined section, which is connected to one of the first joint section and the second joint section, in a condition of being separated from the first inclined section and the second inclined section; and
the one end of the optical fiber is bent to be disposed along the third inclined section.

5. The optical fiber sensor according to claim 1, wherein at least one of a projection and a groove is formed on the flat portion.
6. The optical fiber sensor according to claim 5, wherein at least one of the projection and the groove is columnar shaped.
7. The optical fiber sensor according to claim 5, wherein at least one of the projection and the groove is formed along a direction that is substantially perpendicular to a direction in which the gratings are arrayed.
8. The optical fiber sensor according to claim 5, wherein at least one of the projection and the groove is shaped as a point.
9. The optical fiber sensor according to claim 5, wherein at least one of the projections and the grooves is disposed on the flat portion in plurality.
10. The optical fiber sensor according to claim 5, wherein at least one of the projection and the groove is formed by a stepped portion having a front surface or a front side ridgeline of a different height than a surface of the flat portion, and also having a rear surface or a rear side ridgeline of a different height than a rear surface of the flat portion, and connecting portions that are bridged from the stepped portions to the flat portion.
11. The optical fiber sensor according to claim 10, wherein at least one of a tip part and a deepest part of the stepped portion is formed at a sharp angle.
12. A pressure sensor comprising:
a flexible sheet; and
an optical fiber sensor embedded in the sheet, the optical fiber sensor including a stress detection sensor made up from an optical fiber having an optical axis in which gratings are arrayed that reflect light of a specified wavelength, and a stress direction converter for converting stresses applied to an exterior of the sheet into stresses of a direction in which the gratings are arrayed, and transmitting the stresses to the optical fiber,
wherein the stress direction converter includes a flat portion which is parallel to a direction of the optical axis of the fiber and to which exterior stresses are applied, and a stress transmitting section having an inclined section that is bridged from the flat portion to the optical fiber, and
wherein one end of the optical fiber, through which the light of the specified wavelength reflected by the gratings is transmitted, is bent to be disposed along the inclined section of the stress transmitting section.
13. The pressure sensor according to claim 12, wherein at least one of a projection and a groove is formed on the flat portion.
14. The pressure sensor according to claim 13, wherein at least one of the projection and the groove is formed by a stepped portion having a front surface or a front side ridgeline of a different height than a surface of the flat portion, and also having a rear surface or a rear side ridgeline of a different height than a rear surface of the flat portion, and connecting portions that are bridged from the stepped portions to the flat portion.
15. An end effector comprising:
a gripping member for gripping a body; and
a pressure sensor comprising a flexible sheet and an optical fiber sensor embedded in the sheet, the optical fiber sensor including a stress detection sensor made up from an optical fiber in which gratings are arrayed that reflect light of a specified wavelength, and a stress direction converter for converting stresses applied to an exterior of the sheet into stresses of a direction parallel with a longitudinal direction of the optical fiber, and transmitting the stresses to the gratings, the pressure sensor being mounted on the gripping member for contact with the body;

wherein the stress direction converter includes a flat portion which extends in parallel with the longitudinal direction and to which stresses are applied in a direction different from the longitudinal direction, and a stress transmitting section having an inclined section that is bridged from the flat portion to the optical fiber, and wherein one end of the optical fiber, through which the light of the specified wavelength reflected by the gratings is transmitted, is bent to be disposed along the inclined section of the stress transmitting section.

16. The end effector according to claim 15, wherein at least one of a projection and a groove is formed on the flat portion.

17. A method of detecting stresses using an optical fiber sensor made up from an optical fiber in which gratings are arrayed that reflect light of a specified wavelength and having at least one bent portion, and wherein the at least one bent portion of the optical fiber is disposed at a location where light of the specified wavelength reflected by the gratings is transmitted, wherein in the case that the stresses are applied from an exterior, the method comprises the steps of:

providing the optical fiber sensor including a stress direction converter for converting stresses applied from the exterior into stresses of a direction in which the gratings are arrayed, and transmitting the stresses to the optical fiber, the bent portion of the optical fiber being disposed along a section of the convertor;

when a normal stress is applied from the exterior, subjecting the gratings to strains accompanying application of the normal stress, and detecting the normal stress based on a shift amount of reflected wavelengths of the light caused by the strains in the gratings; and when a horizontal stress is applied from the exterior, causing the bent portion to change accompanying application of the horizontal stress, and detecting the horizontal stress based on an amount of change in a reflected wave intensity of the light caused by the change in the bent portion.

18. The method of detecting stresses according to claim 17, wherein:

the stress direction converter includes a flat portion to which stresses are applied from the exterior, and the section is a stress transmitting section that is bridged from the flat portion to the optical fiber, and in the case that the bent portion is provided by disposing one end of the optical fiber, through which the light of the specified wavelength reflected by the gratings is transmitted, along the stress transmitting section, the method further comprises the steps of:

when the normal stress is applied from the exterior, the stress direction converter subjecting the gratings to strains; and when the horizontal stress is applied from the exterior, the stress direction converter causing displacement of the optical fiber, thereby causing the bent portion to change.

* * * * *